United States Patent
Gilman et al.

(10) Patent No.: US 12,243,009 B2
(45) Date of Patent: *Mar. 4, 2025

(54) INTELLIGENT PRE-PROCESSING AND FULFILLMENT OF MIXED ORDERS

(71) Applicant: CVS Pharmacy, Inc., Woonsocket, RI (US)

(72) Inventors: Nathaniel D. Gilman, Groton, CT (US); Himanshu Gupta, Norwood, MA (US); David Harkins, Warwick, RI (US); John R. Hoenick, Providence, RI (US); Renee L Hoyceanyls, Blackstone, MA (US); Dustin W. Humphreys, East Greenwich, RI (US); Eric G. Parrish, Smithfield, RI (US); Grant D. Pill, Providence, RI (US); Matthew K. Scott, Waban, MA (US); Jared P. Tancrelle, Smithfield, RI (US); Brian A. Tilzer, Sudbury, MA (US); Patrick J. Walsh, Southborough, MA (US)

(73) Assignee: CVS Pharmacy, Inc., Woonsocket, RI (US)

( * ) Notice: Subject to any disclaimer, the term of this patent is extended or adjusted under 35 U.S.C. 154(b) by 126 days.

This patent is subject to a terminal disclaimer.

(21) Appl. No.: 18/163,192

(22) Filed: Feb. 1, 2023

(65) Prior Publication Data

US 2023/0186233 A1 Jun. 15, 2023

Related U.S. Application Data

(63) Continuation of application No. 17/090,152, filed on Nov. 5, 2020, now Pat. No. 11,610,179, which is a
(Continued)

(51) Int. Cl.
*G06Q 30/06* (2023.01)
*G06Q 10/00* (2023.01)
(Continued)

(52) U.S. Cl.
CPC .......... *G06Q 10/087* (2013.01); *G06Q 10/00* (2013.01); *G06Q 20/12* (2013.01); *G06Q 20/28* (2013.01);
(Continued)

(58) Field of Classification Search
None
See application file for complete search history.

(56) References Cited

U.S. PATENT DOCUMENTS

| 6,404,337 B1 | 6/2002 | Van Till et al. |
| 6,766,455 B1 | 7/2004 | Ryan, Jr. |

(Continued)

FOREIGN PATENT DOCUMENTS

WO 2006/052989 5/2006

OTHER PUBLICATIONS

Anonymous, "Rx Processing Corporation releases five year business/financial plan," Noticias Financieras (Miami), Nov. 10, 2006, 2 pgs.
(Continued)

*Primary Examiner* — Nicholas D Rosen
(74) *Attorney, Agent, or Firm* — Patent Law Works LLP

(57) ABSTRACT

A pre-processing and fulfillment system and method are described. In some implementations, the method may include receiving an order containing a retail component and a pharmacy component, processing the order for the pharmacy component and the retail component, and generating a tracking token identifying the order and authorizing a party to receive a component of the order. The method may include transmitting fulfillment instructions to a fulfillment system based on processed information for the order, and transmitting the tracking token to a computing device of the authorized party. Some implementations may also include receiving a signal indicating receipt of the tracking token
(Continued)

and an authorized transfer of the component, and updating a status of the order based on the received signal.

20 Claims, 38 Drawing Sheets

Related U.S. Application Data continuation of application No. 15/909,888, filed on Mar. 1, 2018, now Pat. No. 10,867,278.

(60) Provisional application No. 62/465,575, filed on Mar. 1, 2017.

(51) Int. Cl.
  *G06Q 10/08* (2024.01)
  *G06Q 10/087* (2023.01)
  *G06Q 20/12* (2012.01)
  *G06Q 20/28* (2012.01)
  *G06Q 20/32* (2012.01)
  *G06Q 20/38* (2012.01)
  *G06Q 20/40* (2012.01)
  *G06Q 30/0601* (2023.01)

(52) U.S. Cl.
  CPC ..... *G06Q 20/3224* (2013.01); *G06Q 20/3274* (2013.01); *G06Q 20/3825* (2013.01); *G06Q 20/3827* (2013.01); *G06Q 20/389* (2013.01); *G06Q 20/4014* (2013.01); *G06Q 30/0635* (2013.01); *G06Q 30/0639* (2013.01)

(56) References Cited

U.S. PATENT DOCUMENTS

| | | | |
|---|---|---|---|
| 7,543,141 B2 * | 6/2009 | Jeon | H04L 63/0823 |
| | | | 713/168 |
| 8,229,763 B2 | 7/2012 | Laughland et al. | |
| 8,626,530 B1 | 1/2014 | Tran et al. | |
| 8,898,083 B2 | 11/2014 | Skaaksrud et al. | |
| 9,015,069 B2 | 4/2015 | Brantley et al. | |
| 9,088,653 B2 | 7/2015 | Amerling et al. | |
| 9,361,467 B2 | 6/2016 | Bracher et al. | |
| 9,699,606 B1 | 7/2017 | Bhatia et al. | |
| 9,842,364 B2 | 12/2017 | Hu | |
| 9,904,903 B1 | 2/2018 | Weiss et al. | |
| 10,121,144 B2 | 11/2018 | Khan | |
| 10,176,507 B2 | 1/2019 | Lopez | |
| 10,243,945 B1 | 3/2019 | Kruse et al. | |
| 10,304,047 B2 | 5/2019 | Huxham et al. | |
| 10,430,556 B2 | 10/2019 | McCauley et al. | |
| 10,867,278 B2 | 12/2020 | Gilman et al. | |
| 11,610,179 B2 * | 3/2023 | Gilman | G06Q 20/389 |
| 2003/0163402 A1 | 8/2003 | Kincart | |
| 2004/0064708 A1 | 4/2004 | Angelo et al. | |
| 2006/0144925 A1 | 7/2006 | Jones | |
| 2008/0026727 A1 * | 1/2008 | Jeon | H04L 63/12 |
| | | | 455/414.1 |
| 2008/0092239 A1 | 4/2008 | Sitrick et al. | |
| 2009/0106034 A1 * | 4/2009 | Giacalone | G06Q 10/10 |
| | | | 705/346 |
| 2012/0246077 A1 | 9/2012 | Skaaksrud et al. | |
| 2012/0253833 A1 | 10/2012 | John et al. | |
| 2013/0227285 A1 | 8/2013 | Bracher et al. | |
| 2013/0246083 A1 | 9/2013 | Bell | |
| 2014/0046805 A1 | 2/2014 | Hu | |
| 2014/0074505 A1 * | 3/2014 | Scanlon | G16H 40/67 |
| | | | 705/2 |
| 2014/0244307 A1 | 8/2014 | Shutko et al. | |
| 2014/0279269 A1 | 9/2014 | Brantley et al. | |
| 2014/0297743 A1 | 10/2014 | Zyto et al. | |
| 2015/0003594 A1 | 1/2015 | Amerling et al. | |
| 2015/0095199 A1 | 4/2015 | Blair, II | |
| 2015/0127549 A1 | 5/2015 | Khan | |
| 2015/0294084 A1 | 10/2015 | McCauley et al. | |
| 2015/0302390 A1 | 10/2015 | Huxham et al. | |
| 2016/0012391 A1 | 1/2016 | Burnett | |
| 2016/0027089 A1 | 1/2016 | Lopez | |
| 2016/0328536 A1 | 11/2016 | Webb et al. | |
| 2017/0132393 A1 | 5/2017 | Natarajan et al. | |
| 2018/0068253 A1 | 3/2018 | Simms et al. | |

OTHER PUBLICATIONS

International Search Report and Written Opinion for International Patent Application No. PCT/US2018/020538, mailed Jun. 19, 2018, 14 pgs.

Murphy, "Wal-Mart upgrades app to speed up pharmacy refills, money transfers," MarketWatch, Inc., at least as early as Mar. 1, 2017, 2 pgs.

* cited by examiner

INTELLIGENT PRE-PROCESSING AND FULFILLMENT OF MIXED ORDERS

SUMMARY

A system with order preprocessing, authentication and/or fulfillment intelligence is described. Implementations of the system may perform the following operations: receiving, by a server, an order containing a retail component and a pharmacy component; processing, by the server, the order for the pharmacy component; processing, by the server, the order for the retail component; generating, by the server, a tracking token identifying the order and authorizing a first party to receive one or more of the pharmacy component and the retail component of the order; transmitting, by the server, fulfillment instructions to a fulfillment system based on processed information for the pharmacy component and processed information for the retail component, the fulfillment system configured to fulfill the order including the retail component and the pharmacy component; transmitting, by the server, the tracking token to a first computing device of the first party; receiving, by the server, a signal indicating receipt of the tracking token and an authorized transfer of the one or more of the pharmacy component and the retail component of the order to the first party; and updating, by the server, a status of the order based on the received signal.

Another general aspect includes a system including: a processor and a memory storing instructions that, when executed by the processor, cause the system to perform operations including: receiving an order containing a retail component and a pharmacy component; processing the order for the pharmacy component; processing the order for the retail component; generating a tracking token identifying the order and authorizing a first party to receive one or more of the pharmacy component and the retail component of the order; transmitting fulfillment instructions to a fulfillment system based on processed information for the pharmacy component and processed information for the retail component, the fulfillment system configured to fulfill the order including the retail component and the pharmacy component; transmitting the tracking token to a first computing device of the first party; receiving a signal indicating receipt of the tracking token and an authorized transfer of the one or more of the pharmacy component and the retail component of the order to the first party; and updating a status of the order based on the received signal.

Implementations may include one or more of the following features. Although described in reference to a computer-implemented method, the features may also be applicable to operations performed by the system by executing instructions for the methods using a processor of the system. The computer-implemented method where generating the tracking token includes encoding order identification information into the tracking token using a hash function. The computer-implemented method including: receiving, by the server, the tracking token from the fulfillment system, the fulfillment system having received the tracking token from the first computing device; validating, by the server, the tracking token by decrypting the tracking token using a hash function by which the tracking token was encrypted; and transmitting, by the server, a signal indicating that the tracking token is validated to the fulfillment system. The computer-implemented method including: modifying the tracking token using a time and a date of the authorized transfer of the one or more the pharmacy component and the retail component of the order to the first party. The computer-implemented method including determining, by the server, a fulfillment option based on an attribute of a user who submitted the order and the processed information for the pharmacy component and the processed information for the retail component. The computer-implemented method wherein determining the fulfillment option includes: determining a geographic location of the user; determining a set of fulfillment facilities within a defined distance from the geographic location of the user; analyzing attributes of the set of fulfillment facilities using the processed information for the pharmacy component and the processed information for the retail component to determine a subset of the set of fulfillment facilities, the subset including those fulfillment facilities that have the pharmacy component and retail component of the order in stock; and determining the fulfillment option based on one or more of a prescription type of a prescription in the pharmacy component, an available fulfillment option at the subset of fulfillment facilities, and a user preference of the user. The computer-implemented method including: in response to updating the status of the order, coordinating, by the server, a time and a location of a pickup of the order based on a selected fulfillment option and the status of the order in the fulfillment system by communicating with the fulfillment system and the first computing device, including: receiving a status update notification from the fulfillment system, the status update notification including the status of the order, and transmitting a signal to the first computing device indicating to the first party to pick up the order at the time and the location. The computer-implemented method where coordinating the time and the location of the pickup includes: tracking, by the server, a geographic location of the first computing device; determining, by the server, a time of arrival of the first computing device at the location of the pickup based on the location of the first computing device; and transmitting, by the server, an instruction to the fulfillment system to deliver the order to the location of the pickup and receive the tracking token from the first computing device. The computer-implemented method including: generating, by the server, a second tracking token identifying the order and authorizing a second party to receive one or more of the pharmacy component and the retail component of the order, the second party corresponding to a user who submitted the order; transmitting, by the server, the second tracking token to a second computing device of the second party; and receiving, by the server, a signal indicating receipt of the second tracking token by the first computing device and an authorized transfer of the one or more of the pharmacy component and the retail component of the order to the second party. The computer-implemented method where processing the order for the pharmacy component includes: verifying, by the server, that a user submitting the order is authorized to fill a prescription in the pharmacy component on behalf of a patient of the prescription based on a user authorization record of the user or the patient; transmitting, by the server, a disclosure document of the prescription to a client device of the user for display to the user; and receiving, by the server, an electronic signature of the user indicating that the user has received the disclosure document. The computer-implemented method including: in response to receiving the signal indicating the receipt of the tracking token and the authorized transfer of the one or more of the pharmacy component and the retail component of the order, storing, by the server, the electronic signature in association with a record of the authorized transfer of the one or more of the pharmacy component and the retail component of the order to the first party; and where the client device corresponds to the first computing device and the user corresponds to the first party authorized by the tracking token.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BACKGROUND

The present disclosure relates to intelligent pre-processing and fulfillment of mixed orders. In particular, the present disclosure relates to intelligently preparing an order and determining fulfillment logistics for that order. In some implementations, the present disclosure relates to providing a system capable of accepting, processing, and fulfilling orders having both prescription pharmacy components and store front retail components.

Conventionally, in order for individuals to purchase items, they are required to travel to a physical store, search for the item, and wait in line to purchase the item. This process is exacerbated when the individuals fill a medical prescription, because they have to wait for the prescription to be filled, receive disclosures, and sign for the prescriptions. Recently, some pharmacies have allowed users to request that their prescriptions be filled via the phone or online, but when the individuals arrive at the store they still have to wait to pick up their order. However, these existing technologies still require substantial wait time for customers, does not allow customers to conveniently pre-order both pharmacy items and retail items in a single transaction, and requires numerous manual steps and different systems to process the order for fulfillment.

Further, some conventional means of purchasing or otherwise fulfilling online orders do not allow a computing system or server to track the possession of items in the order, so delivery, management, and cancelation cannot be accurately orchestrated from the server. This deficiency can be troublesome when the possession, fulfillment, or delivery of physical items is controlled, such as for controlled substances or prescriptions.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1A:
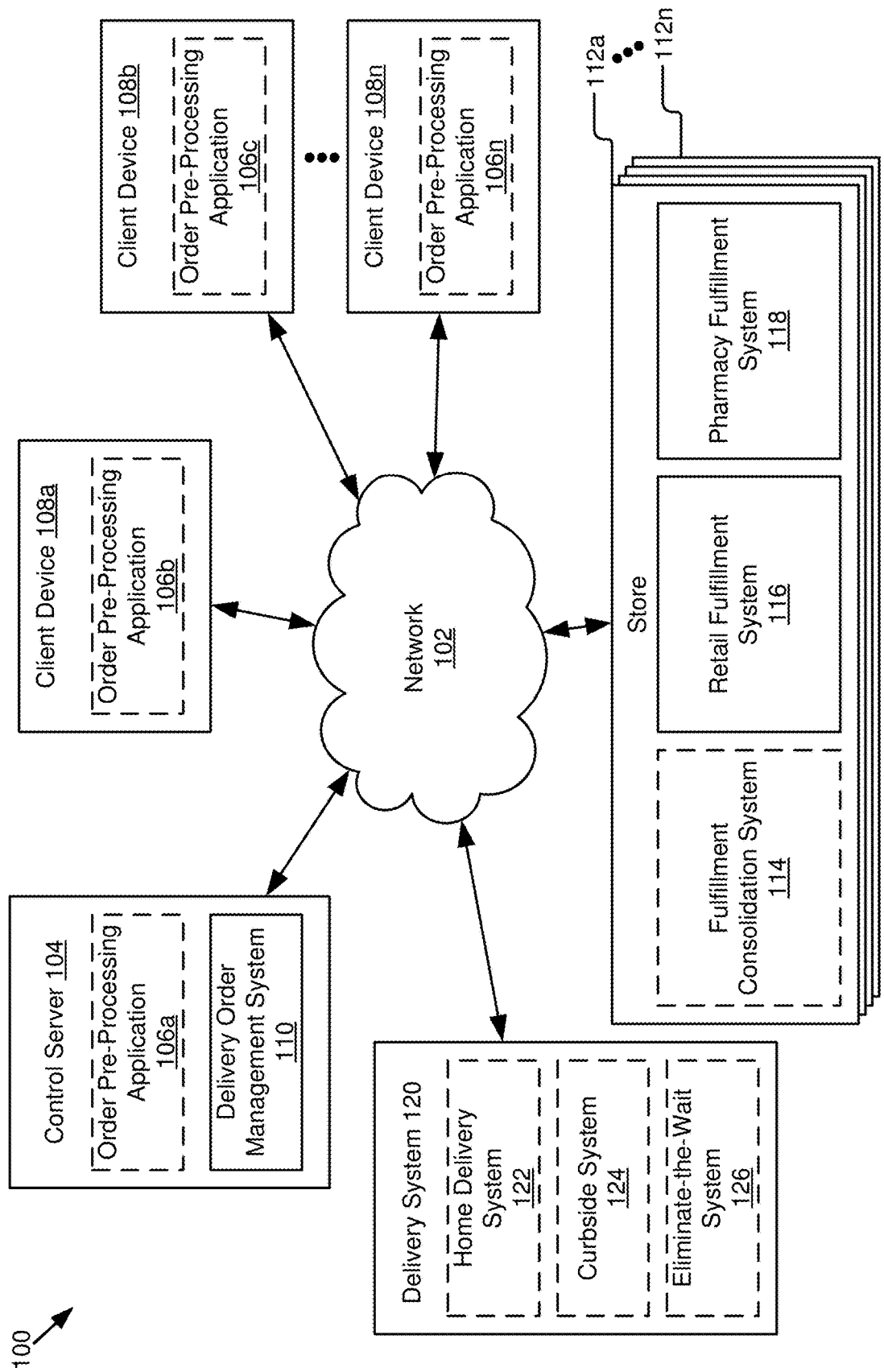
FIG. 1A is a block diagram of an example system for intelligent pre-processing and fulfillment of mixed orders.

As set forth in detail below, the technology described herein provides an innovative approach to processing and fulfilling orders. More specifically, the technology described herein may provide a system and method for intelligent pre-processing and fulfillment of mixed (e.g., containing pharmacy items and retail items) orders. For example, the technology described herein may determine information regarding prescription medications and, in some instances, retail items, evaluate prescription specific information, pre-process order logistics, and intelligently orchestrate fulfillment, and/or delivery of the prescription and/or retail items.

The technology described herein improves digital engagement of customers by providing digital tools (e.g., specific computer systems and software) to easily place an order, check the status of an order (e.g., of a prescription being filled), receive disclosures, sign for medication, and prepay for medication. In some instances, the technology tracks relationships to allow individuals to perform these actions on behalf of other individuals, such as in a caregiving relationship, as described elsewhere herein. Further, the digital tools allow the customer to perform these actions before visiting the store in order to provide an expedited pickup or delivery process.

The technology described herein may further provide the option to receive prescription medications, over the counter medications, and retail items through any one of multiple delivery methods. For example, the technology may allow the user to pick up their pre-processed order (which may include both pharmacy and retail items) in the store; have the order delivered curbside to the user's vehicle; or have the order delivered to the user (e.g., at home) using a delivery service (e.g., transportation network system or company—Uber®, Lyft®, postal service, same day delivery service, etc.). The technology provides various security hand offs to track the possession of medications or other pharmacy items, such as controlled substances, certain medications, etc., among the pharmacy, retail, and delivery systems and associates.

It should be noted that although this specification refers to retail prescriptions, the technology described herein is also applicable to PBM (a pharmacy benefit manager or third-party administrator of prescription drug programs), delivery (e.g., same day delivery) of mail order prescriptions via transfer to stores 112 or fulfillment centers, delivery (e.g., same day delivery) where the prescription may be put in the mail and retail items may be shipped separately from the store as part of the same order, etc.

For example, for specialty prescriptions (and/or, in some instances, other items) that may not be in stock at the store 112, the specialty prescriptions may be delivered (e.g., from another fulfillment or retail facility) to the store 112 and then picked up using the eliminate-the-wait system 126 or other delivery systems 120 and methods described herein. In some such implementations, the order preprocessing application 106 or delivery order management system ("DOMS") 110 may automatically determine an estimated availability time based on an estimated delivery time (e.g., from a separate fulfillment center) to the store 112 and/or delivery system 120 and/or the preparation time at the store 112 and/or delivery system 120. In some implementations, a same day transfer (e.g., using PBM or otherwise) may use a retail BOH (balance on hand) web based service to ensure an item is routed to an optimal fulfillment center based on stock levels and proximity (e.g., to the store 112, delivery system 120, or user), for example, based on a determination of the lowest cost or lowest time over fulfillment and delivery. A BOH web service may be a web service for providing proximity, stock levels, delivery availability and status, etc., among stores 112, fulfillment centers, etc., of various items.

These and other features may provide a substantially faster experience for customers, accurate online visibility of the status of an order, instructions defining clear responsibilities of stakeholders (e.g., pharmacy, retail, and delivery associates) for varying orders, reduced overall transaction time, increased digital engagement of the customer, and dynamically determined intelligent ordering and fulfillment processes based on factors, such as user preference, user behavior, type of medication, inventory, location of a store, etc.

Further, the techniques described herein allow a computer system to securely and reliably track digital representations of items while the possession and/or state of corresponding physical items changes. For instance, the techniques may create a ledger of digital assets and associated states of the digital assets to track physical assets and the states (e.g., completion or fulfillment level, delivery, possession, etc.) of the physical assets. Accordingly, not only are the pre-processing and fulfillment of orders expedited, but the tracking and verification of possession is authenticated in ways that are not possible using previous methods.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1A is a block diagram of an example system 100 for intelligent mixed order pre-processing and fulfillment. The illustrated system 100 may include a control server 104, one or more client devices 108a-108n, one or more stores 112a-112n, and a delivery system 120, which may be electronically communicatively coupled via a network 102 for interaction with one another, although other system configurations are possible including other devices, systems, and networks. For example, the system 100 could include any number of client devices 108, control servers 104, stores 112, delivery systems 120, and other systems and devices.

The network 102 may include any number of networks and/or network types. For example, the network 102 may include, but is not limited to, one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The client device 108 includes one or more computing devices having data processing and communication capabilities. The client device 108 may be coupled to communicate with other client devices and/or the other entities of the system 100 via the network 102 using a wireless and/or wired connection. Examples of client devices 108 may include, but are not limited to, mobile phones, smartphones, wearable smart devices (e.g., a smartwatch), tablets, laptops, desktops, netbooks, server appliances, servers, virtual machines, TVs, kiosks, in-vehicle computers (e.g., an automobile data or entertainment control system), etc. The system 100 may include any number of client devices 108, including client devices of the same or different type.

In some implementations, the client device 108 may include an order pre-processing application 106. A user of the client device 108 may use the input/output devices of the client device 108 to interact with the order pre-processing application 106 installed on the client device 108 or a browser, text messaging application, dedicated mobile application, push messaging service, etc., for interacting with the order pre-processing application 106 and/or DOMS 110.

The order pre-processing application 106 may include computer logic executable by a processor on a client device 108 or, in some implementations, the control server 104, to provide for user interaction, receive user input, present information to the user via a display, and send data to and receive data from the other entities of the system 100, for example, via the network 102. In some implementations, the order pre-processing application 106 may generate and present user interfaces based at least in part on information received from the control server 104. In some implementations, the order pre-processing application 106 may be an application coupled to communicate with the delivery order management system 110. For example, the e-order pre-processing application 106 may include a web browser and/or code operable therein, a customized client-side application (e.g., a dedicated application), a combination of both, etc. In some implementations, some or all of the components of the order pre-processing application 106 are operable on the control server 104, and the client device 108 may access the functionality of the order pre-processing application 106 using a web browser, text messaging application, or other application on the client device 108.

The order pre-processing application 106 may include a pharmacy application executable on a mobile device (e.g., a smartphone), a tablet, a laptop, or a desktop, or, in some implementations, the order pre-processing application 106 may include a mobile, tablet, or desktop web application. It should be understood that these other terms should not be construed as limiting and that the functionality of the order pre-processing application 106 may be distributed among one or more components of the system 100. While the descriptions herein include these and other procedures, it should be understood that the techniques apply to systems, such as a prescription management system, which may provide text and e-mail alerts, weekly or monthly statements or summaries, prescription benefit management, prescription savings or coupon management etc. It should also be understood that although the term pharmacy is used throughout this specification, other systems, retailers, etc., may use the techniques provided herein and that pharmacy is provided as an example.

The control server 104 may include an order pre-processing application 106 and/or a delivery order management system 110. In some configurations, one or more components of the control server 104 may be distributed over the network 102 on disparate devices in disparate locations or may reside at the same location. The DOMS 110 may be configured to provide functionality described throughout this disclosure for intelligent mixed order pre-processing and fulfillment. Example components of the DOMS 110 are described in reference to FIG. 1B.

The store 112 may include one or more computing devices having data processing and communication capabilities. In some implementations, the store 112 may have a central computing device that communicates with sub systems (e.g., 114, 116, and 118) and the DOMS 110. In other implementations, one or more component devices (e.g., 114, 116, and 118) of the store 112 may independently communicate with the DOMS 110. The store 112, the fulfillment consolidation system 114, the retail fulfillment system 116, and/or the pharmacy fulfillment system 118 may be coupled to communicate with the other entities of the system 100 via the network 102 using a wireless and/or wired connection. Examples of the devices 114, 116, and 118 may include, but are not limited to, mobile phones, smartphones, mobile scanners, barcode scanners, wearable smart devices (e.g., a smartwatch), tablets, laptops, desktops, netbooks, server appliances, servers, virtual machines, TVs, kiosks, point of sale or register systems, etc. The system 100 may include any number of stores 112, including devices of the same or different type. It should be noted that although the store 112 is referred to herein as "store," it may include any physical premises for fulfilling orders, such as a fulfillment center, fulfillment facility, a drugstore, or other locations that may fulfill and/or sell retail items and/or pharmacy items.

The retail fulfillment system 116 may include one or more computing devices (e.g., as described above) for use in communicating with the DOMS 110 and facilitating fulfillment of retail items, as described in further detail elsewhere herein. For example, the retail fulfillment system 116 may receive instructions for fulfilling the retail component(s) of an order, such as which retail items are in the order, attributes (e.g., size, number, etc.) of retail items, quantity of bags/packages in which to package the retail items, whether to deliver the retail items to the pharmacy or another location in the store 112 (or curbside, a freezer, a central drop off location, etc.), whether to refrigerate the retail items, when to retrieve, package, or deliver the items, whether the order also includes a pharmacy component, etc.

The pharmacy fulfillment system 118 may include one or more computing devices (e.g., as described above) for use in communicating with the DOMS 110 and facilitating fulfillment of pharmacy items (e.g., prescription medications, over the counter medications, and other pharmacy related items), as described in further detail elsewhere herein. For example, the pharmacy fulfillment system 118 may provide information for fulfilling the pharmacy component(s) of an order, such as identification of pharmacy items (e.g., medication (s)) are in the order, attributes of the pharmacy items, authorization data (e.g., which individuals are authorized to pick up a prescription), whether to refrigerate the pharmacy items, whether/when to mix the pharmacy items, whether the order also includes a retail component, whether a customer has electronically signed for a prescription, whether to offer counseling to a customer, etc.

The fulfillment consolidation system 114 may include one or more computing devices (e.g., as described above) for use in consolidating retail items and pharmacy items. For example, the fulfillment consolidation system 114 may receive a retail component of an order and a pharmacy component of an order for pickup by the user, deliver curbside to a vehicle of the user, and/or home delivery to a user.

In some implementations, one or more of the components 114, 116, and 118 may be configured to receive, generate, update, transmit, and/or validate a token to ensure that an order is complete, the online status is updated, and to ensure secure transfer of possession of controlled medications. For example, one or more of the components 114, 116, and 118, for example, may include an instance of or functionality of the tracking token generator 144 and/or tracking token modifier 146. As described in further detail elsewhere herein, a token may include a barcode or QR code, although other implementations are possible and contemplated herein, such as a radio frequency identification tag, digital security token, etc.).

In some implementations, the fulfillment consolidation system 114, retail fulfillment system 116, and/or pharmacy fulfillment system 118 may include a fulfillment application (not shown, also referred to herein as a pick and pack application) that may be installed on one or more of the devices 114, 116, and 118. The fulfillment application may allow a store associate (e.g., pharmacy associate, retail associate, cashier, fulfillment associate, delivery associate, etc.) to log in to the fulfillment application and receive information for fulfilling an order based on the associate's role/credentials. The fulfillment application may be the same application across the devices 114, 116, and 118, or may be customized for that device 114, 116, or 118 or an associate logged in to the device.

The delivery system 120 can host services such as a home delivery system 122, a curbside system 124, and/or an eliminate-the-wait system 126, which may be individual and/or incorporated into the services provided by the control server 104. For example, the delivery system 120 may communicate with the control server 104 (e.g., via the network 102) to send and receive order information, instructions, notifications, statuses, tokens, verifications, etc.

The home delivery system 122, the curbside delivery system 124, and/or the eliminate-the-wait system 126 may be computing systems configured to provide delivery and/or fulfillment services for the DOMS 110. For example, the home delivery system 122 may include a computing system for organizing and/or communicating with drivers of a home delivery service (e.g., Uber®, Lyft®, etc.); the curbside system 124 may include a computing system for organizing and/or communicating with associates of a curbside delivery or fulfillment service; and the eliminate-the-wait system 126 may include a computing system for organizing and/or communicating with associates of a store 112.

The control server 104 and/or the delivery system 120 have data processing, storing, and communication capabilities, as discussed elsewhere herein. For example, the control server 104 and/or the delivery system 120 may include one or more hardware servers, server arrays, storage devices and/or systems, etc. In some implementations, the control server 104 and/or the delivery system 120 may include one or more virtual servers, which operate in a host server environment.

It should be understood that the system 100 illustrated in FIG. 1A is representative of an example system and that a variety of different system environments and configurations are contemplated and are within the scope of the present disclosure. For instance, various operations and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 1B:
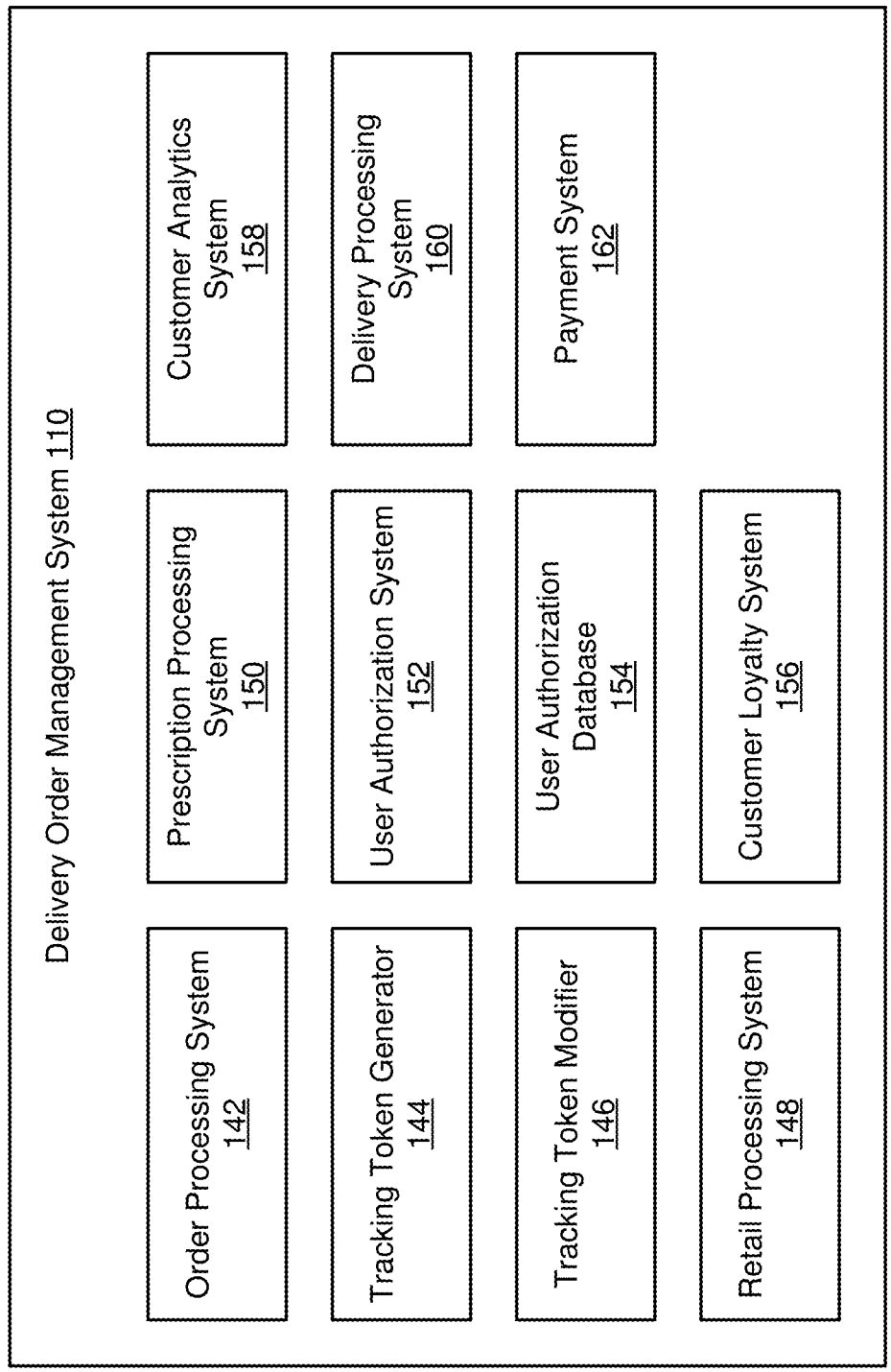
FIG. 1B is a block diagram of an example delivery order management system.

FIG. 1B is a block diagram of an example DOMS 110. In the illustrated example, the DOMS 110 includes an order processing system 142, a tracking token generator 144, a tracking token modifier 146, a retail processing system 148, a prescription processing system 150, a user authorization system 152, a user authorization database 154, a customer loyalty system 156, a customer analytics system 158, a delivery processing system 160, and/or a payment system 162. It is to be understood that although the DOMS 110 is illustrated in FIG. 1B as a single entity, the illustrated DOMS 110 and/or its components may represent a collection of functionalities, which can be instantiated as a single or multiple systems or modules, as desired.

It is to be understood that the components of the DOMS 110 can be instantiated (for example as object code or executable images) within a system memory (e.g., RAM, ROM, flash memory) of a computer system, such that when a processor of the computer system processes a component of the DOMS 110, the computer system executes the associated functionality. As used herein, the terms "computer system," "computer," "client," "client computer," "server," "server computer" and "computing device" mean one or more computers configured and/or programmed to execute the described functionality. Additionally, program code to implement the functionalities of the DOMS 110 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

The order processing system 142 may be configured to receive orders from an order pre-processing application 106, determine components of the orders, verify user credentials, and so forth, as described herein.

The tracking token generator 144 may be configured to generate a tracking token for use by other components of the system 100. For example, the tracking token generator may generate one or more tokens specific to an order. Accordingly, the components of the DOMS 110, store 112, and/or other components of the system 100 may use the tracking token to track the order, possession of items, progress of fulfillment, and/or secure transfer of information and/or prescriptions among the components of the system 100 (e.g., among the fulfillment consolidation system 114, the retail fulfillment system 116, the pharmacy fulfillment system 118), and/or delivery system 120. In some implementations, the tracking token may be a barcode, QR code, digital security token, key, or other token capable of verifying the authorization of users, and, in some implementations, being updated as the tracking token is passed among components of the system 100.

In some implementations, the tracking token generator 144 may generate the tracking token by encrypting the order identification information, user, patient, or other authorized person or device's information, transaction data, or other information that can be used to identify the authorized person, device, or transaction. In some implementations, the tracking token generator 144 may apply a hash function (e.g., Sha1, Sha256, Sha512, etc.) to some or all of the data in the tracking token. For instance, a tracking token may include data authorizing a user in a hashed form and data identifying the order in decrypted form. It should be noted that other methods of generating or encoding a tracking token are possible and contemplated herein.

In some implementations, the tracking token generator 144 or another component of the system 100, may be configured to validate the tracking token, for instance, by decrypting an encrypted portion of the tracking token. For instance, the tracking token may be validated by decrypting the tracking token using a hash function by which the tracking token was encrypted.

In some implementations, the tracking token includes or may be encoded in a barcode or QR code displayable on a screen associated with the retail fulfillment system 116 (or another component of the system 100) and the pharmacy fulfillment system 118 may scan the barcode/QR code and then verify the received token. In some implementations, the tracking token may be, be included in, or include a file transferred between the computing devices. The transfer of the tracking token serves to authenticate the associate or system receiving the items (and, in some implementations, the associate or system providing the items) and may also track the possession of the items by the DOMS 110. Accordingly, the state, online tracking status, or digital representation of the possession of the items may be accurately tracked by the DOMS 110, for example, when the tracking token is scanned/transferred between components of the system 100 when the items are moved or transferred. The tracking token receiving (or, in some instances, providing) computing device, upon receiving the tracking token from the retail fulfillment system 116, may record and store the tracking token, time and date stamp, identity of a receiving associate (e.g., the retail associate), identity of a providing associate (e.g., the pharmacy associate), retail fulfillment system 116 identifying data, pharmacy fulfillment system 118 identifying data, etc.

The tracking token modifier 146 may be configured to update tokens as they are passed among components of the system 100. In some implementations, the functionality of the tracking token modifier 146 may be contained within various components of the system 100 to update, verify, and/or transmit tracking tokens or, in some implementations, the components may be configured to communicate with the tracking token modifier 146 operable on the control server 104. For example, when a token is transferred (e.g., scanned) during transfer of an order containing a pharmacy item from a pharmacy fulfillment system 118 to a retail fulfillment system 116, the tracking token modifier 146 may update the tracking token with the details of the transfer, such as the time and/or date of the transfer and identification of the pharmacy associate and/or retail associate logged in to the pharmacy fulfillment system 118 or retail fulfillment system 116 at the time of the transfer. For example, when items in an order are transferred from a pharmacy to a delivery driver, the home delivery system 122 may transmit a token to the pharmacy fulfillment system 118, which may verify the tracking token and update the tracking token and/or status to indicate the transfer. Updating the tracking token may include changing the tracking token itself (e.g., changing the pattern on a QR code) or may include changing the contents of a file referenced by the tracking token.

The retail processing system 148 may be configured to process details about retail items that may be contained in an order, for example, based on the attributes of the retail items. For instance, the retail processing system 148 may determine the price, quantity, or availability at a particular store 112, instructions (e.g., whether to refrigerate, whether special handling instructions are applicable, etc.) for the retail items in an order.

The prescription processing system 150 may be configured to process details about pharmacy items (e.g., a prescription) that may be contained in an order, for example, based on the attributes of the pharmacy items. For instance, the prescription processing system 150 may determine whether a prescription is compatible with other prescriptions taken by a user, other contraindications, disclosures, special handling instructions (e.g., whether/when the prescriptions should be mixed or refrigerated), availability at a particular store 112, etc.

The user authorization system 152 may be configured determine whether a user is authorized to order and/or pick up a particular item, such as a prescription medication. In some implementations, the user authorization system 152 may determine whether the user has agreed to save and apply their signature (e.g., an electronic signature) to future prescriptions to further streamline pickup. In some implementations, the user authorization system 152 may evaluate whether a user is authorized for a particular prescription using a user authorization database 154. The user authorization database 154 may define, for a particular prescription, whether a doctor has authorized the prescription, how many refills are remaining, which users are authorized to pick up/accept the prescription, etc. For example, in some instances, a patient may delegate authority to pick up/accept a prescription to a caregiver (e.g., a spouse, child, parent, etc.). In some implementations, the delegation relationship may be encrypted into or referenced by a tracking token, so that the delegation authorization can be directly determined during a transfer, as described elsewhere herein. In some instances, the patient may define certain users to pick up a prescription on their behalf or a user-patient may define a third-party as authorized to pick up a prescription. For example, an authorized party may pick up or accept a prescription using a photo identification of that authorized party and/or, in some instances, a token sent to a client device of that authorized party by the patient, doctor, DOMS 110, etc.

The customer loyalty system 156 may be configured to track loyalty programs and promotions for a user. For example, the customer loyalty system 156 may track user details and preferences, store login information, store payment information, provide promotions to a user, etc.

The customer analytics system 158 may be configured to track and analyze user behavior and attributes. In some implementations, the customer analytics system 158 records user attributes, preferences, order contents, etc., and determines additional user details based on these elements. For instance, the customer analytics system 158 may track the retail items in past orders of a user and, using past orders of other users and a computer learning algorithm (e.g., a neural network, a Hidden Markov Model, etc.), predict desires and actions of that user relative to other retail items and promotions. The system 100 is beneficial for applying these computer learning methods, because it increases user participation in trackable online interfaces and enables the customer analytics system 158 to provide relevant suggestions and promotions to the user.

In some implementations, the customer analytics system 158 may track a user's typical order contents and/or delivery preferences to pre-process the order. For example, a user may refill an order without the user or the DOMS 110 having to determine details of the order, such as whether to deliver the order to the user's home, hold the order for pick up, etc. In some implementations, the customer analytics system 158 may use attributes of a prescription (as well as, in some instances, a user's typical actions/orders) to remind a user to fulfill a prescription. For example, the customer analytics system 158 may use the refill frequency of a prescription, number of refills remaining, etc., to automatically remind the user to refill a prescription.

The delivery processing system 160 may be configured to determine fulfillment and/or delivery operations based on attributes of an order, a user, a store, etc. In some implementations, the delivery processing system 160 may intelligently coordinate timing and execution of fulfillment and/or delivery by pre-processing an order using the attributes and communicating with the store 112 (or one or more of the components 114, 116, and 118) and/or the delivery system 120.

In some implementations, the delivery processing system 160 may use factors, such as attributes of a retail item (e.g., size, quantity, inventory), attributes of a pharmacy item (e.g., whether it is in stock at certain stores 112, whether it can be picked up or delivered, whether it needs to be refrigerated or pre-mixed, whether a home delivery driver is authorized to deliver that particular prescription), attributes of a store 112 (e.g., retail and/or pharmacy hours, location, location of relative the user's address, cost of items at that store, fulfillment and/or delivery capabilities, etc.), attributes of the user (e.g., address, payment options, delivery preferences, loyalty or promotional credits, authority to pick up a prescription, etc.), etc., to intelligently process and fulfill an order.

The delivery processing system 160 may feed user, order, and/or store 112 factors into a decision algorithm. In some implementations, the factors are fed into a decision tree for evaluating which fulfillment and/or delivery operations to perform for the particular set of factors. In some implementations, the factors may be weighted, for example, using dynamically calculated cost for each factor (e.g., the cost of an item at a store 112 against the cost of delivery from that store), administrator defined values, or dynamically using a computer learning algorithm (e.g., supervised or unsupervised learning, a neural network, etc.).

The payment system 162 may be configured to process payment for the order. In some implementations, the payment system 162 may intelligently process payment for all components (e.g., pharmacy items, retail items, delivery, taxes, etc.) of an order. For example, the payment system 162 may determine the prices of each component of the order at the specific store 112 from which the items are being fulfilled. In some implementations, the payment system 162 interacts with a point of sale system, a credit card processing system, or other financial system to complete a financial transaction for payment of the order. In some implementations, the payment system 162 may automatically charge eligible items to a health saving account (HSA) (HSA referrers to a health savings account herein but other account types, such as a flexible savings account (FSA) may also or alternatively be used) and the remaining, ineligible items to a credit card or other payment method. For example, a prescription medication may automatically be charged to an HSA (e.g., if provided by the user and specified by user preference) and retail items would be automatically charged to a credit card (e.g., even when the prescription and retail items are in the same order).

In some implementations, the order processing system 142, tracking token generator 144, tracking token modifier 146, retail processing system 148, prescription processing system 150, user authorization system 152, user authorization database 154, customer loyalty system 156, customer analytics system 158, delivery processing system 160, and/or payment system 162 may include computer logic operable to perform the operations described in further detail throughout this specification, for example, in reference to FIGS. 2A-7I.

Figure 2A:
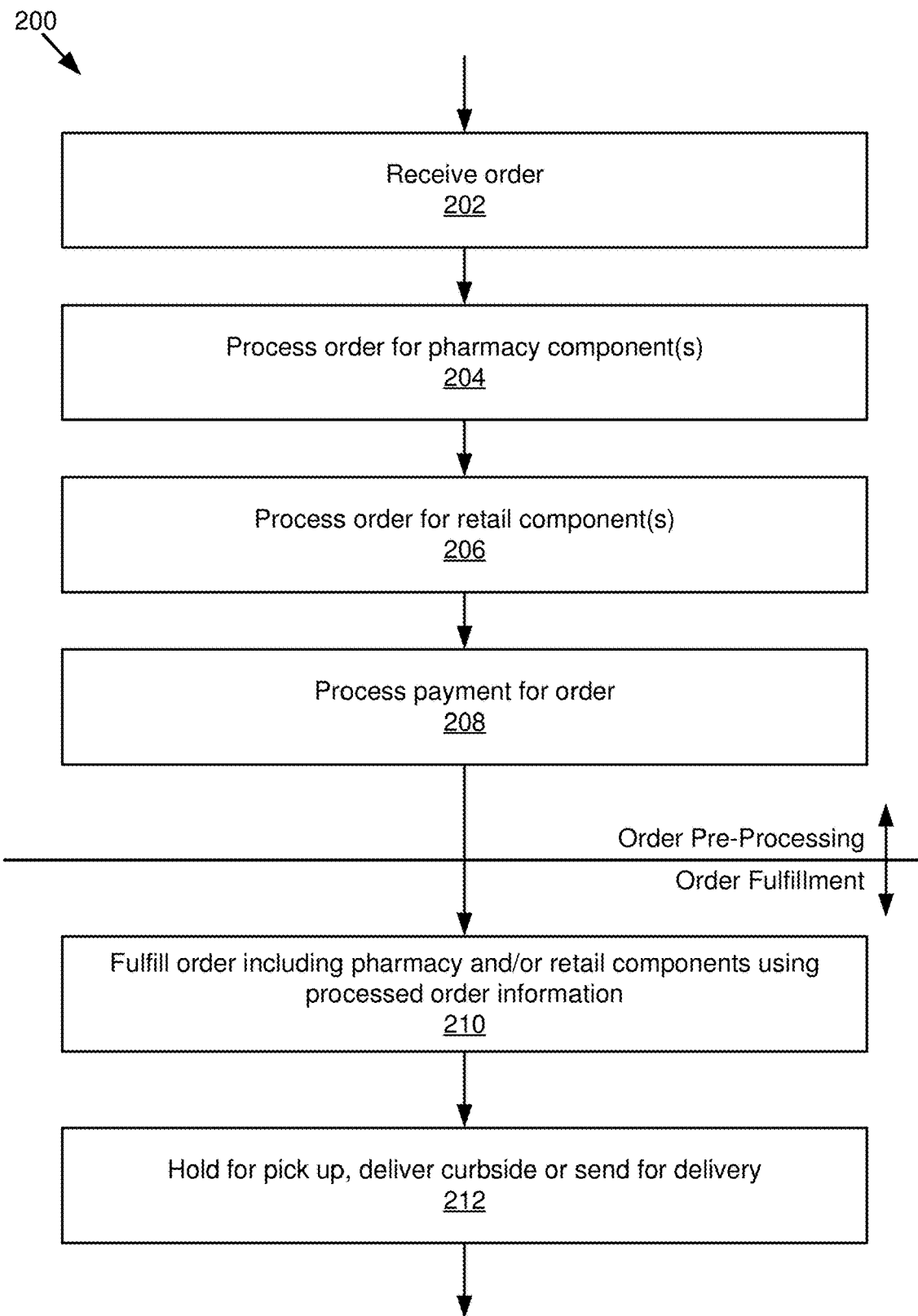
FIG. 2A is a flowchart of an example method for intelligent pre-processing and fulfillment of mixed orders.

FIG. 2A is a flowchart of an example method 200 for intelligent mixed order pre-processing and fulfillment. As illustrated, operations 202 through 208 may be performed as order pre-processing so that significant amounts of the prescription and retail order processing are performed prior to when the user arrives at the store 112 or before delivery. This is particularly advantageous because this eliminates wait for the customer so that order is ready for pickup with minimal interaction when the user arrives at the store 112.

At 202, the order pre-processing application 106 may receive the order. For instance, the user may send the order via short messaging service (SMS), multimedia messaging service (MMS), push service, e-mail, mobile application, mobile website, desktop application, or web access, etc. The order may contain one or both of a retail component and a pharmacy component.

At 204, the order pre-processing application 106 or the DOMS 110 processes the order for pharmacy component(s), such as determining prescription details, providing disclosures, verifying authorization, receiving signatures, and receiving payment, among other potential operations, as described in further detail below. At 206, the order pre-processing application 106 or the DOMS 110 processes the order for retail component(s), such as determining inventory or retail details, as described above. In some implementations, the DOMS 110, for instance, may generate tracking tokens for authenticating the transfer of items, as described in further detail elsewhere herein. It should be noted that the techniques and systems described can be applied to orders that do not contain both a pharmacy component and a retail component.

Example processes for order pre-processing are described in reference to FIGS. 2B, 2C, and 3A-4C, for example.

At 208, the order pre-processing application 106 or the DOMS 110 may process payment for the order. For instance, the DOMS 110 may process payment for both the prescription and retail components of the order. In some implementations, the order pre-processing application 106 or DOMS 110 may determine and provide certain order related information to the user, such as an estimated time that the order will be delivered or ready for pickup. For example, the DOMS 110 may determine a particular store 112 or delivery system's 120 opening and closing hours, estimated wait times, available colleague SLAs (service level agreements or descriptions of provided services), etc., and transmit these determined attributes to a client device 108 of the user to help the user select or prepare for a particular delivery option (e.g., eliminate-the-wait or hold for pickup, curbside, home delivery, drive through, etc.), as described in further detail elsewhere herein.

At 210, the store 112 and/or delivery system 120 may fulfill the order. For instance, the DOMS 110 may transmit order details and/or fulfillment instructions to the retail fulfillment system 116 to fulfill the retail component(s) of the order and to the pharmacy fulfillment system 118 to fulfill the pharmacy component(s) of the order using processed order information for the pharmacy and/or retail components of the order. Once the order has been prepared, the system provides the order for deliver and notifies the delivery system 120. Example methods for fulfilling the order are provided in greater detail below, for instance, in reference to FIGS. 2D and 6A-7I.

In some implementations, at 212, the DOMS 110 may communicate with a component of a store 112, delivery system 120, and/or client device 108 in order to orchestrate delivery of the order. For instance, the techniques described herein provide for the order to be held for pick up, for example using the eliminate-the-wait fulfillment method described herein (e.g., in reference to FIGS. 6A-6G).

Figure 2B:
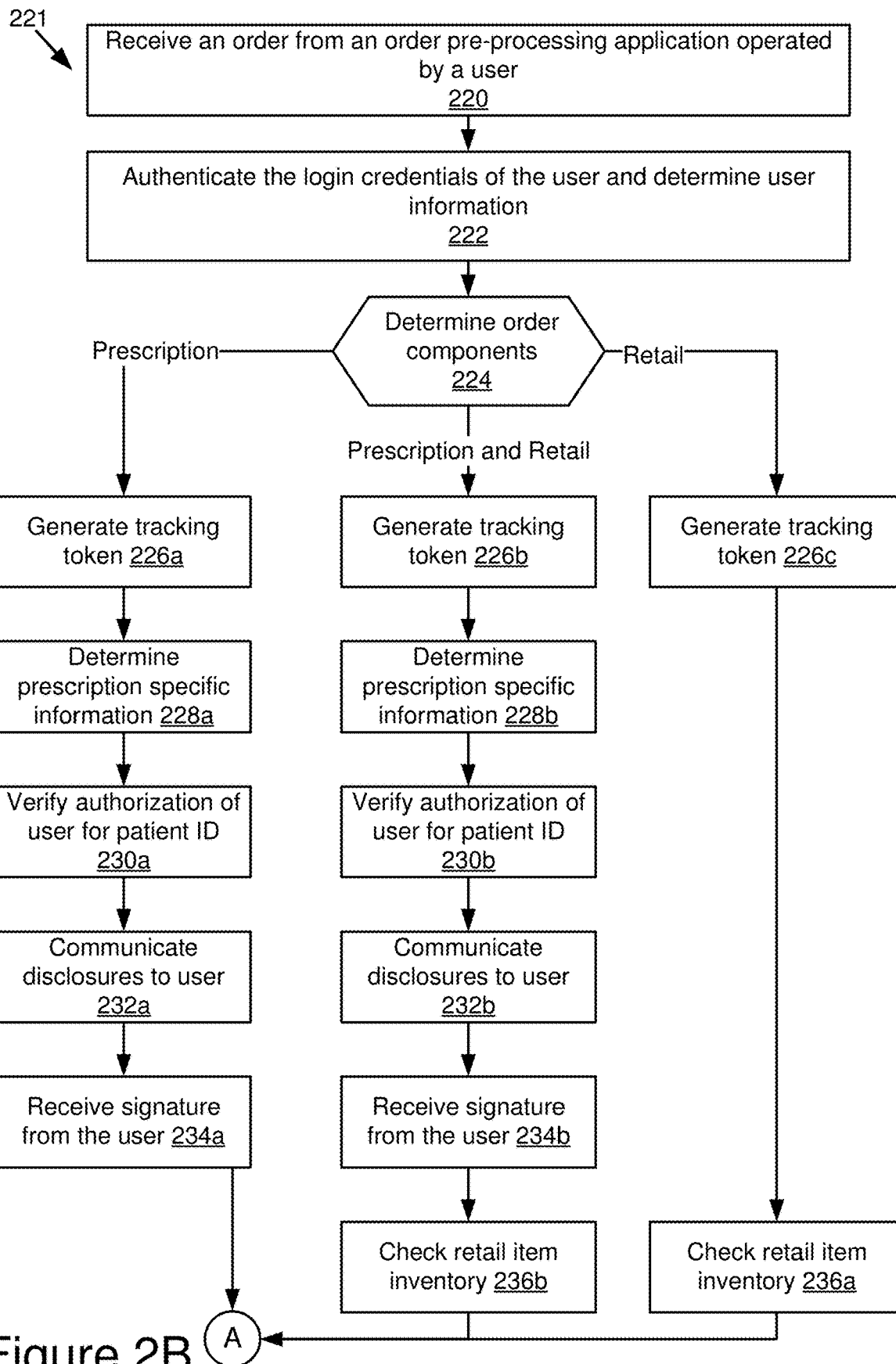
FIGS. 2B-2D are flowcharts of an example method for intelligent pre-processing and fulfillment of mixed orders.
Figure 2C:
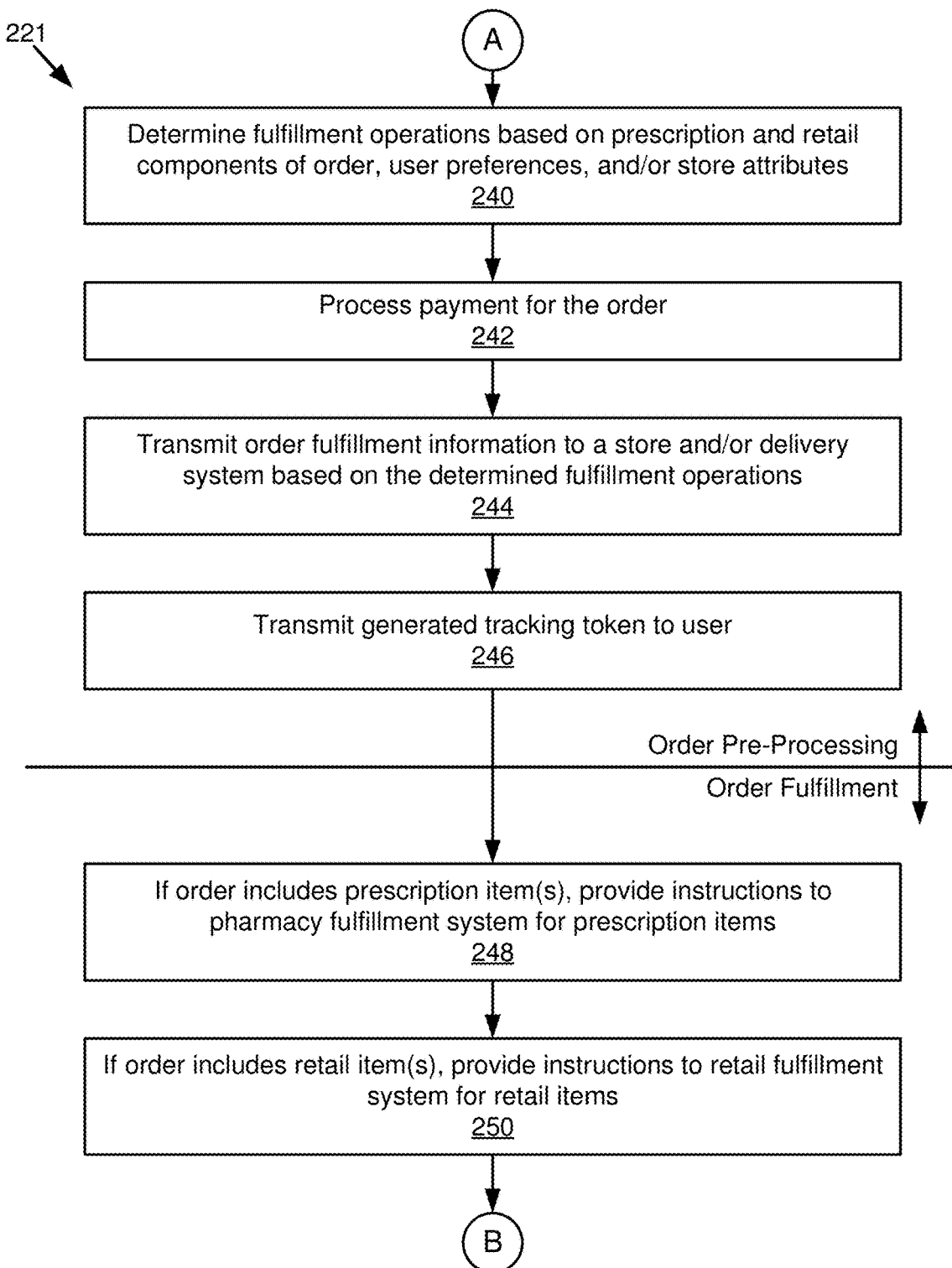
Figure 2D:
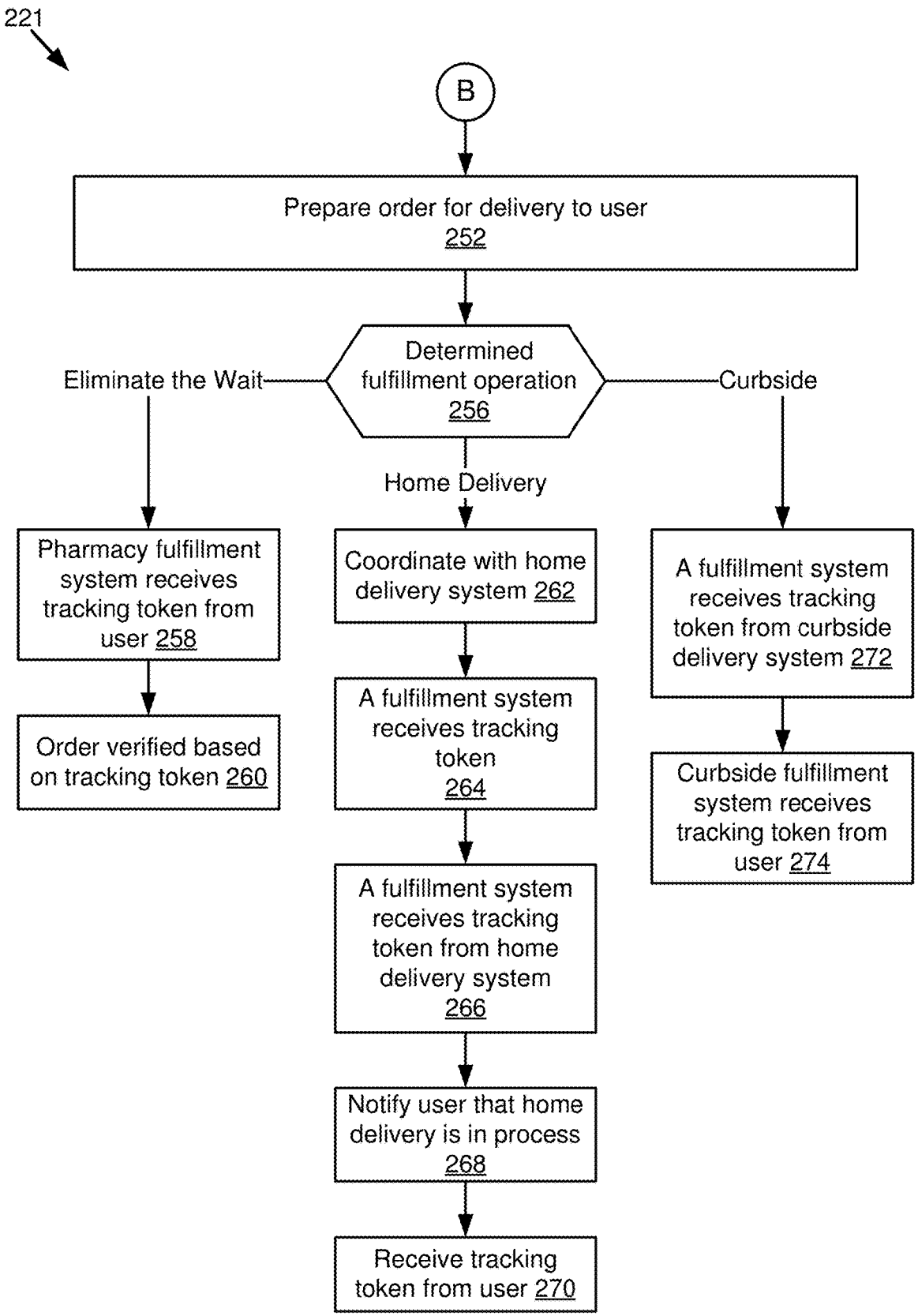

FIGS. 2B-2D are flowcharts of an example method 221 for intelligent mixed order pre-processing and fulfillment. The example method illustrated in FIG. 2B-2D allows processing of an order with both retail and pharmacy items, provides for online processing prior to sending the order to the store (e.g., of pharmacy items) to substantially speed up the checkout or delivery process, and provides an intelligent delivery process based on user preference, type of drug, location of user relative to a store 112, and/or other factors.

At 220, the DOMS 110 may receive an order from an order pre-processing application 106 operated by a user. In some implementations, the DOMS 110 may communicate with the order pre-processing application 106 to provide prices accurate to a store, receive accurate prescription information, and/or reorder previously ordered items. For example, as described elsewhere herein, the order pre-processing application 106 or the DOMS 110 may receive an order to refill a previously filled prescription and/or additional retail items. Similarly, the DOMS 110 may determine whether the user, order, and/or store 112 are eligible for one or more of the operations of the delivery system 120 (e.g., home delivery, curbside delivery, drive through pickup, or eliminate-the-wait pick up) and provide these options to the user as part of the order reception process.

At 222, the DOMS 110 may authenticate the login credentials of the user and determine user information. For example, the DOMS 110 may determine whether the username and password of the user are valid, retrieve loyalty data, user preferences, fulfillment and delivery preferences, eligible promotions, addresses, payment information, etc.

At 224, the DOMS 110 may determine order components of the order. For instance, the DOMS 110 may determine whether the order includes prescription items only, retail items only, or both prescription and retail items. As illustrated, in some implementations, if the DOMS 110 determines that the order contains prescription items, it may proceed through operations 226a, 228a, 230a, 232a, and/or 234a, for example. In some implementations, if the DOMS 110 determines that the order contains retail items, it may proceed through operations 226c and/or 236a, for example. In some implementations, if the DOMS 110 determines that the order contains prescription and retail items, it may proceed through operations 226b, 228b, 230b, 232b, 234b, and/or 236b, for example.

At 226, the DOMS 110 may generate a tracking token(s), as described above, to ensure that the order (e.g., order items and or information) is correctly and securely transferred among systems and individuals. Although not illustrated in FIGS. 2B-2D, the DOMS 110 may update the tracking token(s) as it is passed among components and as processing and/or fulfillment of the order proceeds. For example, the DOMS 110 may generate a tracking token identifying the order and authorizing a first party to receive one or more of the pharmacy component and the retail component of the order. For instance, generating the tracking token may include encoding order identification information into the tracking token. Accordingly, when the tracking token is scanned, the scanning device, or the DOMS 110 to which a signal (which may include or identify the tracking token) is sent, may use the tracking token to identify the order and the user and determine whether the user is authorized (e.g., using data stored in the tracking token or referenced by the tracking token). The generation, modification, validation, and use of tracking tokens is described in further detail elsewhere herein.

At 228, the DOMS 110 may determine prescription specific information. For example, as described above, the DOMS 110 may determine disclosures, inventory, contraindications, etc. In some implementations, the DOMS 110 may pre-check for patient and prescription issues (e.g., contraindications, whether to use a generic drug, cost over a threshold, etc.) and, in some instances, may resolve those patient or prescription issues. For instance, the DOMS 110 may transmit a message to the patient, pharmacist, and/or the patient's doctor indicating that prescriptions that a user is prescribed are not compatible or that a particular prescription may cause problems with a health condition of that user. The DOMS 110 may check the prescriptions and conditions against a database of conditions and prescriptions and use rules to evaluate those prescriptions and conditions.

At 230, the DOMS 110 may verify authorization of the user for a patient ID. For instance, the DOMS 110 may determine a patient identification for each prescription in an order and check to see whether the user (e.g., as identified at 220) has the authority to fill, pick up, view details of, accept, etc., the prescription for that patient ID. For instance, the DOMS 110 may verify that a user submitting the order is authorized to fill a prescription in the pharmacy component on behalf of a patient of the prescription based on a user authorization record of the user or the patient.

At 232, the DOMS 110 may communicate disclosures to the user. For example, the DOMS 110 (e.g., by the prescription processing system 150) may determine the disclosures regarding side effects, prescription instructions, etc., determined at 228 and transmit them in a disclosure document pertaining to a prescription to the client device 108 of the user for display to the user.

At 234, the DOMS 110 may receive signature(s) from the user regarding the prescription disclosures, etc., presented to the user at 232. In some implementations, the DOMS 110 may capture the user's signature (e.g., an electronic signature indicating that the user has received the disclosure document) when submitting the order and a record of the date, time, or type of the signature submission, along with the details of the user who signed, are stored. In some implementations, the DOMS 110 may instruct the user to answer prompts typically provided in store, for example, to verify the identity of the user (e.g., for a fraud check), the user's understanding of the disclosures, etc. In some implementations, a signature or a reference to a signature may be encoded into the tracking token.

In some implementations, the order pre-processing application 106 or DOMS 110 may transmit the captured signature to the pharmacy fulfillment system 118 when the order is delivered (e.g., as indicated by receiving a tracking token from the user). For example, a user's e-signature may be stored in a similar way to signing a credit card reader, so that the signature may be available via standard auditing tools and may expedite the checkout process. For instance, in response to receiving a signal indicating the receipt of the tracking token and the authorized transfer of the an item in the order, the order pre-processing application 106 or DOMS 110 may store the electronic signature in association with a record of the authorized transfer of the order.

At 236, the DOMS 110 may check the retail item inventory and any retail item specific instructions, such as refrigeration directions, packaging directions, etc.

At 240, the DOMS 110 may determine fulfillment operations based on prescription and retail components of the order, user preferences, and/or store attributes. In some implementations, as described in additional detail above, the DOMS 110 may determine which fulfillment and/or delivery operations are to be used (or offered to the user) for homogenous (e.g., all pharmacy or all retail) or mixed pharmacy and retail orders, for example, based on the capabilities of the particular store 112, availability of delivery options (e.g., availability of a qualified delivery person), distance between the store 112 and the user's address, pharmacy hours, prescription types, etc.

In some implementations, the DOMS 110 may determine an available fulfillment option based on an attribute of a user who submitted the order and processed information for the pharmacy component and the processed information for the retail component. In some instances, the DOMS 110 may determine the fulfillment option based on a location of a user, available fulfillment options, a prescription type, availability of items and a facility, etc. For example, the DOMS 110 may determine a geographic location of the user (e.g., based on user input or location of a client device 108) and determine a set of fulfillment facilities (e.g., stores 112) within a defined distance from the geographic location of the user. The DOMS 110 may analyze attributes of the set of fulfillment facilities using processed information for the pharmacy component and/or the retail component of the order to determine a subset of the set of fulfillment facilities that have the pharmacy component and retail component of the order in stock. The DOMS 110 may then determine a fulfillment option based on one or more of a prescription type of a prescription in the pharmacy component, an available fulfillment option at the subset of fulfillment facilities, and a user preference of the user. For instance, certain prescription types may include an attribute or flag indicating that they are highly controlled and cannot be handled by a delivery service (e.g., using a home delivery system 122). In some instances, some fulfillment facilities may have different available fulfillment options than other fulfillment facilities, which may be stored as a fulfillment facility attribute in a database accessible by the order pre-processing application 106 and/or DOMS 110).

At 242, the DOMS 110 may process payment for the order. In some implementations, the DOMS 110 may intelligently process the payment using different payment types, as described herein and in the attached drawings. In some implementations, the DOMS 110 may dynamically determine the price for the items, delivery options or costs (e.g., based on method, distance, timing, etc.), user (e.g., based on loyalty status, age, insurance, etc.) for the user, and so forth. In some implementations, the payment processing functionality may have integrated thereto a fraud detection system. For instance, fraud detection system may be configured to authenticate a user's identity and/or payment information. For example, the fraud detection system may use Completely Automated Public Turing test to tell Computers and Humans Apart (CAPTCHA) or other method to evaluate if whether the user is a human, personalized questions to verify user identity, etc. It should be understood that this may include processing the payment by interacting with credit card systems, point-of-sale systems or other external financial institutions payment systems.

At 244, the DOMS 110 may transmit order fulfillment information to a store 112 and/or delivery system 120 based on the determined fulfillment operations. In some implementations, the order fulfillment information may be automatically transmitted to a default store 112 and/or delivery system 120 based on user preferences or user profile information. In some implementations, the order fulfillment information may be alternatively transmitted to an alternate store 112 and/or delivery system 120, for example, to provide delivery to the user at a vacation, work, or other location.

At 246, the DOMS 110 may transmit the generated tracking token to a computing device associated with a party authorized by the tracking token. In some implementations, the tracking token may be transferred to a client device 108 of an authorized user or patient, to a delivery system 120 of an authorized delivery person, a retail fulfillment system 116 (e.g., a pick-and-pack device of the retail fulfillment system 116) of an authorized retail associate, or a pharmacy fulfillment system 118 (e.g., a pick-and-pack device of the pharmacy fulfillment system 118) of an authorized pharmacy associate.

For instance, the tracking token may allow the user to retrieve the order, including any prescriptions in the order, by verifying, for example, that the user has paid for the order, has accepted the disclosures, signed for the prescription, or is authorized to pick up or accept the prescription, etc. The DOMS 110 may also transmit tracking tokens to other components of the system 100 to track and verify the transfer of the order/items in the order, for example, as described elsewhere herein. In some implementations, tracking tokens transmitted to various components of the system 100 may be the same as each other and may be updated as the order/order items are transferred. In some implementations, the tracking tokens provided to each component of the system 100 may be different from each other, but configured to verify transfer of the order/order items to that component.

At 248, if the order includes prescription items, the DOMS 110 may provide instructions the pharmacy fulfillment system 118 for prescription items. For instance, the instructions may include prescription information (e.g., prescription name, quantity, generic version, etc.), handling instructions (e.g., mixing, refrigeration, etc.), whether the order also includes retail items, delivery type (e.g., home delivery, curbside delivery, or eliminate-the-wait pick up) etc., to an automated system or for display to a pharmacy associate for use in preparing the prescription. It should be noted that, although the term "home" delivery may be used herein, the delivery may be alternatively made to another location, such as a business, location of choice, etc.

At 250, if the order includes retail item(s), the DOMS 110 may provide instructions to the retail fulfillment system for the retail items. For instance, the instructions may include packaging instructions, whether the order also includes retail items, delivery type (e.g., home delivery, curbside delivery, or eliminate-the-wait pick up), etc., to an automated system or for display to a retail associate for use in preparing the retail items.

At 252, the store 112 may prepare the order for delivery to the user. The order items may be gathered at the pharmacy, a retail location (e.g., the front of the store 112, a point of sale, etc.), or at a fulfillment consolidation location of the fulfillment consolidation system 114.

In some implementations, the retail fulfillment system 116 may prepare (e.g., pick and pack) the retail items, the pharmacy fulfillment system 118 may prepare the pharmacy items, and a retail associate may bring the retail items to the pharmacy for consolidation at the pharmacy. In such an implementation, the pharmacy fulfillment system 118 may scan a label, barcode, etc., of a package or bag containing the retail items to ensure that the retail component of the order is complete and accurate and to mark the fulfillment of the retail component of the order as complete.

In some implementations, the retail fulfillment system 116 may prepare the retail items, the pharmacy fulfillment system 118 may prepare the pharmacy items, and a pharmacy associate may bring the pharmacy items to the retail location for consolidation at the retail location. Alternatively, the retail associate may be notified upon completion of the preparation of the pharmacy items and may retrieve the pharmacy items. In such an implementation, the pharmacy fulfillment system 118 may receive a token of the retail associate (e.g., generated or received by the retail fulfillment system 116) and verify that the pharmacy items have been transferred and that the retail fulfillment system 116 has possession of the pharmacy items. In another implementation, the retail fulfillment system 116 may receive a token of the pharmacy fulfillment system 118 to perform the tracking and verification operations.

In some implementations, when an order is prepared or completed, appropriate notifications may be sent to a client device 108 of a user, a DOMS 110, a delivery system 120, etc. For example, a user may be notified with the order is ready to be picked up, when the order has been picked up (e.g., by a home delivery system 122 or curbside system 124), when the order will be delivered, etc.; a home delivery system 122 driver may be notified when the order is ready to be picked up; or a curbside system 124 associate may be notified when an order is ready and/or when a user has arrived curbside at the store 112 to receive the order. It should be noted that the systems and methods described herein can be used to trigger and provide notifications at any stage or to any system or individual participating in the order placement, fulfillment, or delivery process, in order to streamline fulfillment and delivery of orders, especially those orders that contain both retail and pharmacy components.

The DOMS 110 may identify whether an order contains retail items, pharmacy items, or a combination thereof. The DOMS 110 or and/or a fulfillment system (e.g., 114, 116, or 118) may track preparation of the components of the order and, in some implementations, hold customer notifications for each component of the order until both the prescription and retail items, as applicable, are completed (or at a stage at which to send a notification to a user) in order to optimize customer messaging systems. For example, the techniques described herein significantly decrease the amount of computing resources and network traffic used to place and track an order, and provide status notifications to a client device 108 of a user.

In some implementations, the retail fulfillment system 116 may prepare the retail items and bring them to a fulfillment consolidation system 114, and the pharmacy fulfillment system 118 may prepare the pharmacy items and bring them to the fulfillment consolidation system 114. In such an implementation, the fulfillment consolidation system 114 may receive tokens from the retail fulfillment system 116 and/or the pharmacy fulfillment system 118 to verify the accuracy of the order being fulfilled and track the transfer of order items, such as the secure transfer of prescription items among authorized systems and associates.

It should be understood that these preparation implementations are provided as examples and that other implementations are possible and contemplated herein.

At 256, the fulfillment continues according the determined fulfillment operation (e.g., according to the intelligence and/or user preferences, as described above). If the fulfillment operation includes eliminate-the-wait pick up, the method continues with operations at 258 and 260, for example. If the fulfillment operation includes home delivery, the method continues with operations at 262, 264, 266, 268, and 270, for example. If the fulfillment operation includes curbside delivery, the method continues with operations at 272 and 274, for example.

At 258, the pharmacy fulfillment system 118 (or another component, such as 114 or 116, as described above) may receive a tracking token from a user and, at 260, the order is verified based on the tracking token. The user may have printed off the tracking token as a barcode, QR code, printed alpha-numeric code, etc., or may provide the code digitally via Bluetooth®, near field communication, or by showing a barcode, QR code, etc., on the display of a client device 108 (e.g., a smartphone of the user), for example. Upon receiving the tracking token, the pharmacy fulfillment system 118 (or another receiving device, such as a retail fulfillment system 116, fulfillment consolidation system 114, eliminate-the-wait system 126, etc.) may verify the code, including the authorization of the user to pick up the order, and give the completed order to the user.

In some implementations, the DOMS 110 may receive a signal indicating receipt of the tracking token and an authorized transfer of the one or more of the pharmacy component and the retail component of the order to an individual authorized by the tracking token. For instance, the computing device receiving the tracking token may authenticate locally, or by communicating with another device, the tracking token and allow a transfer of the possession of some or all of the items of the order to the authorized person. The computing device may then send a signal to the DOMS 110 indicating that the item, order, or portion of the order has experienced an authorized transfer of possession. In some implementations, the computing device receiving the tracking token may transmit the tracking token to the DOMS 110, which may receive the tracking token, validate the tracking token (e.g., as described above), and transmit a signal to the computing device indicating that the tracking token is validated, or has failed validation.

In some implementations, upon receiving the signal or the tracking token indicating the that the tracking token has been received and an authorized transfer has taken place, the DOMS 110 (e.g., by the order processing system 142, retail processing system 148, prescription processing system 150, delivery processing system 160, or another component of the DOMS 110) may update the status of the order, items, or portion of the order (e.g., corresponding to a pharmacy component, retail component, or a set of items represented by a label) in a database.

In some implementations, the pharmacy fulfillment system 118 may include an automated dispensing machine configured to dispense the order in response to receiving the tracking token (e.g., the availability to use an automated dispensing machine may depend on the specific attributes of the store 112 or prescription, for example). Thus, the user need not perform any action other than provide the tracking token to receive the completed order, which may include both pharmacy items and retail items. In some implementations, such as when a network connection is not available or reliable, the name of the user or person authorized to receive the order may be provided with the order information, so that the pickup of the order may be verified using traditional methods (e.g., checking an identification of the user). It should be understood that the process described for blocks 258 and 260 may be performed by the pharmacy fulfillment system 118, the retail fulfillment system 116, the fulfillment consolidation system 114, or another component of the system 100, depending on the implementation.

It should be noted that the operations described in reference to 258 and 260 may additionally or alternatively be used to track and authenticate transfer of items at other operations of the methods described herein. For instance, the same processes may be used in a transfer between systems and/or associates, as indicated elsewhere herein, such as during a transfer between a pharmacy associate and a retail associate; a pharmacy or retail associate and a fulfillment consolidation system 114 associate; a pharmacy, retail, or fulfillment associate and a user/patient or a delivery system 120 (e.g., delivery person or driver); or a delivery system 120 and a user/patient, etc., although other implementations are possible and contemplated in the techniques described herein.

At 262, the DOMS 110 and/or a component of the store 112 (e.g., 114, 116, or 118) may coordinate with the home delivery system 122. For example, a request to pick up and deliver the order may be sent to the home delivery system 122. Additionally, a tracking token may be sent to the home delivery system 122, for instance, as described in reference to FIGS. 7A-7I.

In some implementations, the DOMS 110 (e.g., by the delivery processing system 160) may, in response to updating the status of the order (e.g., by a component, or based on another status update), coordinate a time and a location of a pickup of the order based on a selected fulfillment option and the status of the order in the fulfillment system by communicating with a component 114, 116, or 118 of the store 112 and the home delivery system 122.

For example, the DOMS 110 may receive a status update notification including the status of the order from a component 114, 116, or 118 of the store 112 (e.g., based on receipt of a tracking token or signal indicating receipt of a tracking token, as described in FIGS. 6A-7I), and may transmit a signal to the home delivery system 122, which may, in implementations where a human is involved in the delivery, indicate to a delivery service associate (e.g., driver or other delivery person) to pick up the order at the time and the location. For instance, the DOMS 110 may track a geographic location of a computing device, such as a home delivery system 122 or mobile device of a delivery associate linked to the home delivery system 122. The DOMS 110 may determine a time of arrival of the computing device at the location of the pickup (e.g., the store 112, a particular parking space, etc.) based on the location of the computing device. For instance, the DOMS 110 may use a current location of the computing device, the pickup location, map data, or traffic data in determining an estimated time of arrival. In some instances, the DOMS 110 may transmit an instruction to a component of the system 100 to deliver the order to the location of the pickup and receive the tracking token from the computing device. For example, the DOMS 110 may transmit a notification to the fulfillment consolidation system 114, retail fulfillment system 116, pharmacy fulfillment system 118, or another component of the system 100, for instance, as described in further detail below, indicating that the delivery associate has arrived or will arrive at a given time (e.g., a threshold time from the time of the notification) at the pickup location.

Although the operations at 262 are described in reference to the home delivery system 122, in some implementations, these operations may additionally or alternatively be used to coordinate delivery to a user or patient, for instance, in a curbside delivery using the curbside system 124 and/or the client device 108 (e.g., using the location of the client device 108 instead of the home delivery system 122, as described in reference to 262).

At 264, the pharmacy fulfillment system 118, the retail fulfillment system 116, or the fulfillment consolidation system 114 receive a tracking token and an indication that the order is complete. The pharmacy fulfillment system 118, the retail fulfillment system 116, or the fulfillment consolidation system 114 is also notified that the home delivery system 122 has been selected for delivery. The fulfillment system may verify the validity of the tracking token and record the transfer of the order and that it is being held for transfer to the home delivery system 122.

At 266, the pharmacy fulfillment system 118, the retail fulfillment system 116, or the fulfillment consolidation system 114 receive the tracking token the home delivery system 122 as the order items are transferred to the driver of the home delivery system 122. At 268, the DOMS 268 may notify the user that home delivery is in process.

At 270, upon delivery to the user by the driver of the home delivery system 122, the home delivery system 122 (e.g., via a computing device carried by the driver of the home delivery system 122) may receive the tracking token from the user, thereby confirming delivery to the user. The home delivery system 122 may verify the validity of the tracking token and record the transfer. For instance, in the same way as described in reference to 226 above, the DOMS 110 may generate a second tracking token identifying the order and authorizing the user (e.g., separate from or in addition to a delivery associate), transmit the tracking token to the client device 108, and receive a signal indicating receipt of the tracking token and authorized transfer of possession of all or a portion of the order.

At 272, the pharmacy fulfillment system 118, the retail fulfillment system 116, or the fulfillment consolidation system 114 receive a tracking token and an indication that the order is complete. The pharmacy fulfillment system 118, the retail fulfillment system 116, or the fulfillment consolidation system 114 is also notified that the curbside delivery system 124 has been selected for delivery. The fulfillment system may verify the validity of the tracking token and record the transfer of the order and that it is being transferred to the curbside delivery system 124. The curbside delivery system 124 will secure and hold the completed order until it is delivered to the user.

At 274, either the pharmacy fulfillment system 118, the retail fulfillment system 116, or the fulfillment consolidation system 114 receive the tracking token the curbside delivery system 124 as the order items are transferred to the user from the curbside delivery system 124. The fulfillment system may verify the validity of the tracking token and record the transfer.

Figure 2E:
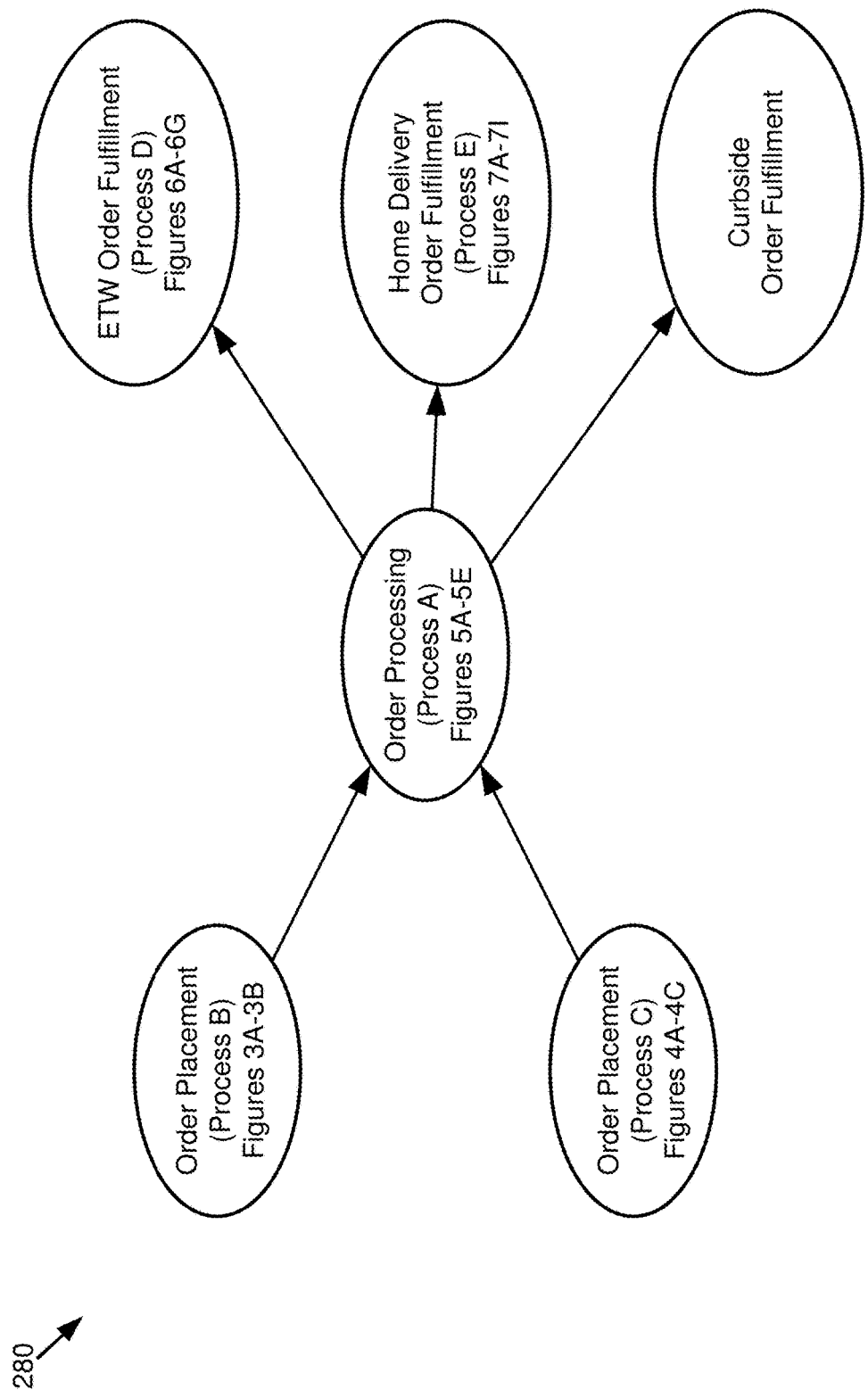
FIG. 2E is a block diagram illustrating an example interrelationship of the processes illustrated in FIGS. 3A-7I.

FIG. 2E is a block diagram 280 illustrating an example interrelationship between the processes illustrated in FIGS. 3A-7I. In the depicted example implementation, the order placement process B, illustrated in FIGS. 3A-3B, and order placement process C, illustrated in FIGS. 4A-4C may feed into order processing, process A. Process A, illustrated in FIGS. 5A-5E, may feed into eliminate-the-wait order process D, illustrated in FIGS. 6A-6G, home delivery process E, illustrated in FIGS. 7A-7I, or a curbside order fulfillment process (e.g., as described above and in reference to FIGS. 7A-7I).

Figure 3A:
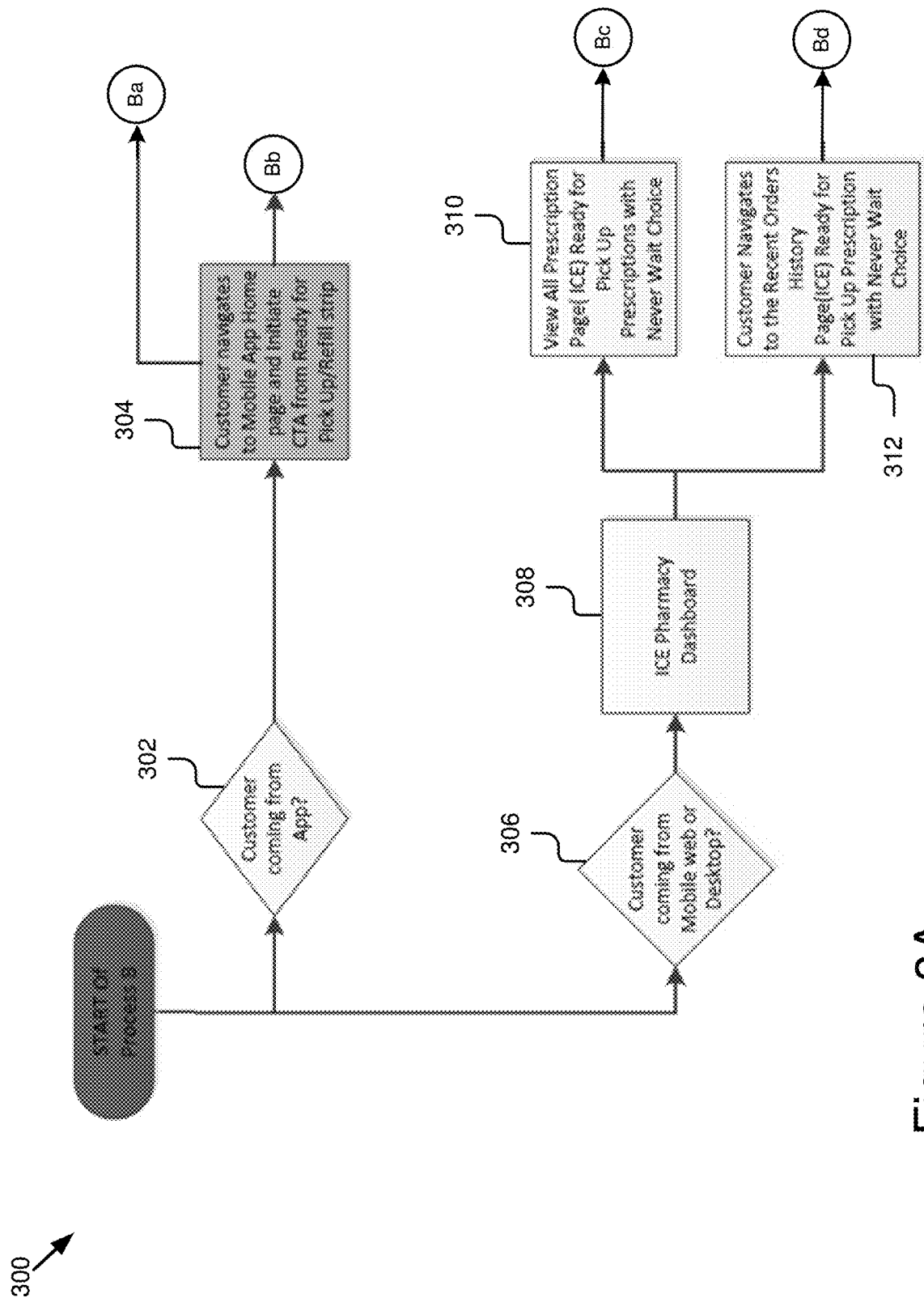
FIGS. 3A-3B are flowcharts of an example method for ordering items using the delivery order management system.
Figure 3B:
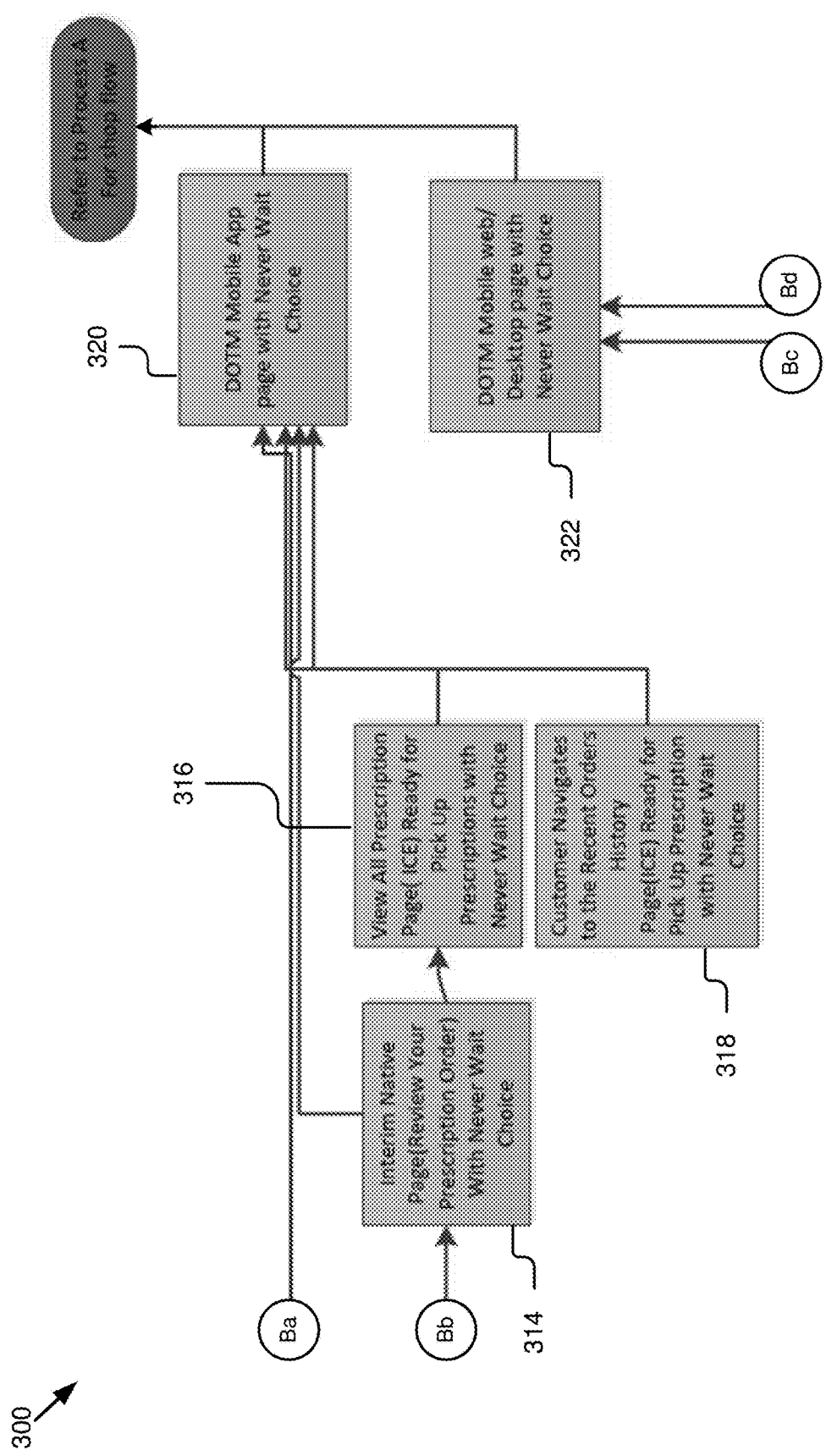

FIGS. 3A-3B are flowcharts of a first example method 300 for ordering items (Process B). According to some implementations, the example method 300 depicted in FIGS. 3A-3B illustrates an ordering process executed using the order pre-processing application 106, the DOMS 110, and/or distributed between the order pre-processing application 106 and the DOMS 110. For example, the method in FIGS. 3A-3B allows a user to order or reorder items.

In some implementations, at 302, the order pre-processing application 106 may determine whether the customer/user is coming from a mobile application (e.g., executable on a mobile client device 108, such as a smartphone, tablet, etc.), and, in response, at 304 may provide a graphical interface including a mobile application home page. The order pre-processing application 106 may provide a graphical element including a call-to-action rendered on the mobile application home page or a page linked from the application home page.

In some implementations, at 306, the order pre-processing application 106 may determine whether the user is coming from a mobile web or desktop web interface and, at 308, may direct the user to a pharmacy dashboard, which may provide graphical interfaces allowing the user to view items, past orders, etc., and/or order or re-order items, prescriptions, etc. For instance, at 310, the order pre-processing application 106 may provide a graphical interface showing all or a sub-set of prescriptions that are available for a user and/or that are ready for pick up or delivery, as described herein. In some instances, the graphical interface may indicate which of the items in the order are eligible for the efficient pre-processing and fulfillment options described herein. In some instances, the application 106 may provide a fulfillment choice including a choice among the "eliminate-the-wait," "home delivery," and "curbside" fulfillment options described herein. Additionally or alternatively, at 312, the order pre-processing application 106 may provide interfaces through which a user can navigate to display a history of recent orders. In some implementations, the interface depicting the history of orders may allow a user to reorder a prescription and/or indicate which of the orders are ready for pick-up using the techniques described herein (e.g., using processes D or E, for instance).

At 314, the order pre-processing application 106 may provide an interface that allows the user to review orders and, at 316 and 318, the order pre-processing application 106 may perform the operations described in reference to 310 and 312, respectively.

At 320, the order pre-processing application 106 may display a DO™ mobile application page with a fulfillment choice. At 322, the order pre-processing application 106 may display the DO™ mobile web or desktop page with a fulfillment choice. A DO™ (Delivery and Order Tracking—Mobile) page may include one or more graphical interfaces for providing information to a user regarding an order and/or delivery of the order and, in some instances, receiving input from the user regarding the order. For example, a DO™ page may display order details including potential fulfillment options (e.g., fulfillment options may be automatically determined and displayed to the user, as described elsewhere herein). It should be noted that although the DO™ is described as referring to a mobile application or webpage, in some implementations, the DO™ may be sent or rendered for display on a desktop or other computing device.

Figure 4A:
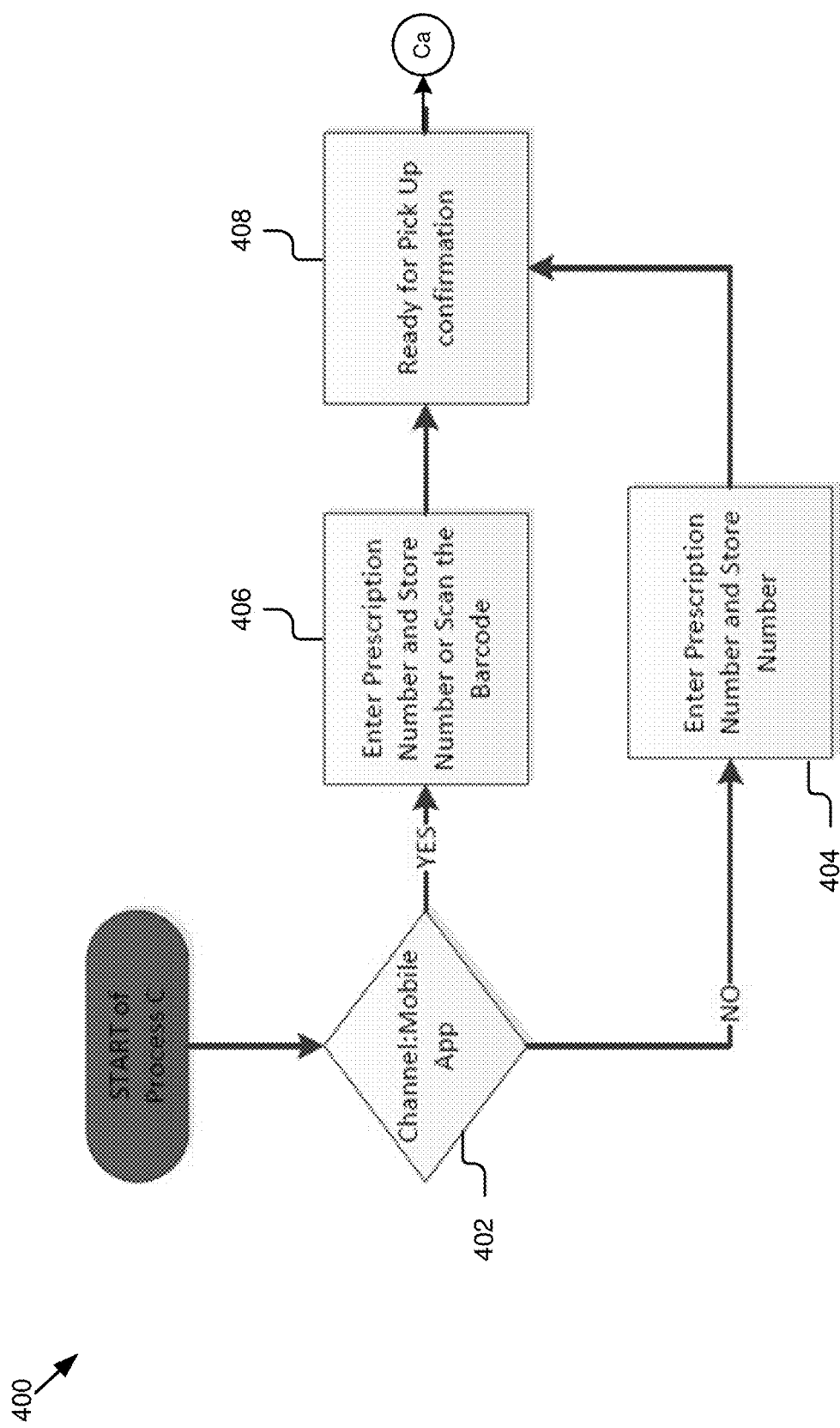
FIGS. 4A-4C are flowcharts of an example method for ordering items using the delivery order management system.
Figure 4B:
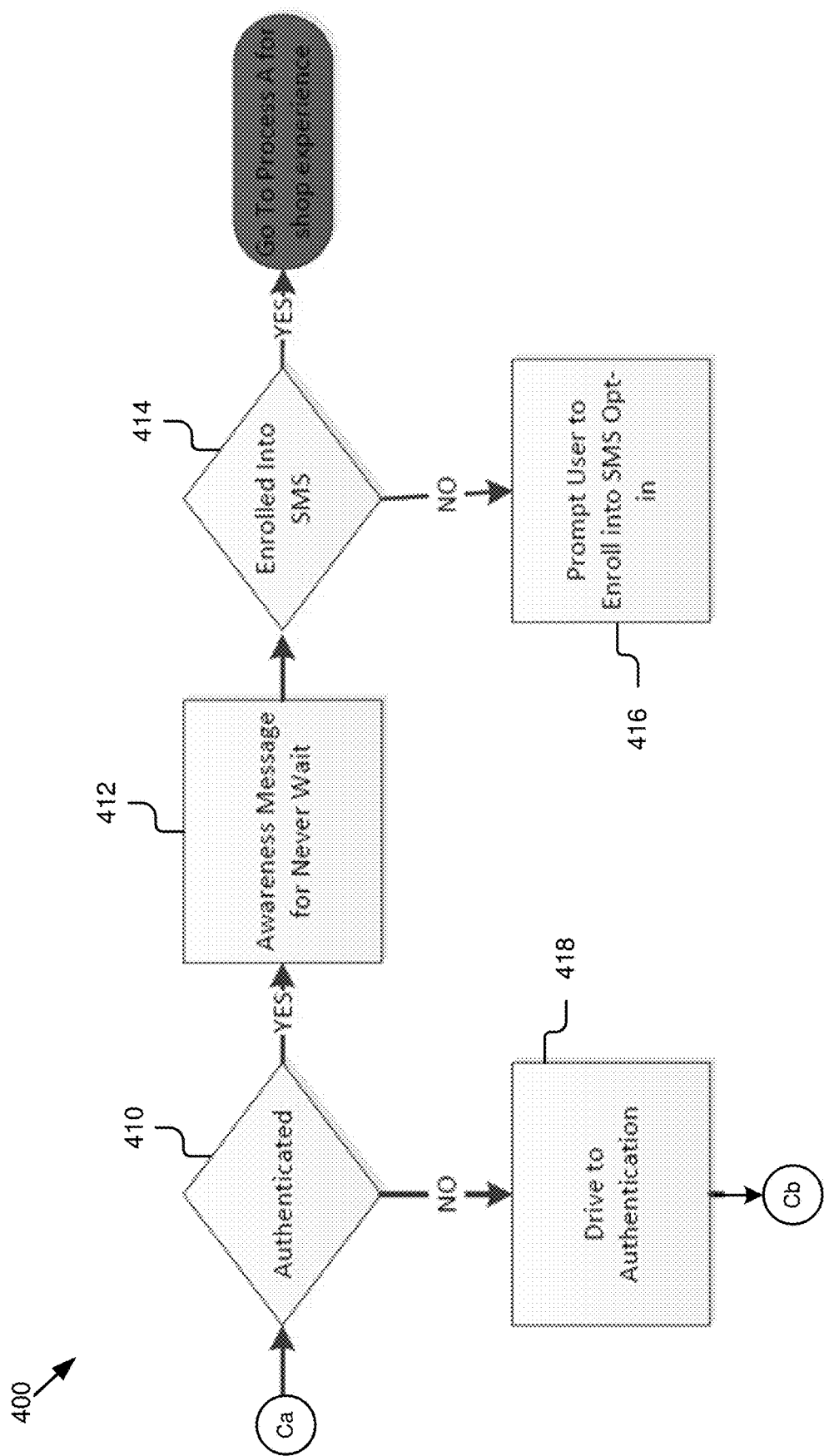
Figure 4C:
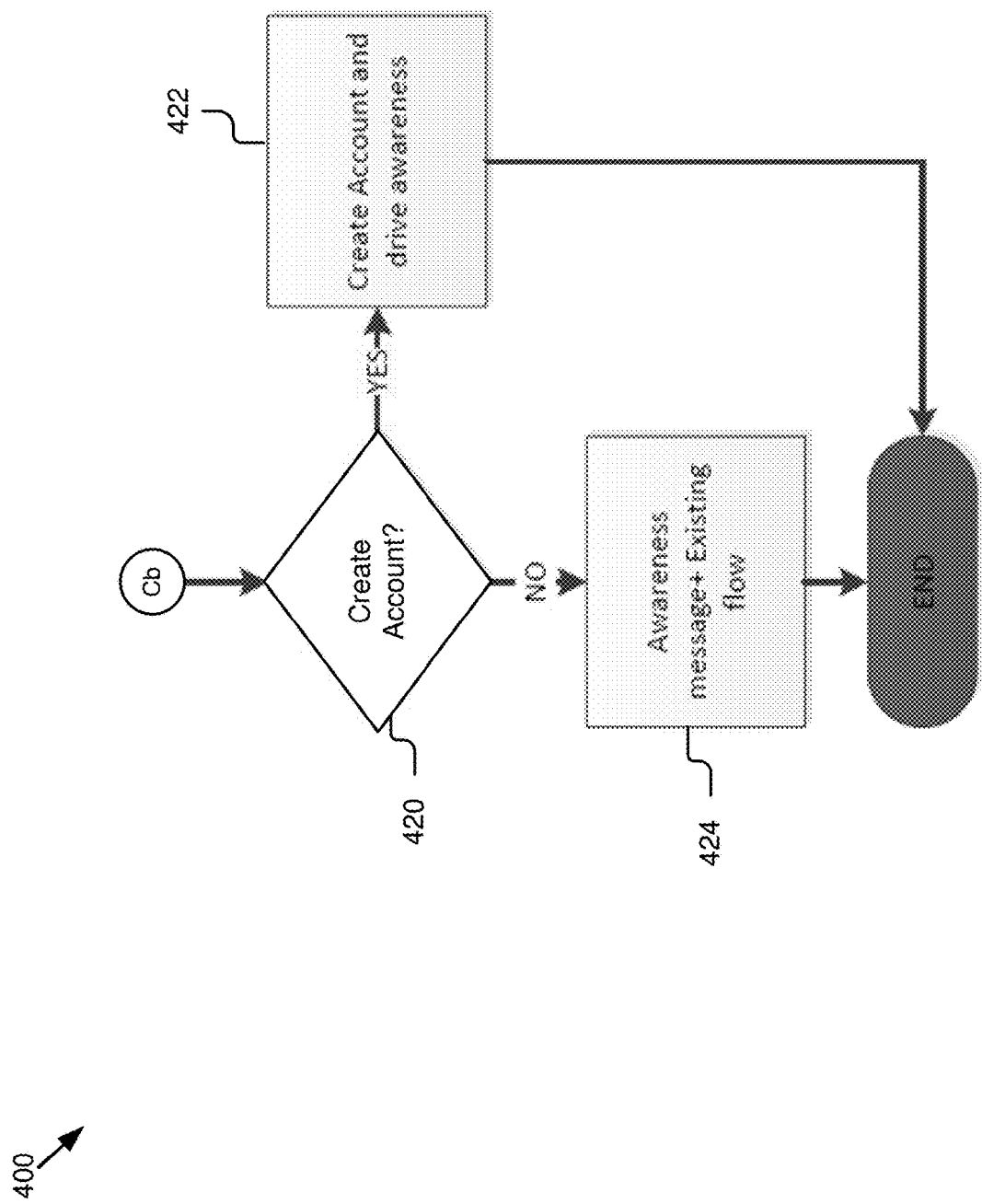
Figure 5A:
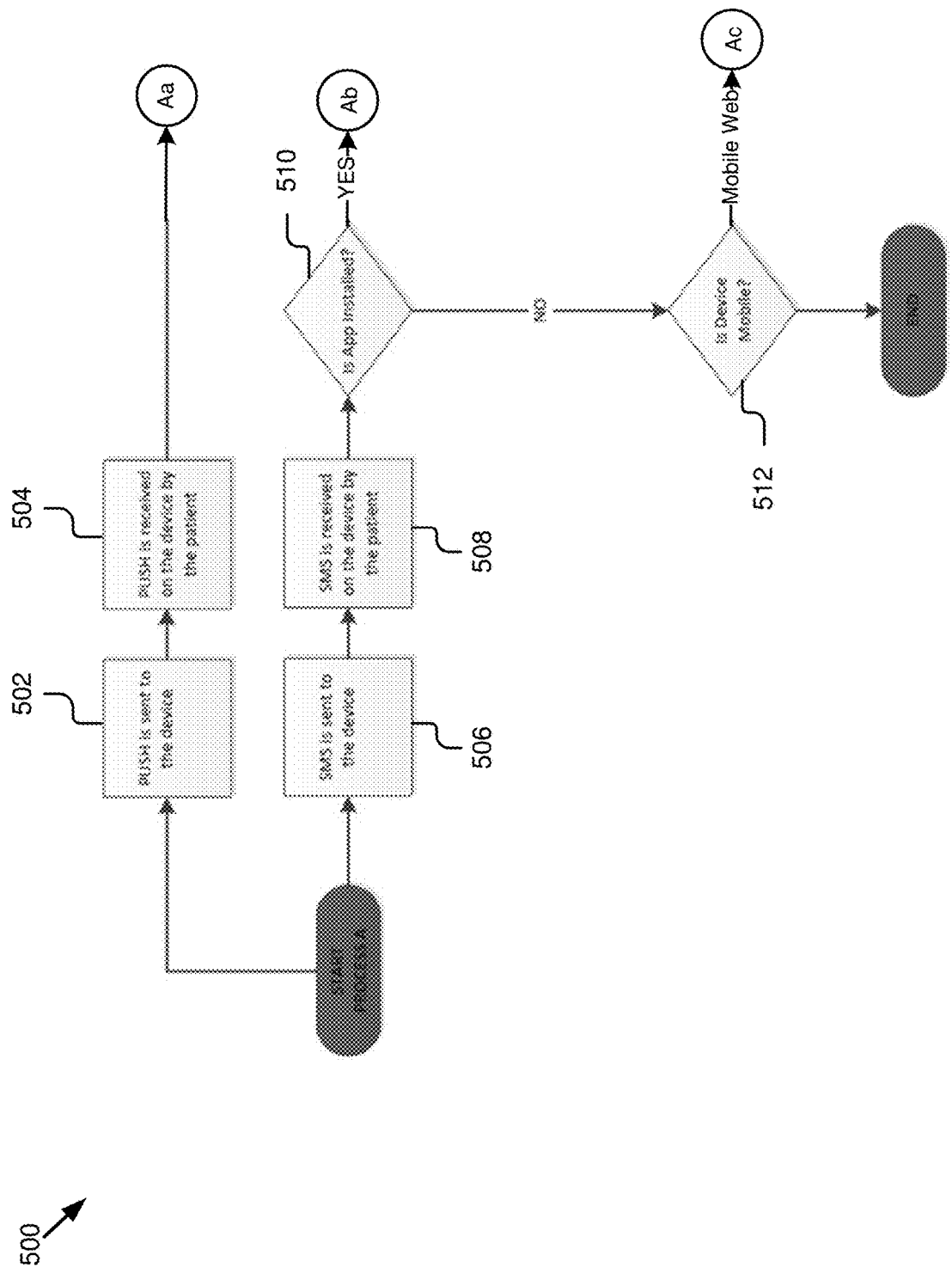
FIGS. 5A-5E are flowcharts of an example method for intelligently pre-processing an order in preparation for fulfillment.
Figure 5B:
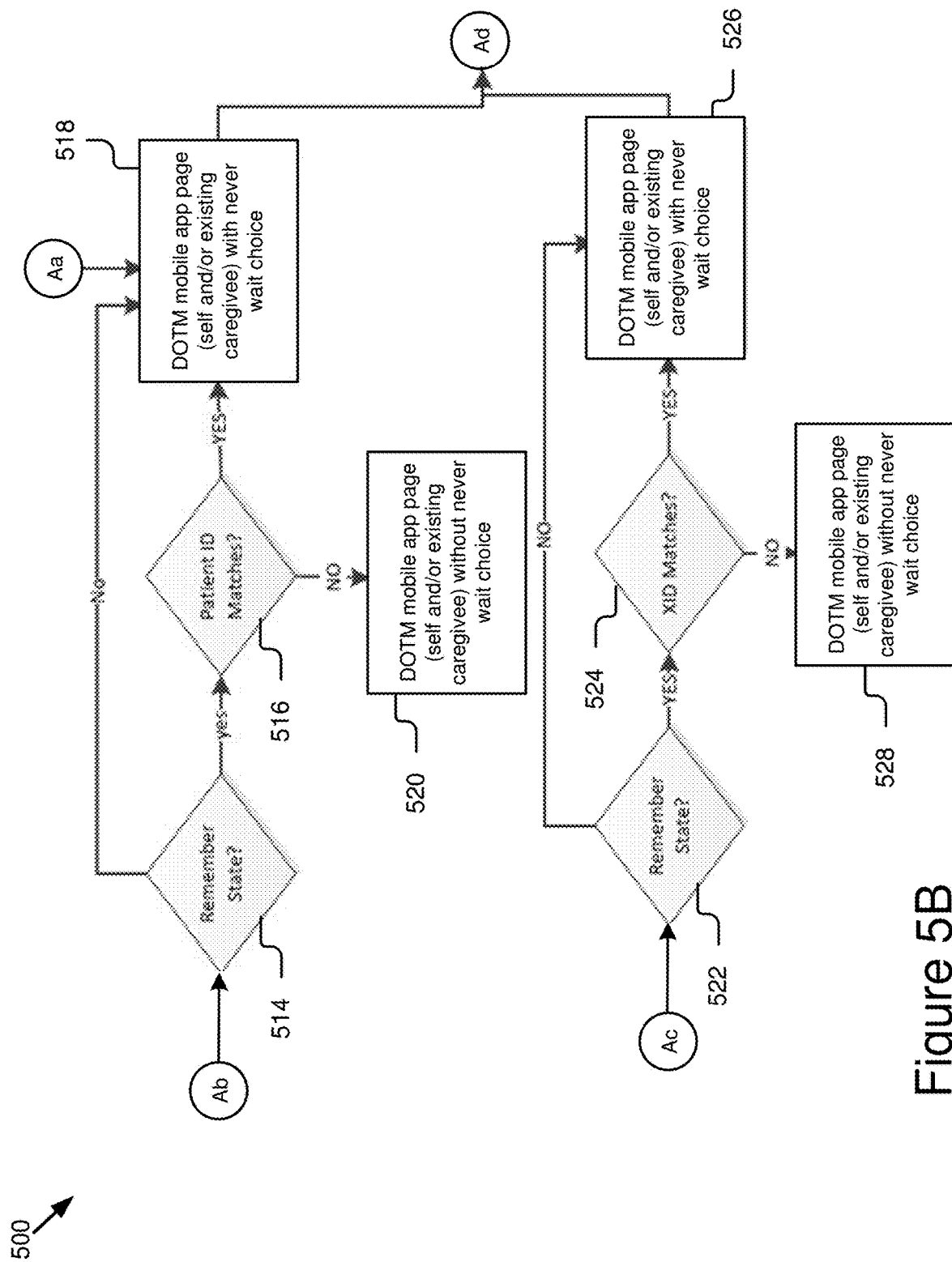
Figure 5C:
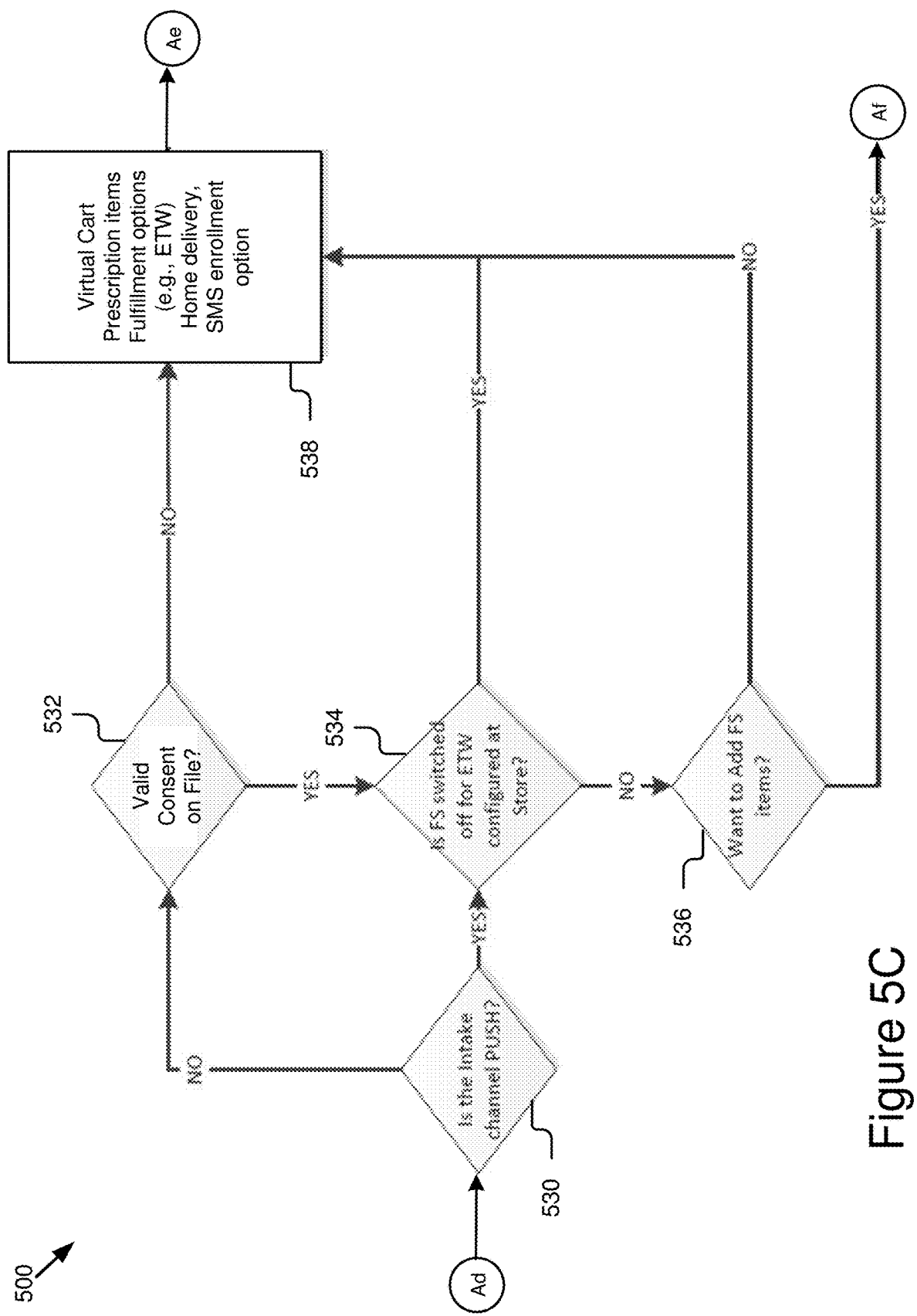
Figure 5D:
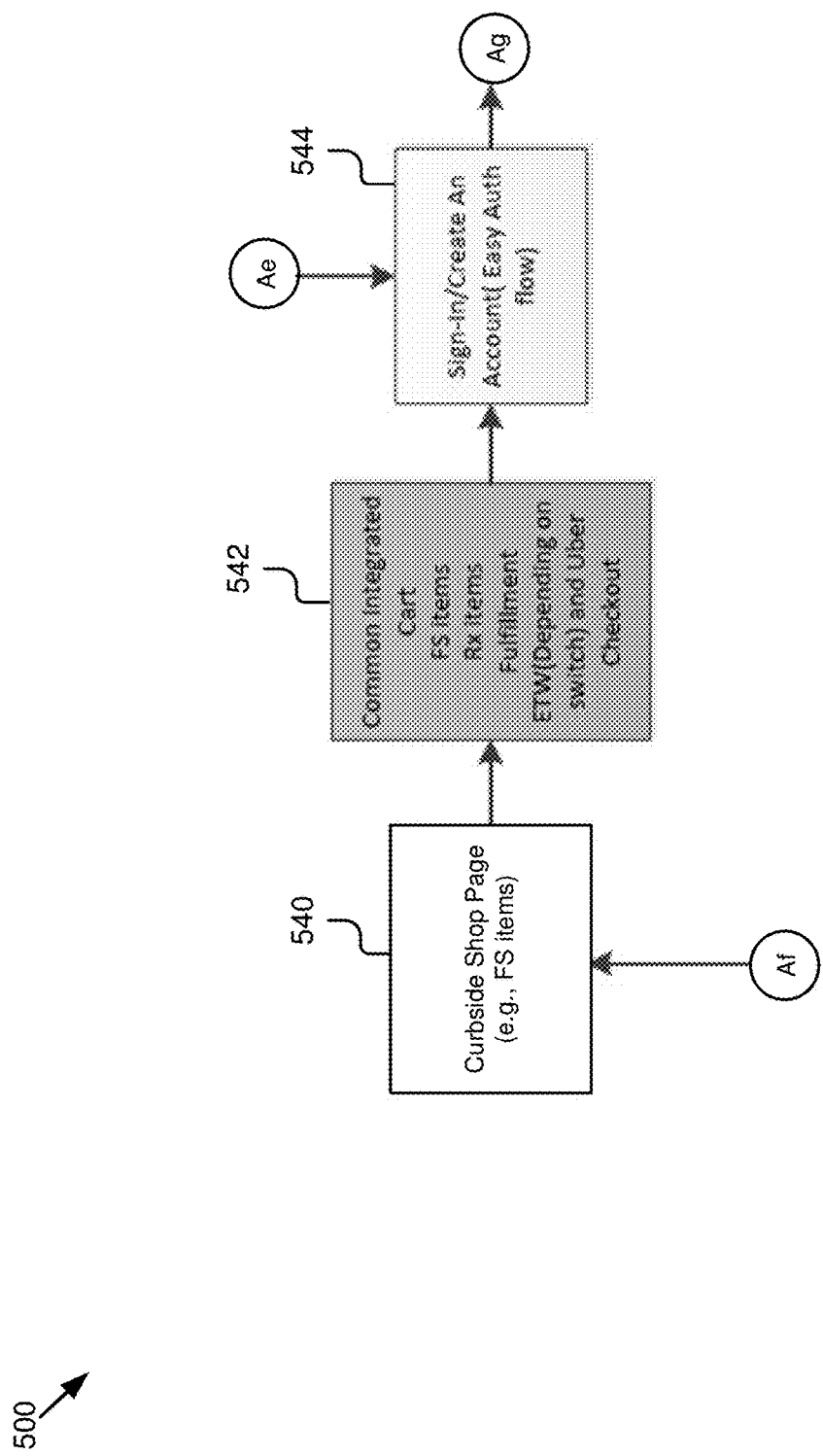
Figure 5E:
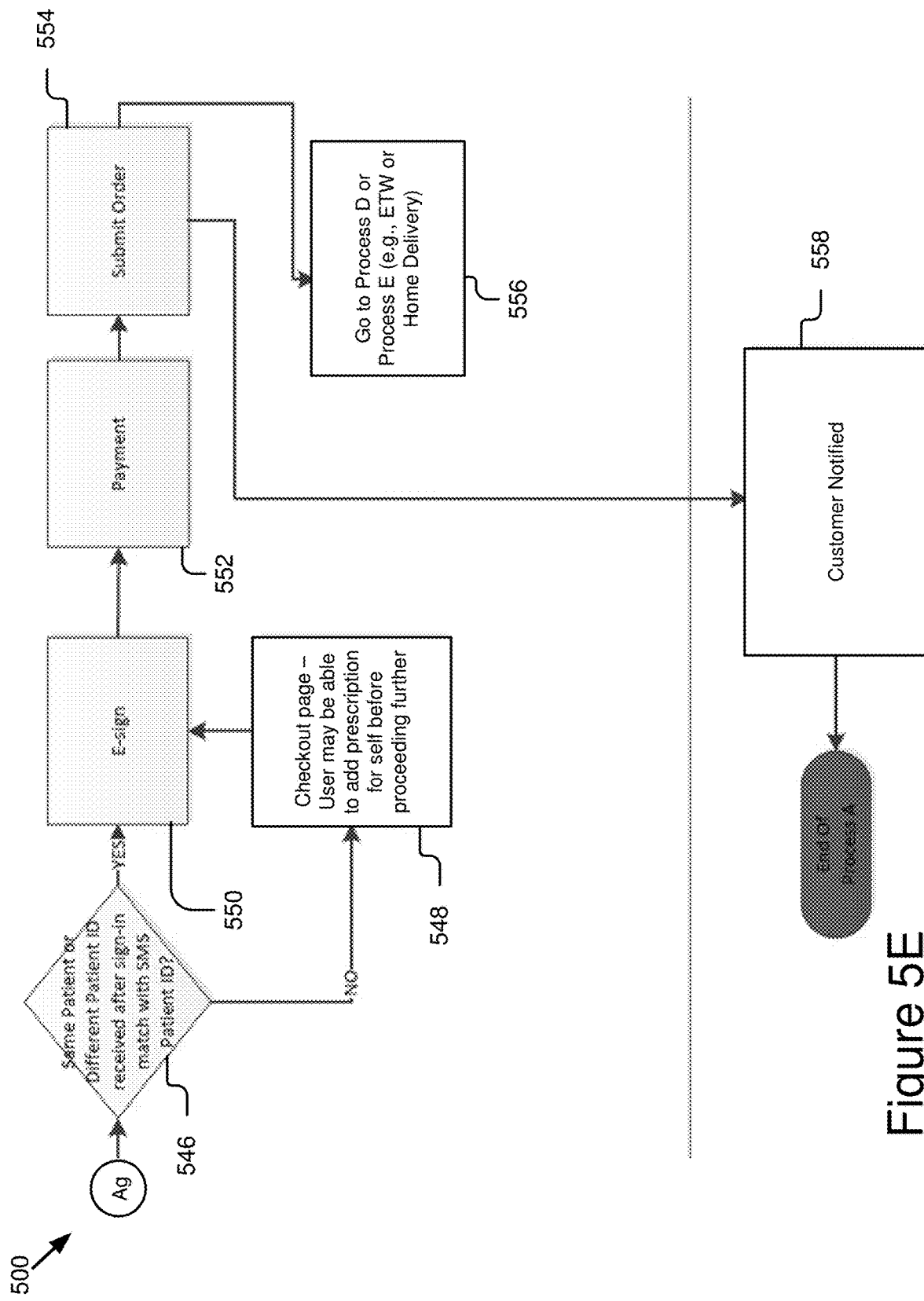
Figure 6A:
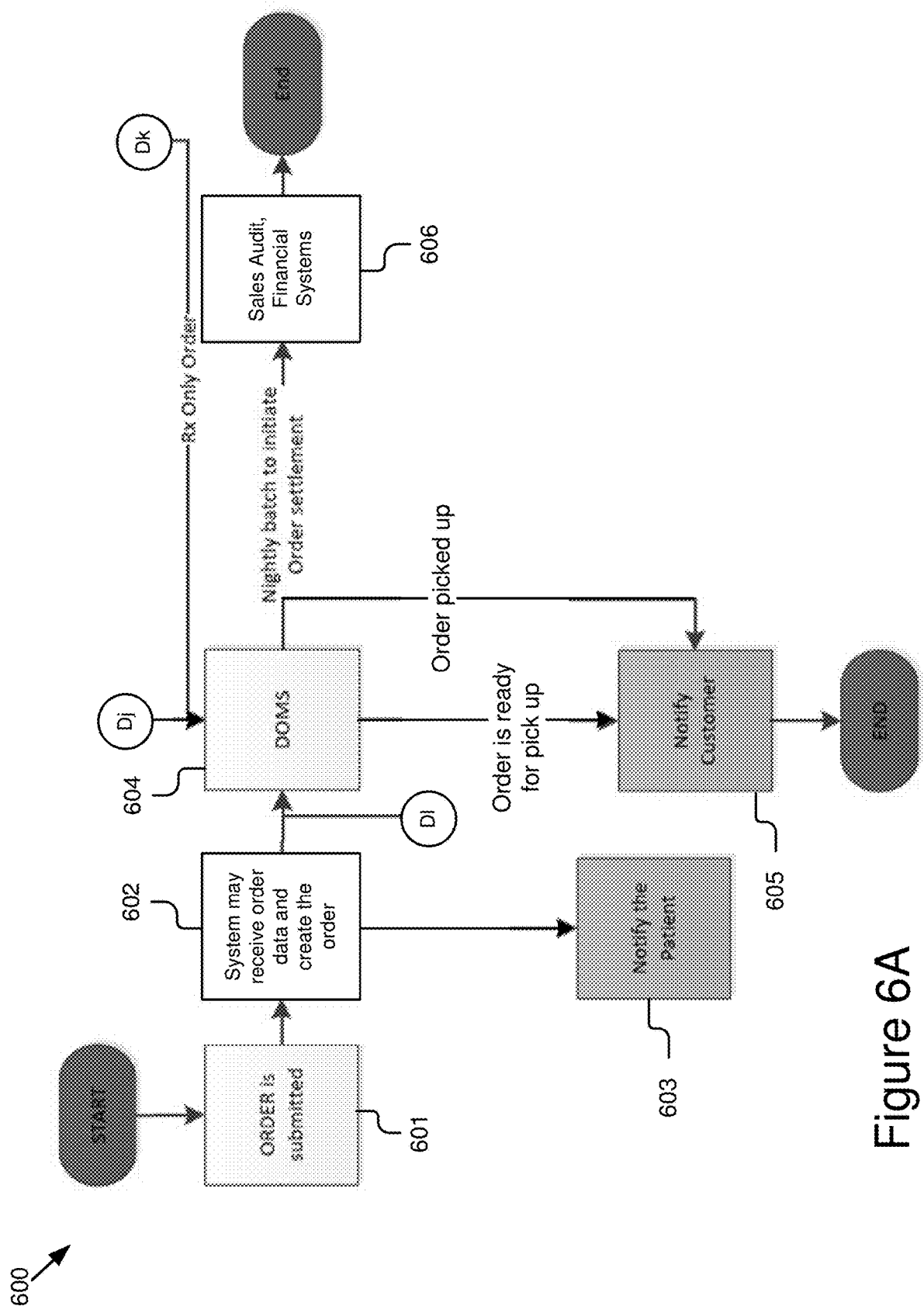
FIGS. 6A-6G are flowcharts of an example method for intelligently fulfilling an order for in-store pick up.
Figure 6B:
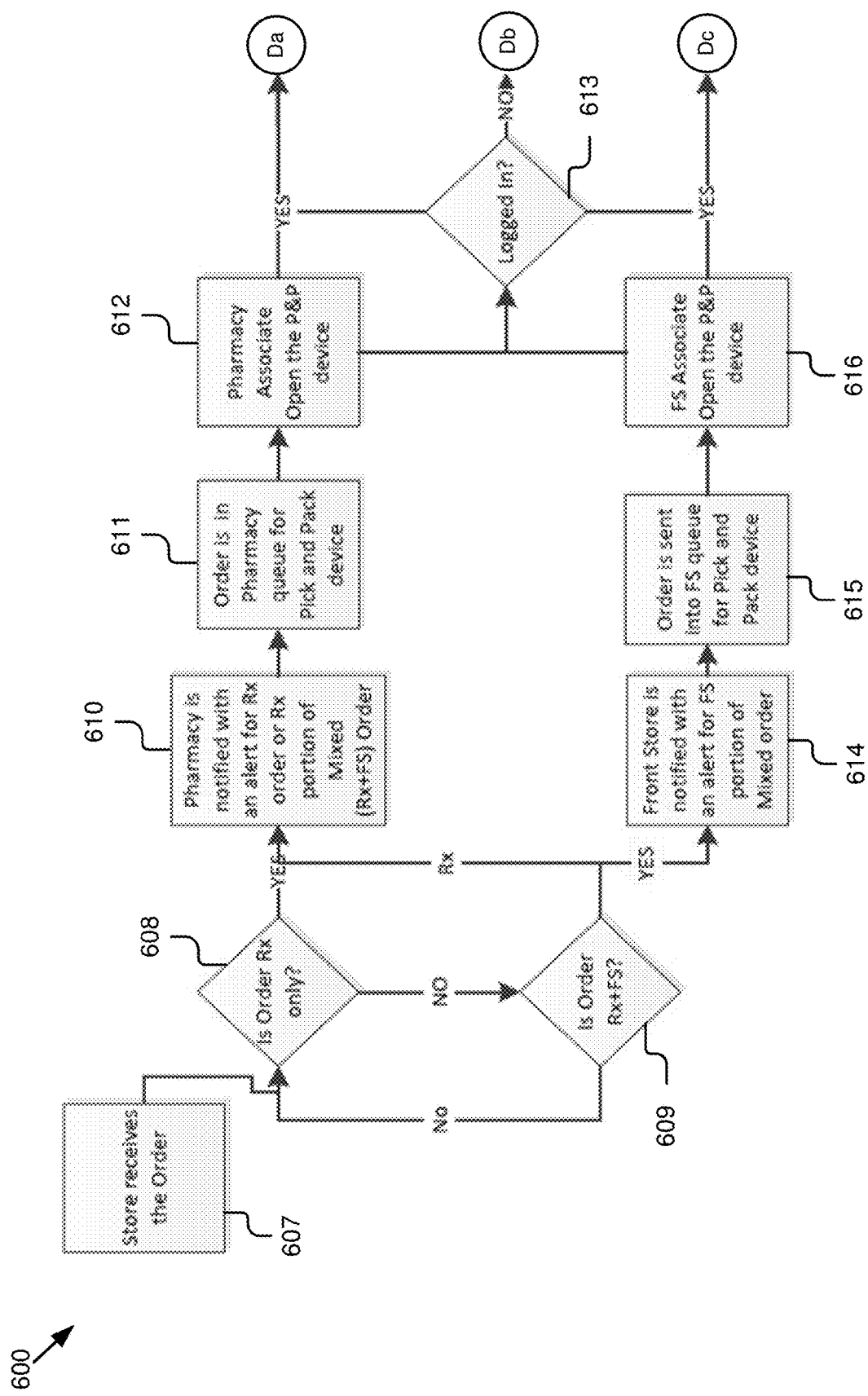
Figure 6C:
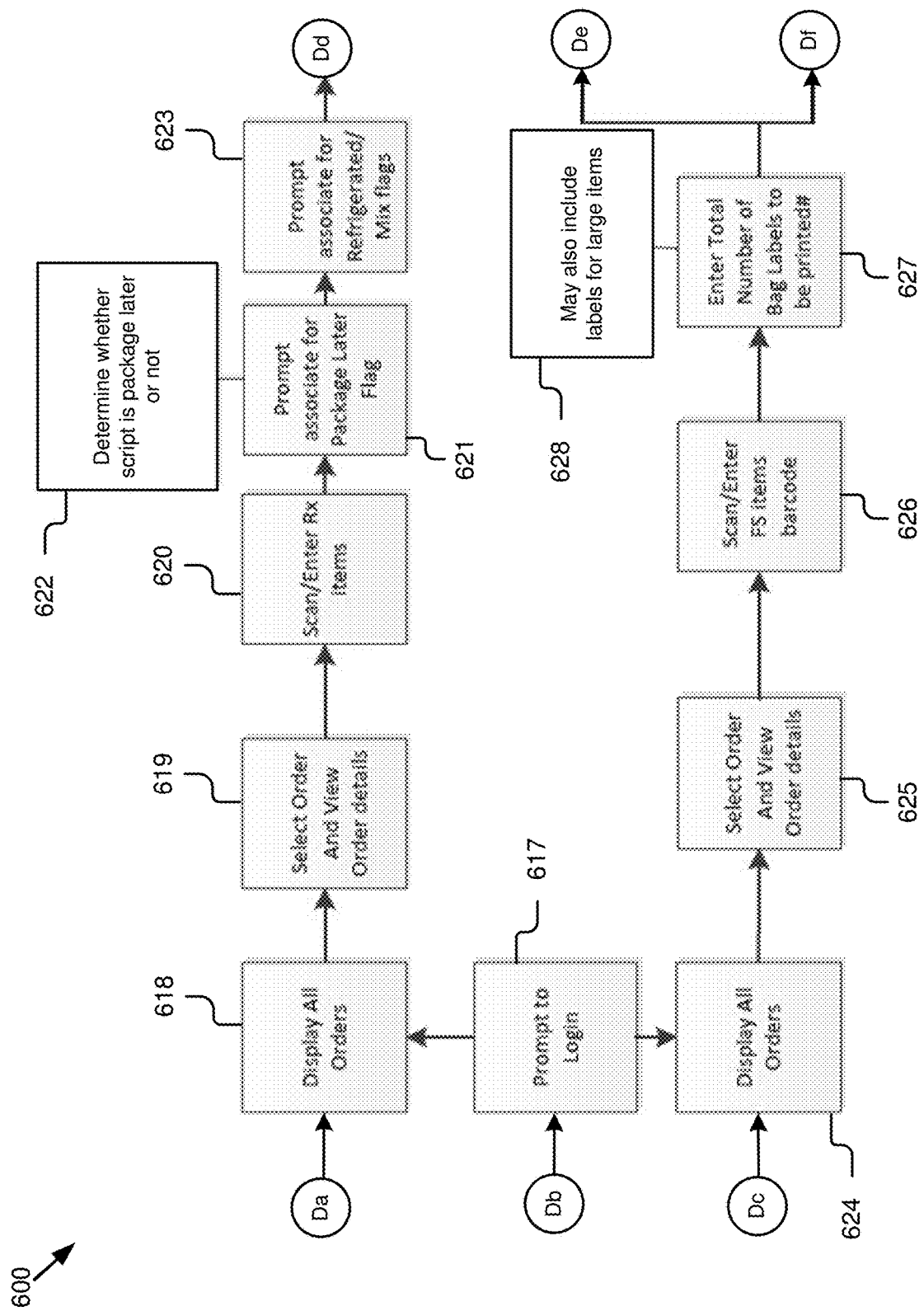
Figure 6D:
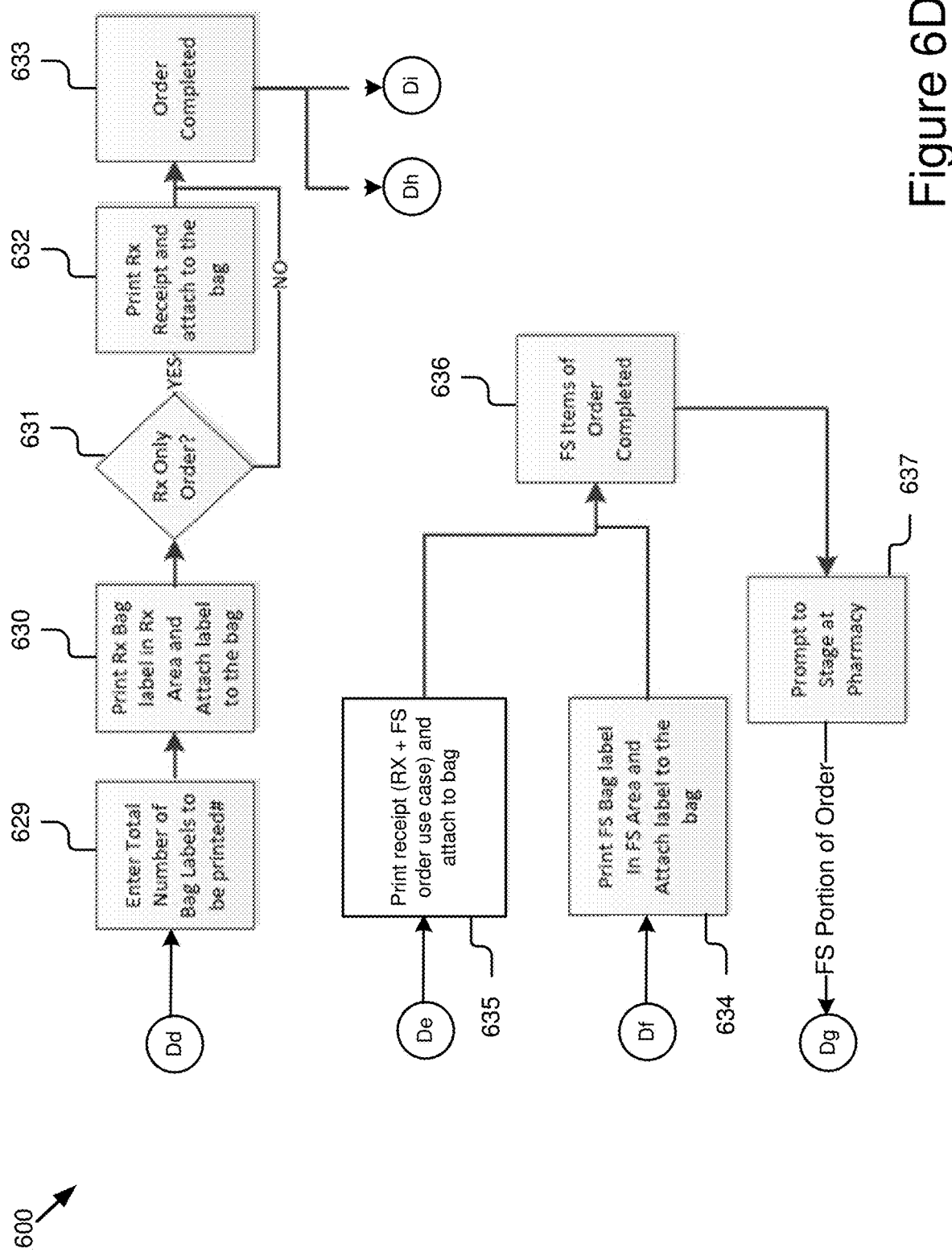
Figure 6E:
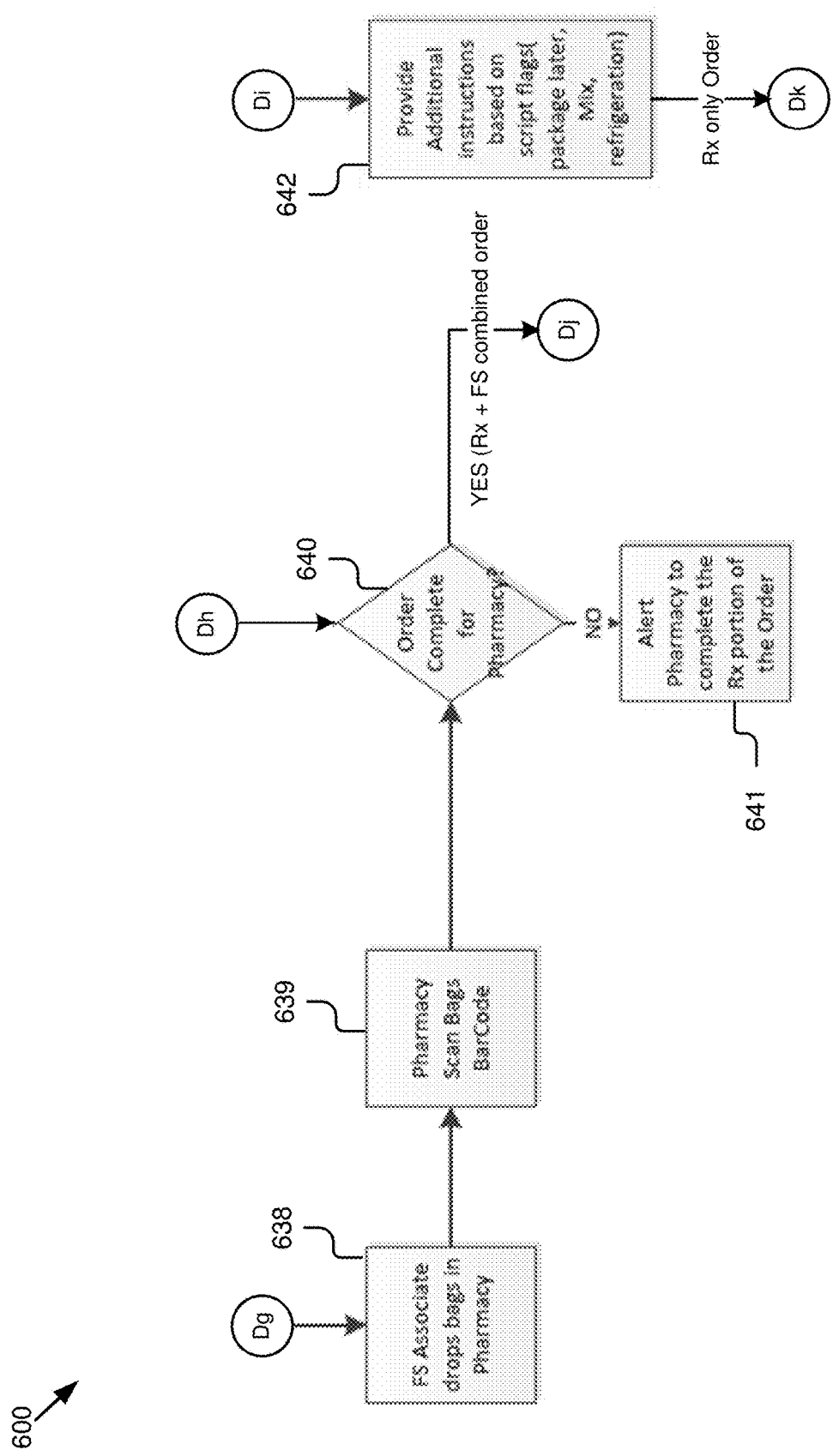
Figure 6F:
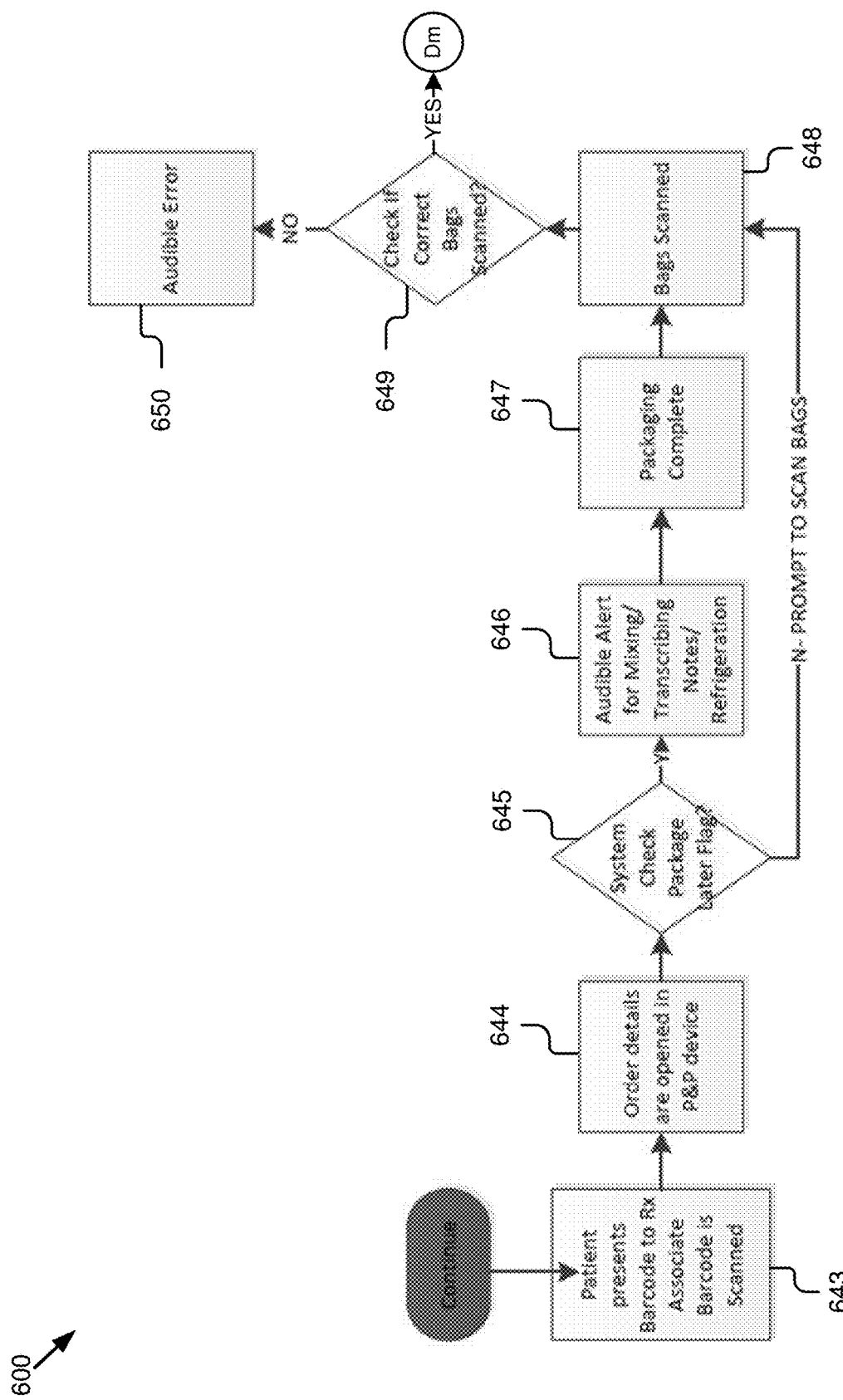
Figure 6G:
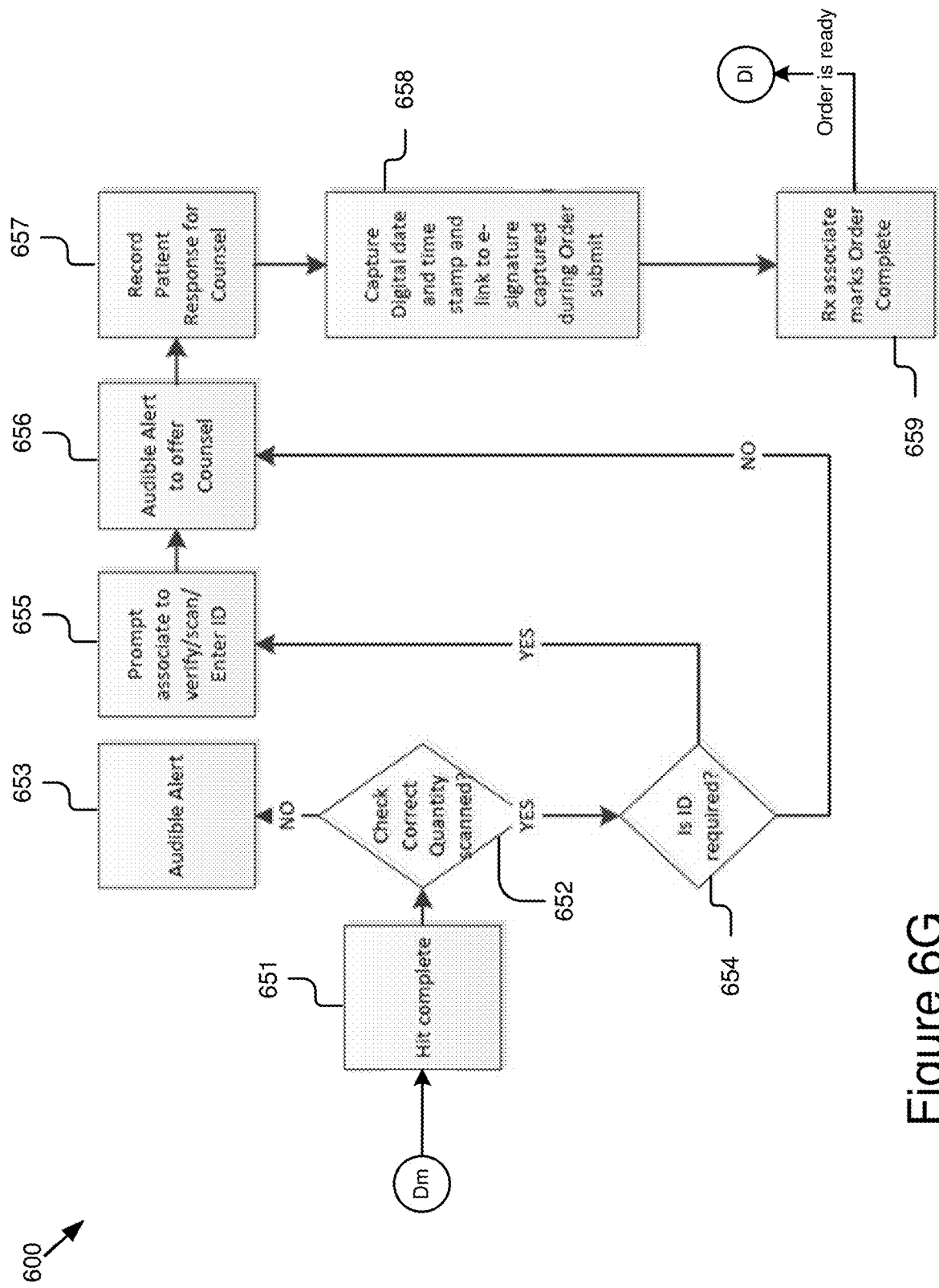
Figure 7A:
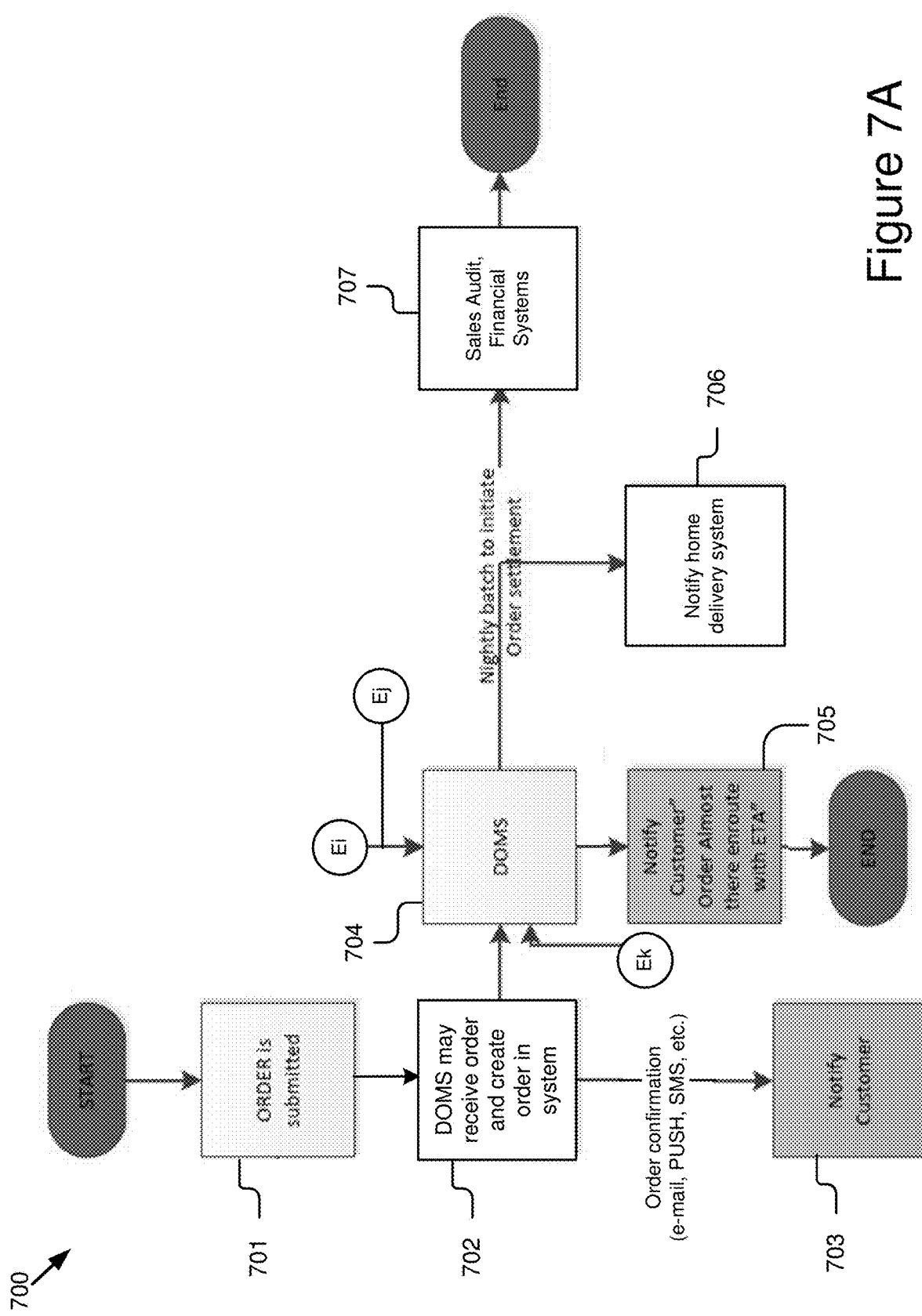
FIGS. 7A-7I are flowcharts of an example method for intelligently fulfilling an order for home delivery.
Figure 7B:
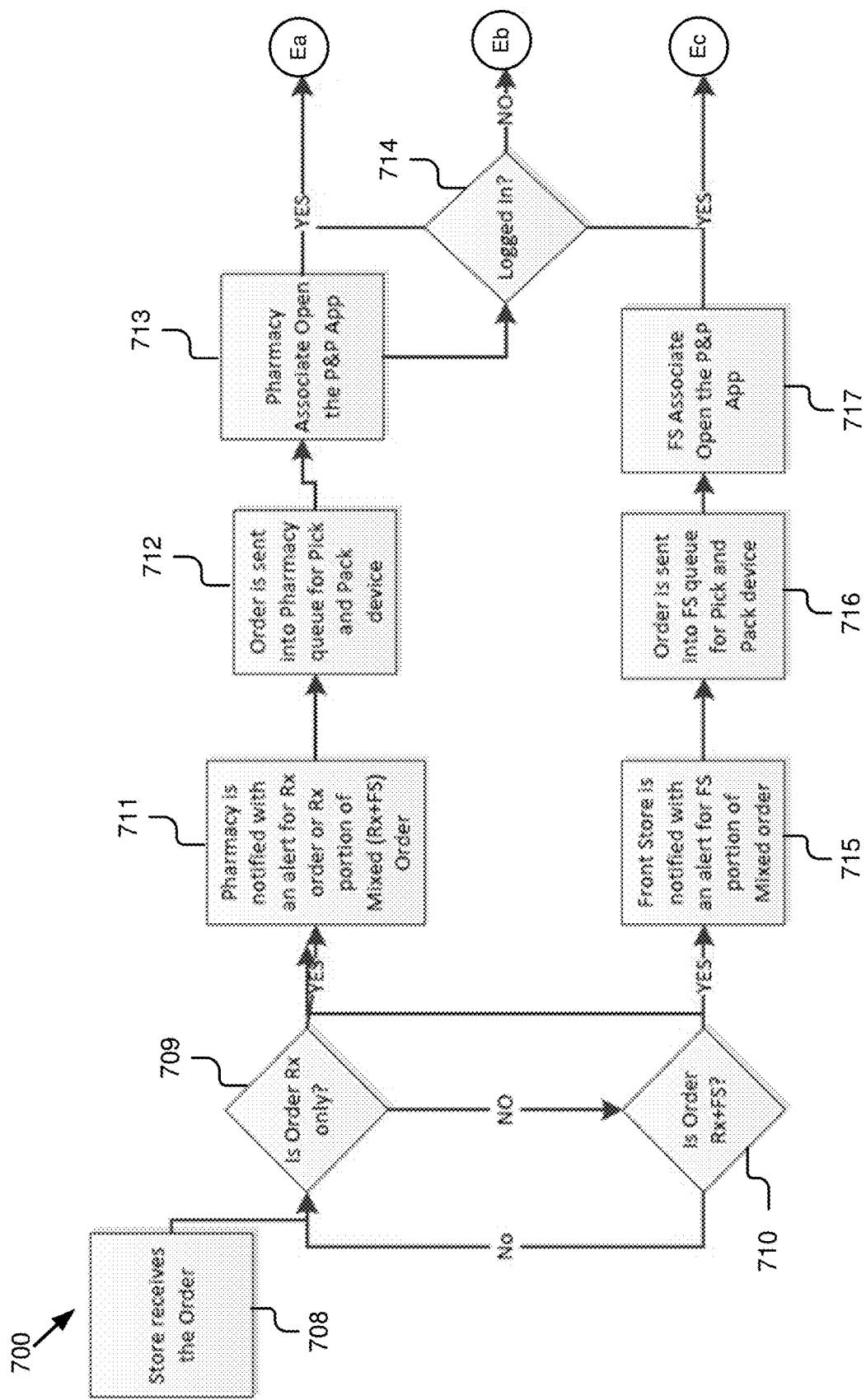
Figure 7C:
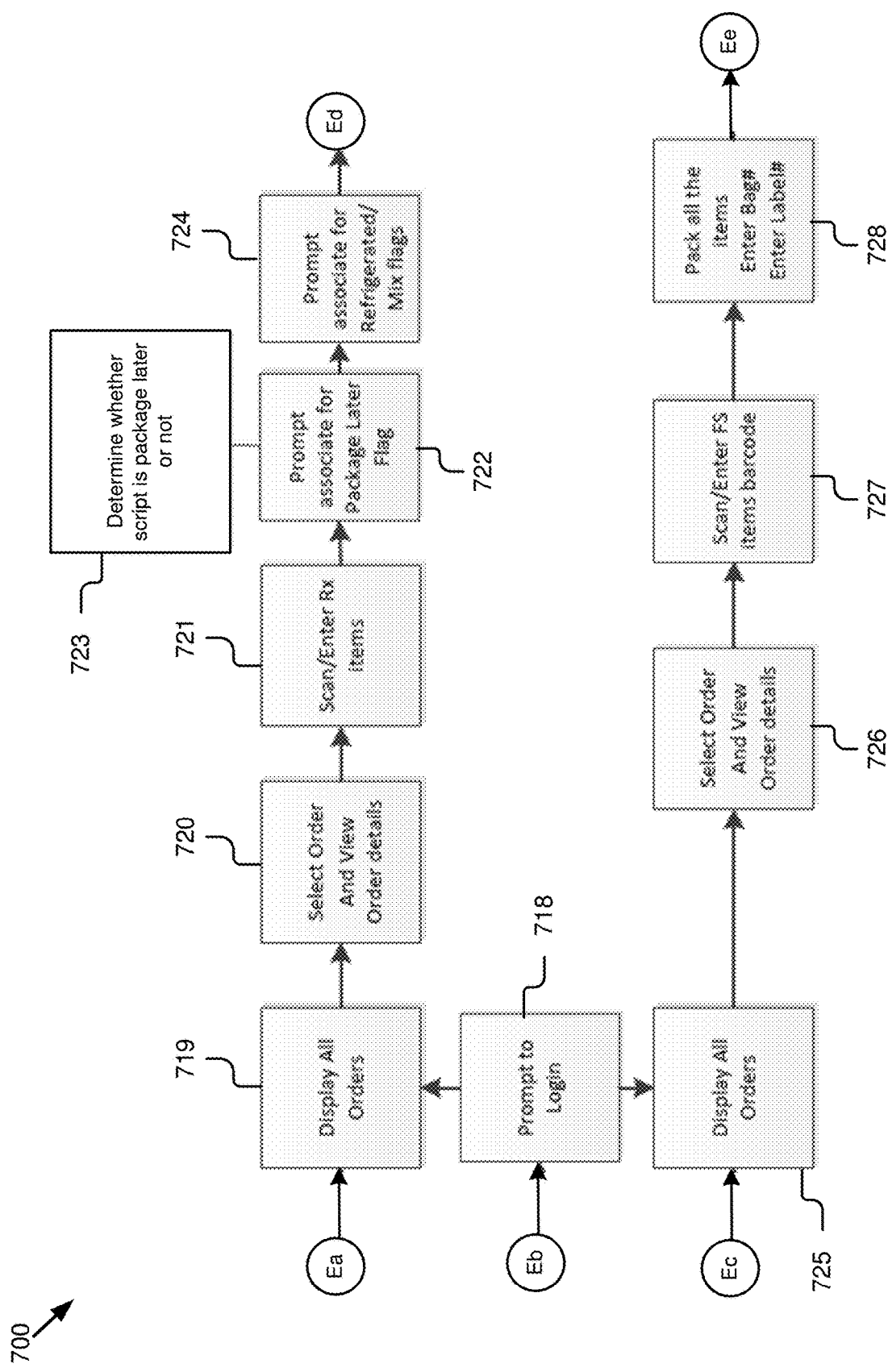
Figure 7D:
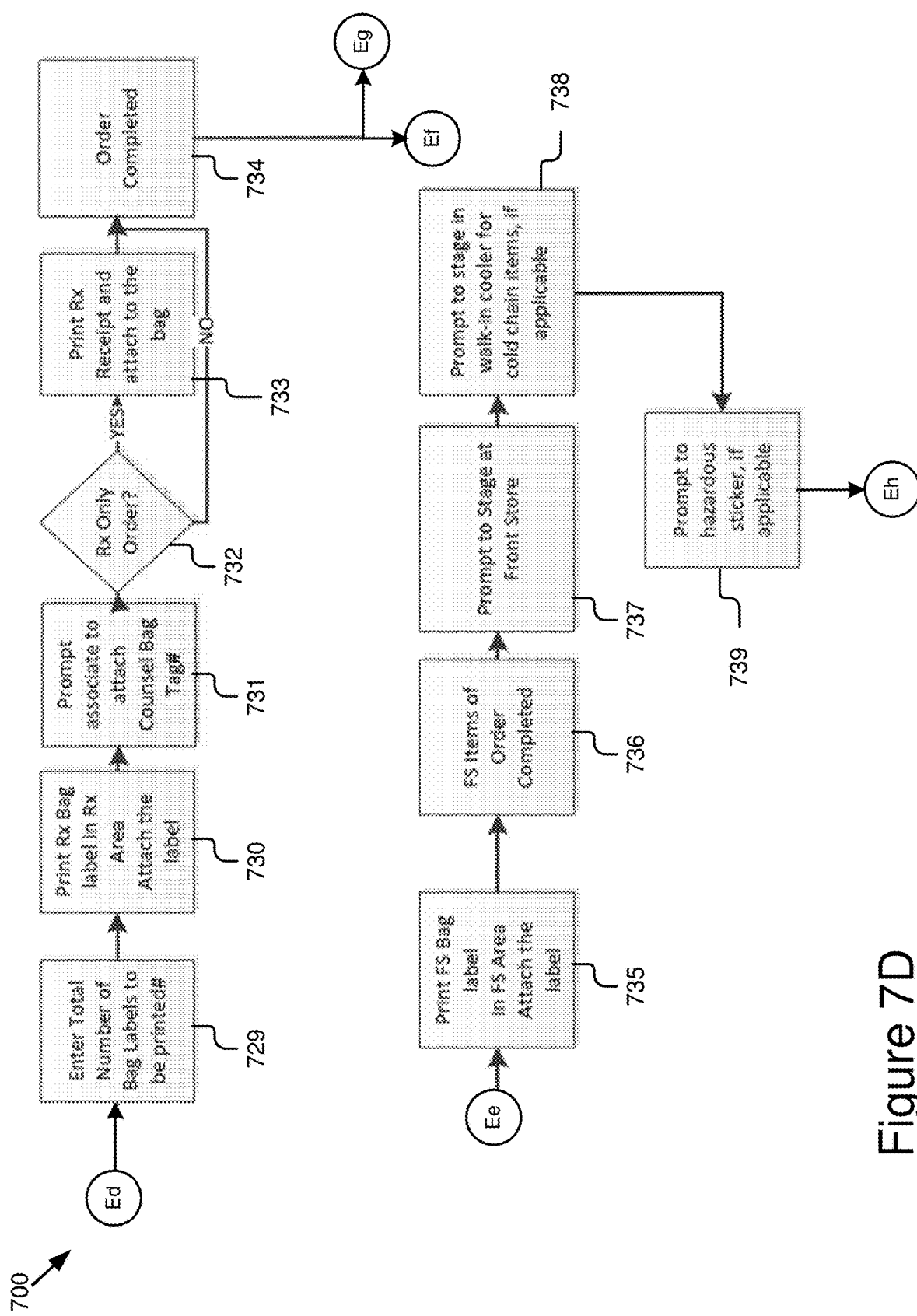
Figure 7E:
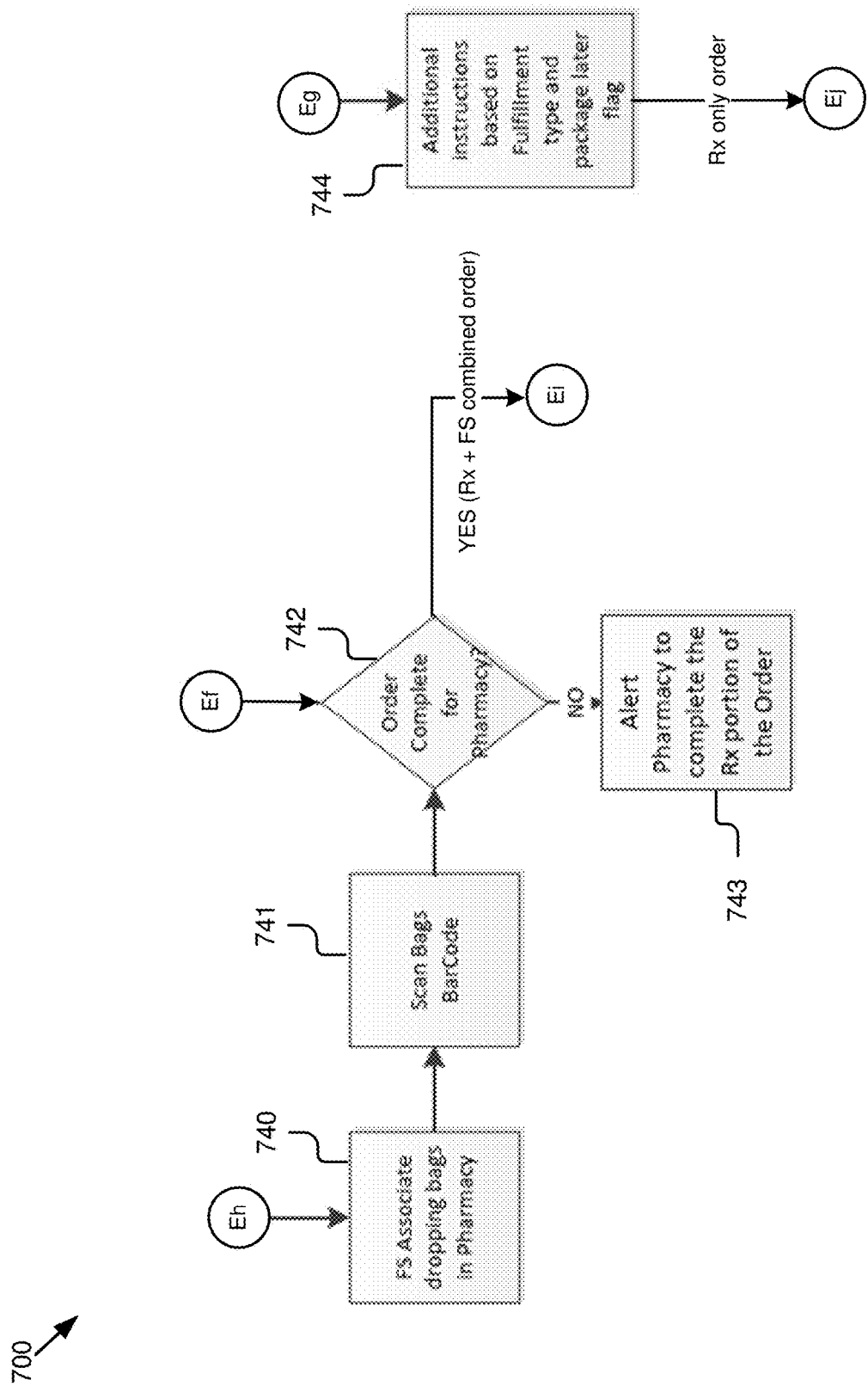
Figure 7F:
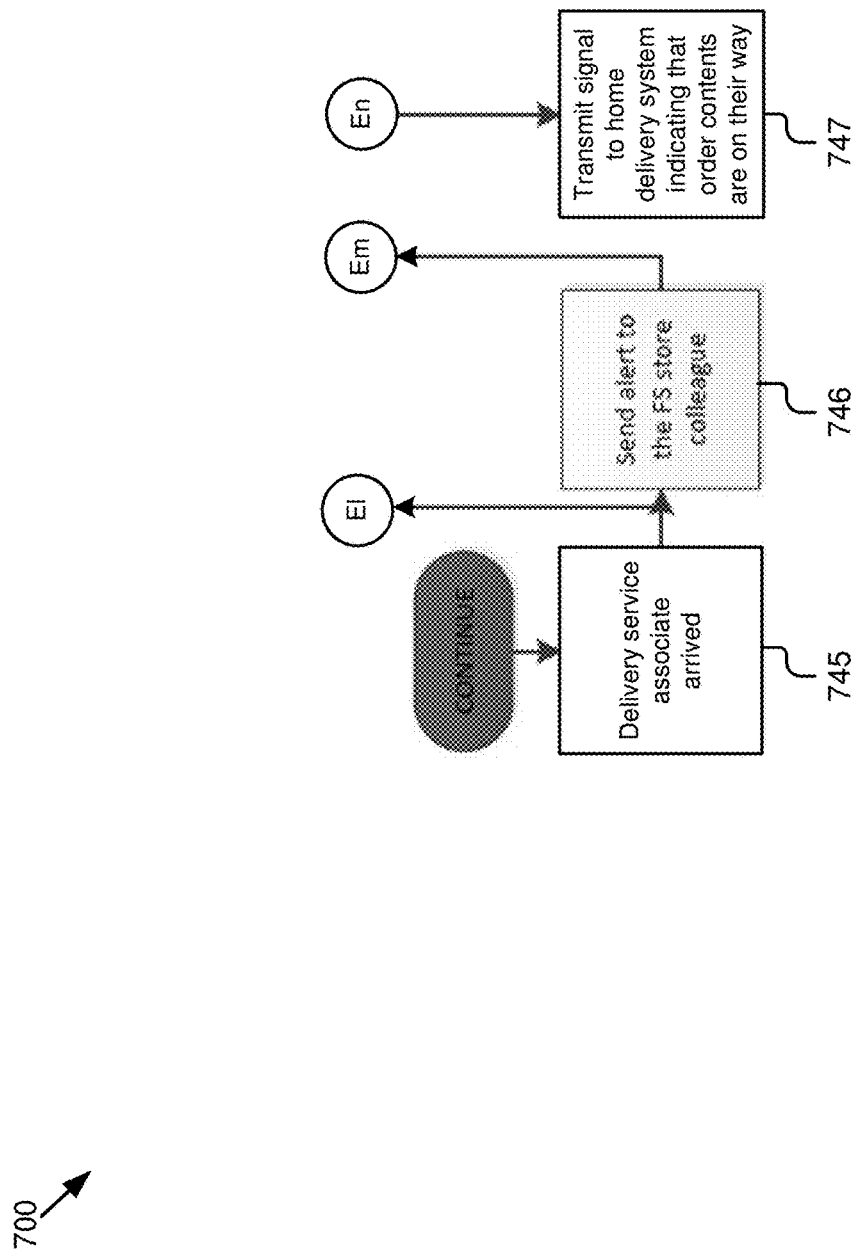
Figure 7G:
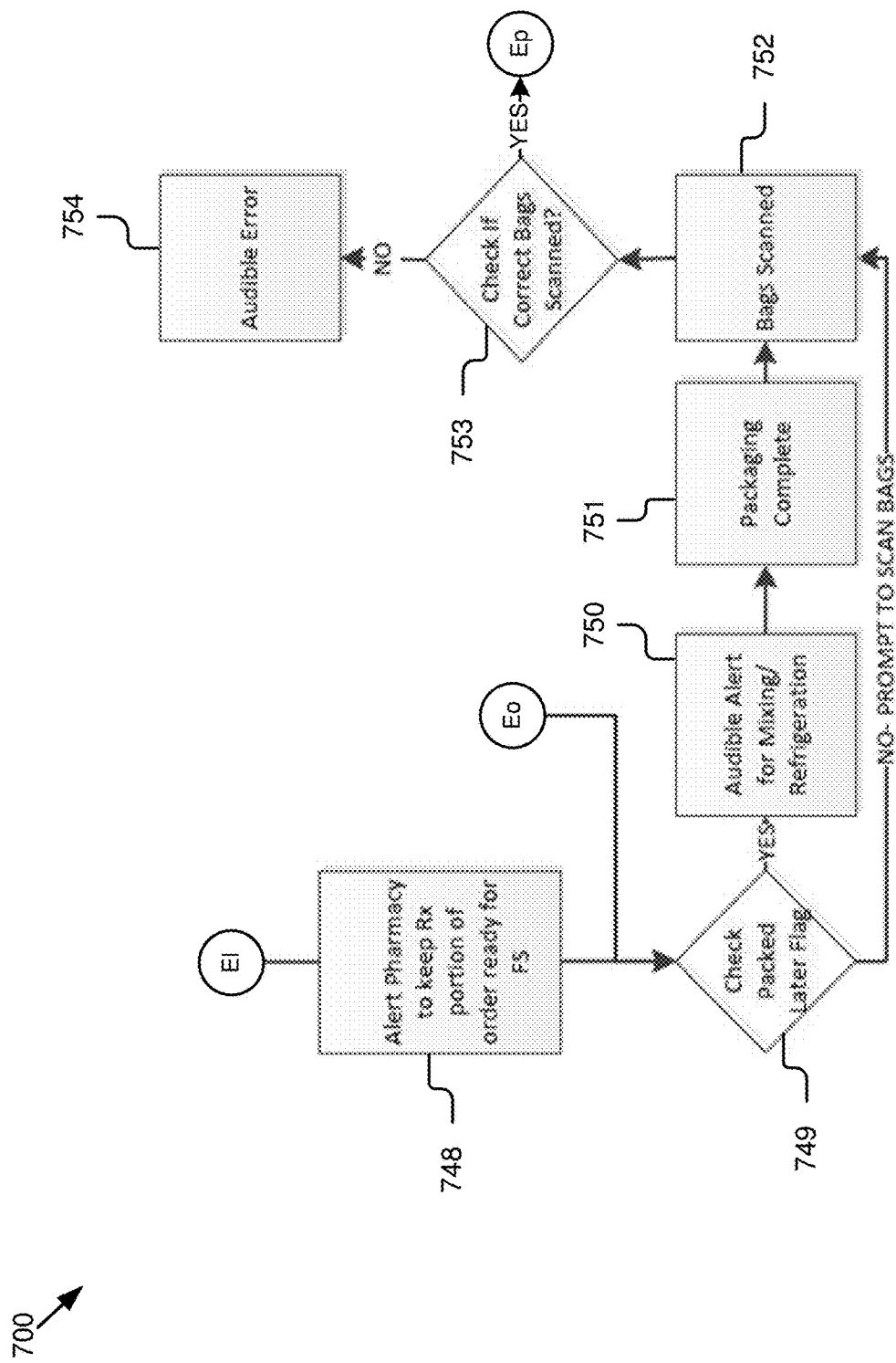
Figure 7H:
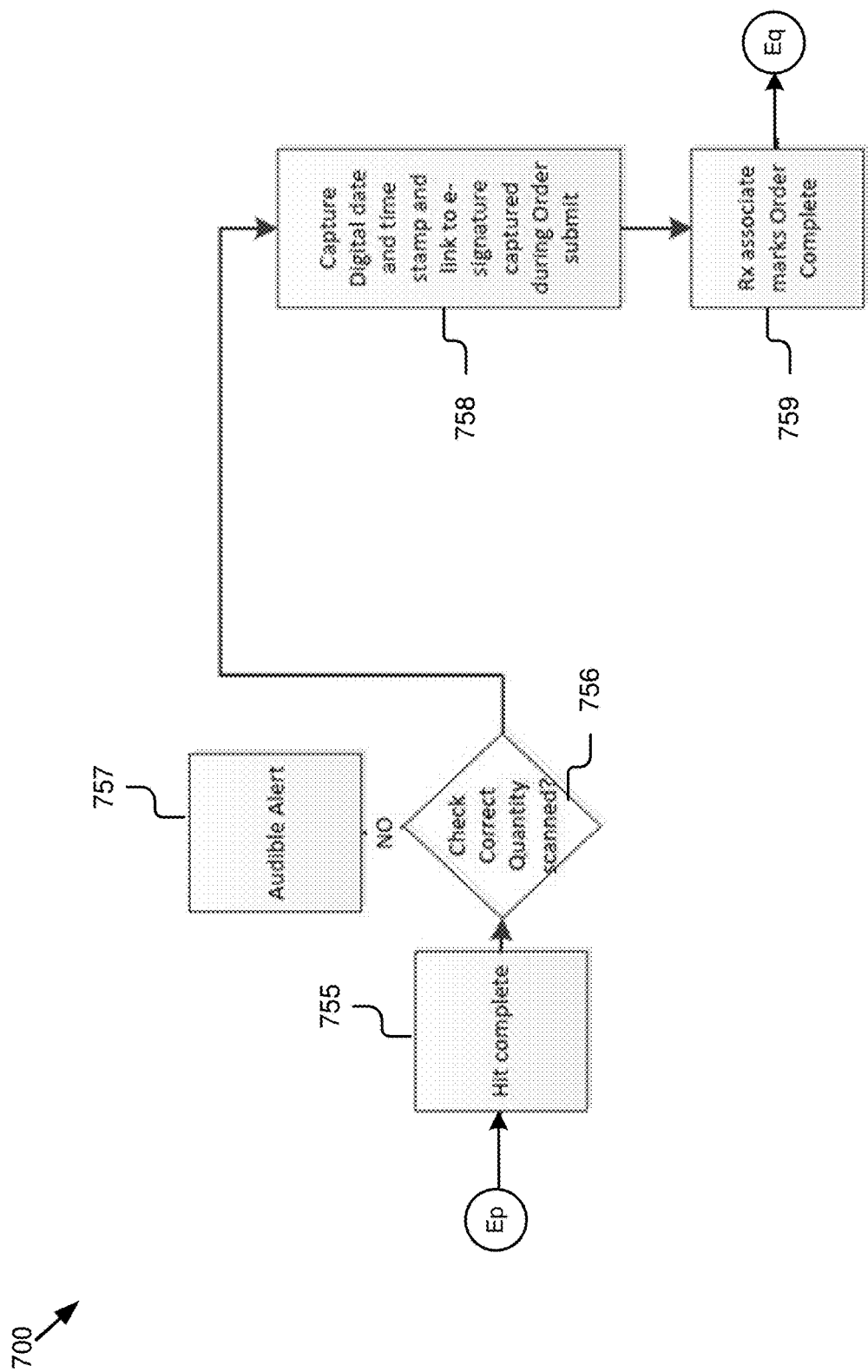
Figure 7I:
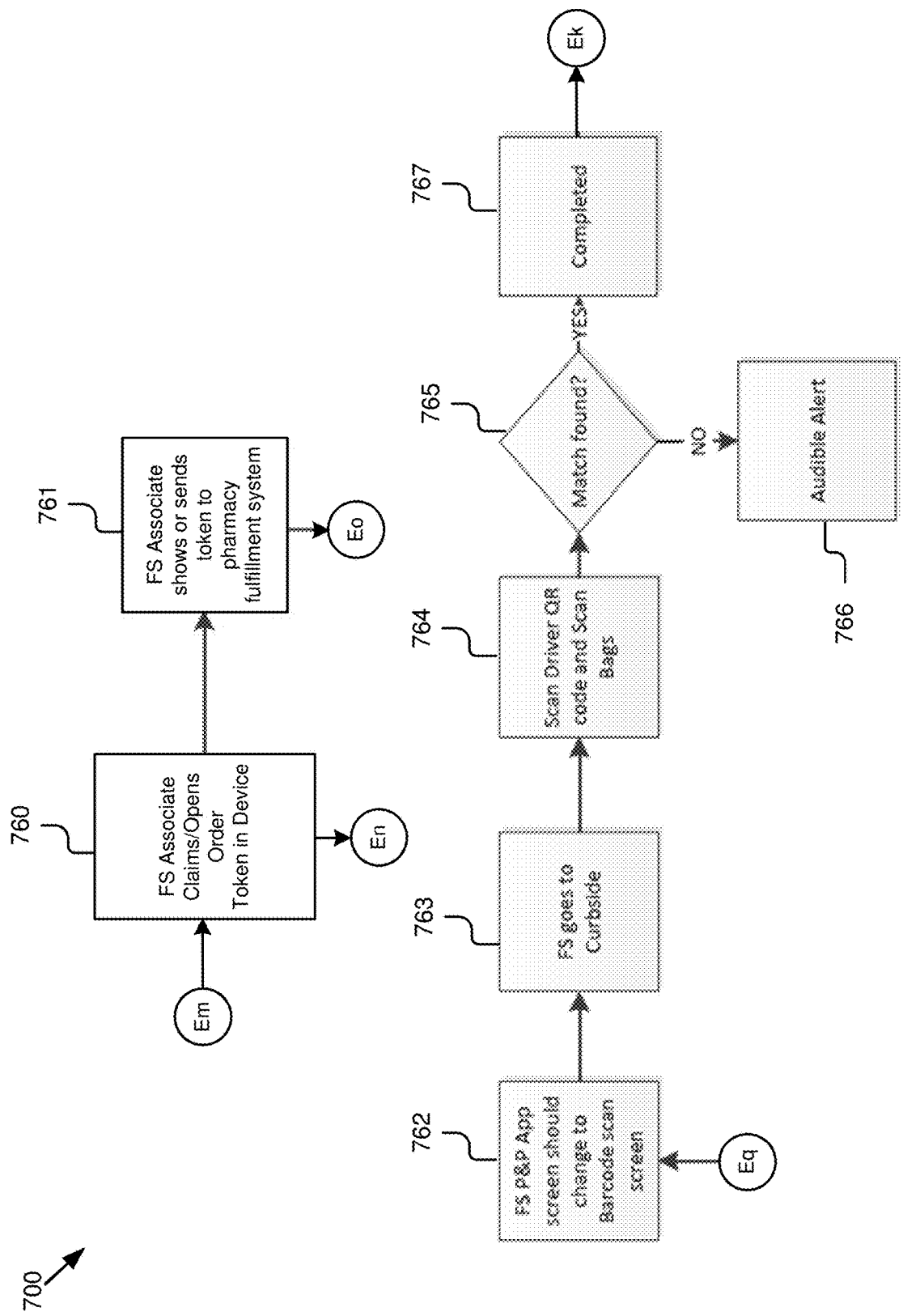
Figure 8A:
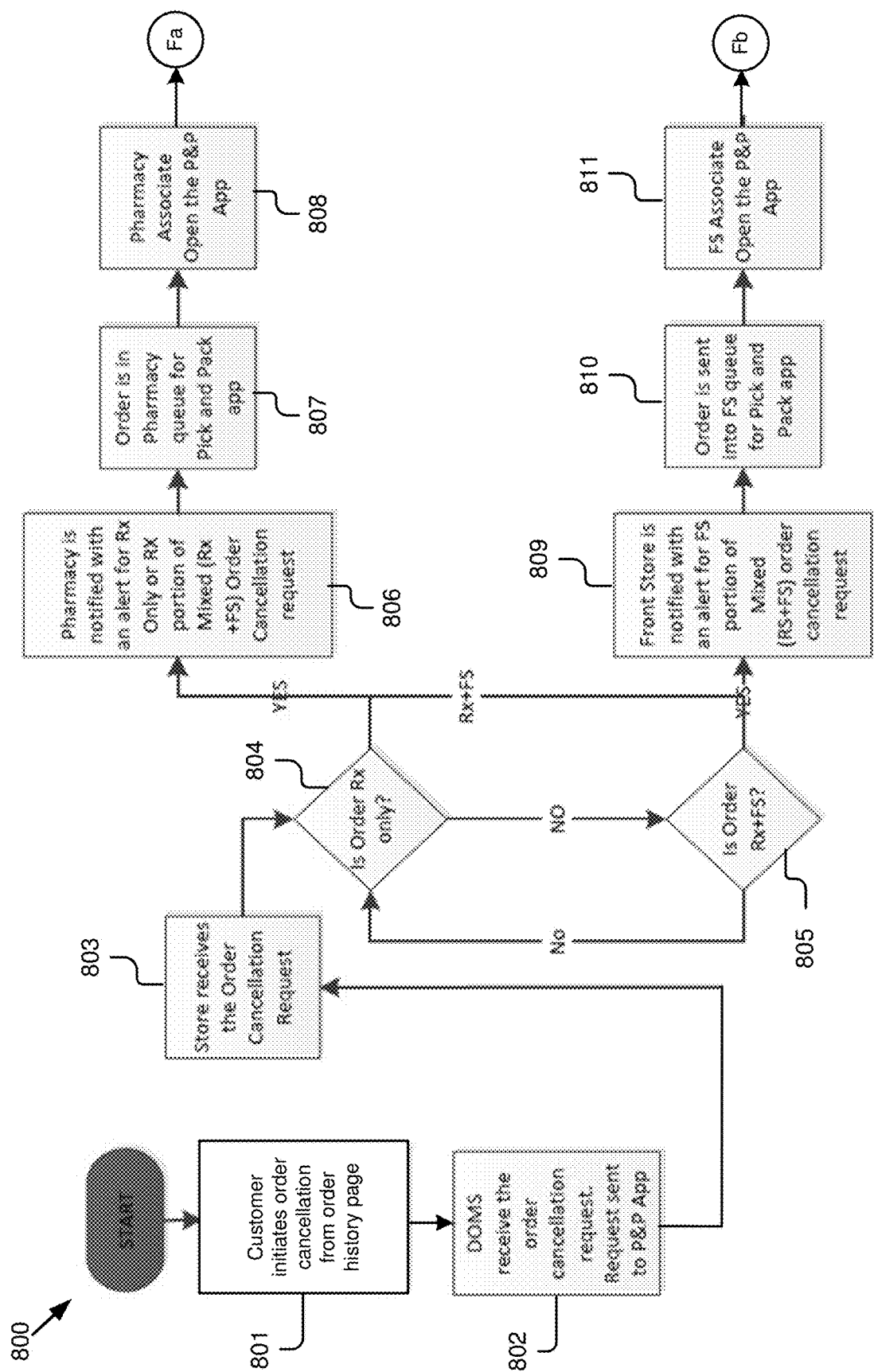
FIGS. 8A-8D are flowcharts of an example method for canceling an order.
Figure 8B:
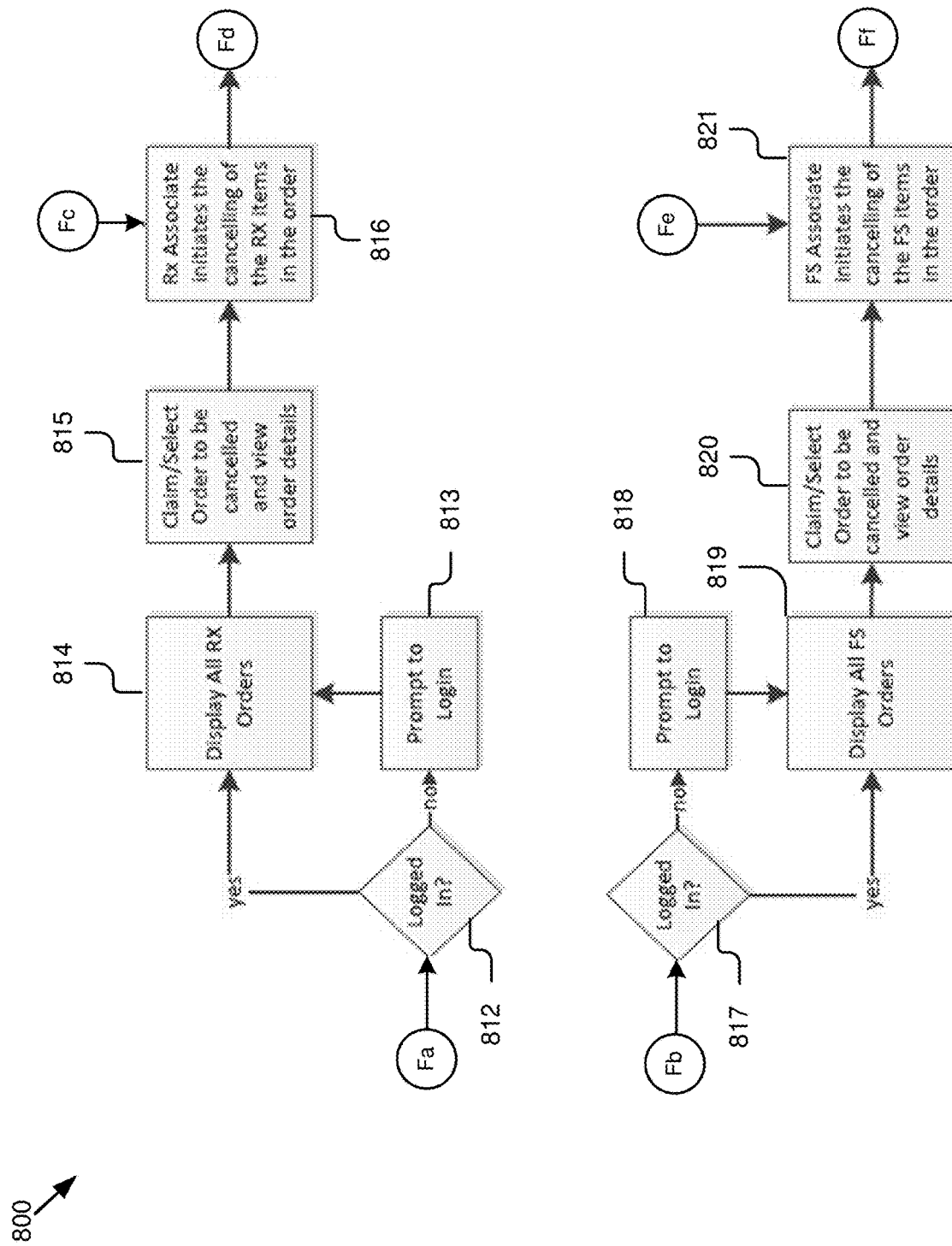
Figure 8C:
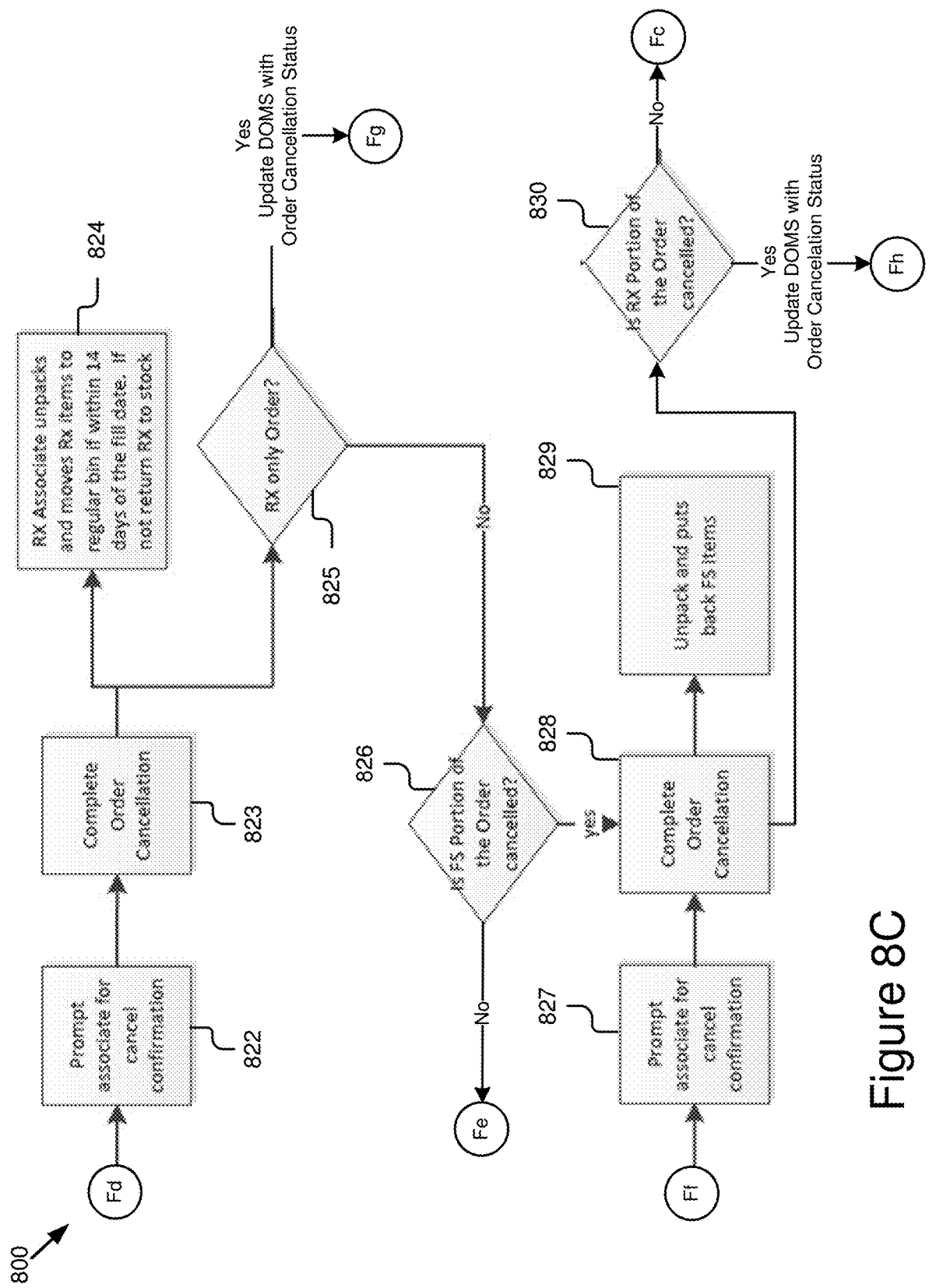
Figure 8D:
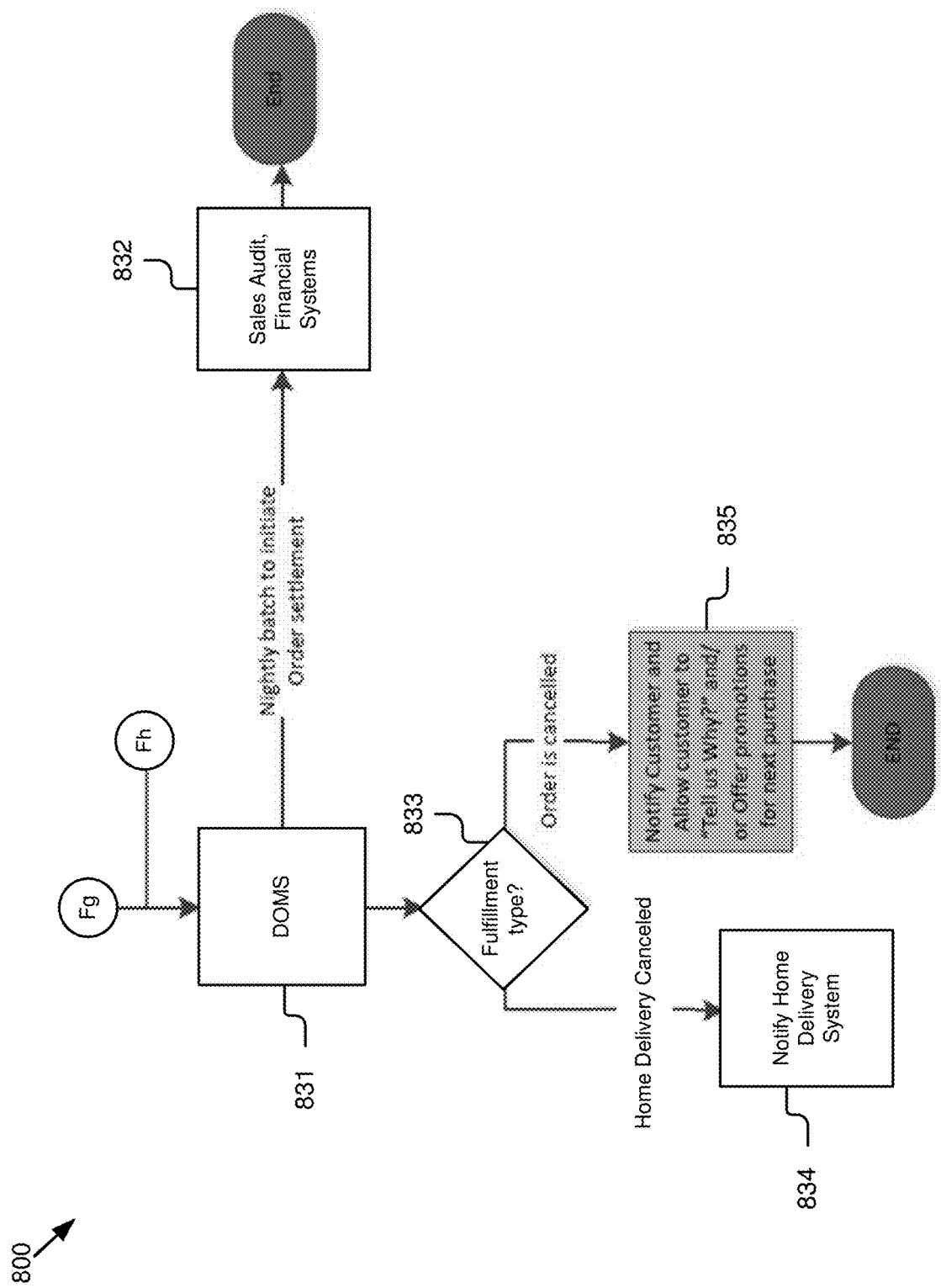

FIGS. 4A-4C are flowcharts of a second example method 400 for ordering items (Process C). For example, the method in FIGS. 4A-4C provides awareness of delivery options available to the user. According to some implementations, the example method 400 depicted in FIGS. 4A-4C illustrates an ordering process executed using the order pre-processing application 106, the DOMS 110, and/or distributed between the order pre-processing application 106 and the DOMS 110. For instance, the operations of the example method 400 are described as being performed by the order pre-processing application 106, however, other implementations are possible and contemplated herein.

At 402, in some implementations, the order pre-processing application 106 may determine that the incoming channel is from a mobile application (e.g., executed on a client device 108 with a small size display, such as a smartphone or tablet), for example. If the incoming channel is not a mobile application, the order pre-processing application 106 may receive a prescription and store number from the user. For instance, the order pre-processing application 106 may display graphical interfaces into which a user may input a prescription number (or select a prescription from a history of previously ordered prescriptions), select a store (e.g., from a list based on a location of the client device 108 of the user, previous orders, or other information), and/or provide other information concerning the order.

At 406, if the incoming channel is from a mobile application, the order pre-processing application 106 may render one or more graphical interfaces via which the user may enter a prescription number or identification and may identify a store or pharmacy to fulfill the order. In some implementations, to facilitate identification of the prescription, the order pre-processing application 106 may interface with an optical sensor (e.g., a digital camera) on a client device 108 to scan a barcode or label on a prescription thereby retrieving information that may be used by the order pre-processing application 106 to identify and facilitate reordering of the prescription.

In some implementations, at 408, the order pre-processing application 106 the order pre-processing application 106 may provide a notification to the user that the order has been confirmed for fulfillment. In some implementations, the notification at 408 may be sent after the prescription and/or other items has been prepared at a store 112. In some implementations, an additional notification may be sent to the user (e.g., via an SMS or push notification sent to the client device 108) when the store 112 has prepared the order for pick up.

At 410, the order pre-processing application 106 may determine whether the user or client device 108 is authenticated. For instance, the order pre-processing application 106 may determine whether the user has properly logged in to the application or website and, in some instances, has passed a fraud detection and/or machine detection test (e.g., a CAPTCHA or Completely Automated Public Turing test to tell Computers and Humans Apart).

At 412, in response to determining that the user is authenticated, the order pre-processing application 106 may send, for display on the client device 108, a graphical element that informs the user about potentially fulfilling the order using one of the fulfillment methods described elsewhere herein (e.g., the "eliminate-the-wait," "home delivery," and "curbside" fulfillment options described herein). In some instances, the order pre-processing application 106 may display an option to the user to have all or a portion of the order fulfilled using one of the fulfillment methods. In some implementations, the order pre-processing application 106 may determine whether the order qualifies for one of the fulfillment methods described herein in response to which it may send the notification to the user. For instance, the order pre-processing application 106 may evaluate attributes (e.g., tags, metadata, etc.) of items in an order and determine whether the items, individually or as a group, qualify for a particular fulfillment option.

At 414, the order pre-processing application 106 may determine whether the user has enrolled in using SMS (or another method of communication) for notifications, and, in response to a positive determination, the method may proceed to process A described in FIGS. 5A-5E. At 416, in response to determining that the user has not yet enrolled in using SMS, the order pre-processing application 106 may prompt the user to enroll or opt-in to SMS communications. It should be noted that these operations are optional and that other operations and/or communication methods are possible and contemplated herein.

In response to determining that the user or client device 108 is not authenticated, the order pre-processing application 106 may send the redirect the application or webpage to one or more user interfaces configured to authenticate the user or client device 108 at 418. For instance, the user authorization system 152 may request credentials from the user or client device 108, match the credentials to authentication data stored in the user authorization database 154, and, in some instances, authenticate the client device 108 of the user.

In some implementations, the user authorization system 152 or the order pre-processing application 106 may determine whether to create an account for the user. For instance, in response to determining that no account exists or the user is not authenticated, the user authorization system 152 may determine to provide graphical user interfaces via which the user may create an account. At 422, the user authorization system 152 may, in response to determining to create a user account, provide graphical interfaces that assist a user to automatically create an account and, in some instances, inform the user about the fulfillment options described herein. At 424, the user authorization system 152 may, in response to determining not to create a user account, provide graphical interfaces informing the user about the fulfillment options and allowing the user to continue using the application or website.

FIGS. 5A-5E are flowcharts of an example method 500 for intelligently pre-processing an order in preparation for fulfillment (Process A). According to some implementations, the example method 500 depicted in FIGS. 5A-5E includes verifying the identification and determining the access channel (e.g., the order pre-processing application 106, web access, SMS text messaging, etc.) to the DOMS 110 used by a user. The method 500 includes determining whether valid user consent is on file or whether an order qualifies for the techniques described herein, whether to provide mixed ordering for a store 112, and which delivery options to provide to the user. The method 500 may also allow a user to sign for the prescriptions and pay for the order. Although the method 500 is described in reference to the DOMS 110 and the order pre-processing application 106, some or all of its operations may be performed by other components of the system 100. Additionally, it should be noted that the method 500 may include fewer or additional operations without departing from the scope of this disclosure.

In some implementations, at 502, the order pre-processing application 106 or DOMS 110 may send a push notification to a client device 108 and, at 504, the client device 108 may receive and display the push notification to the user. For instance, the client device 108 may display the notification to the user in response to a signal received from the order pre-processing application 106. The notification may indicate to the user that the order (e.g., placed in the method 300, the method 400, or according to another order placement process) is being processed. In some instances, the notification may also or alternatively provide fulfillment options, such as one of the fulfillment options described herein, or a message indicating that fulfillment operations are available. In some implementations, the notification may include a link or other selectable element that redirects the client device 108 to a subsequent user interface, for instance, as described elsewhere in FIGS. 5A-5E (e.g., at 518 or 520).

Additionally or alternatively, in some implementations, the order pre-processing application 106 or DOMS 110 may send an SMS (or MMS or other communication) a client device 108 at 506, and at 508, the client device 108 may receive and display the SMS message to the user. The SMS may include the same or similar notification as is described, for example, in reference to 502 and 504 above.

In some implementations, the order pre-processing application 106 may determine whether a pharmacy application is installed on the client device 108 at 510 and, at 512, in response to determining that the pharmacy application is not installed on the client device 108, the order pre-processing application 106 may determine whether the client device 108 (e.g., the incoming device with which the order pre-processing application 106 or DOMS 110 is communicating) is a mobile device (e.g., a smartphone, smartwatch, tablet, or similar device, for example, depending on graphical interface design parameters). If the client device 108 is not a mobile device, for example, accessing the interfaces via a mobile web browser, the order pre-processing application 106 may redirect the client device 108 to a desktop web interface or, in some instances, end the process.

At 514, for example, in response to determining that a pharmacy application is installed on the client device 108, the order pre-processing application 106 may determine whether it remembers the state of the client device 108 at 514. For instance, the order pre-processing application 106 may determine whether a parameter associated with the client device 108 is associated with a fulfillment choice. For example, if a location of the client device 108 is within a defined radius of a given store, the client device 108 may be eligible for one or more of the fulfillment options. In another example, a fulfillment preference or other state may be linked to the client device 108 or defined in a profile or application settings.

At 516, in response to determining that a state has been stored in an accessible database for the client device 108, application, or user, the order pre-processing application 106 may determine whether the patient ID in the order matches the patient ID of the user or of a person for whom that user has delegated authority. For instance, the user of the client device 108 may be a caregiver and the patient may be a caregivee, such as in a parent-child, eldercare, hospice, or similar arrangement. The order pre-processing application 106 or another component of the system 100, such as the DOMS 110, may store mappings between client devices 108, users, user profiles, patient IDs, caregiver-caregivee relationships, etc., and may use the mappings to evaluate whether a user has permission established in the computing system (e.g., hosted on the control server 104) to handle prescriptions, controlled substances, or other orders on behalf of a patient.

At 518, the order pre-processing application 106 or DOMS 110 may display the DO™ mobile application page including a selectable graphical element via which the user may select a fulfillment option, such as those described herein.

At 520, if the order pre-processing application 106 determines that the patient ID does not match or that the user does not have permission to handle orders on behalf of the patient, the order pre-processing application 106 or DOMS 110 may display the DO™ mobile application page excluding one or more fulfillment options, such as those described herein.

At 522, the order pre-processing application 106 may determine whether it remembers the state of the client device 108, as described in reference to 514. At 524, the order pre-processing application 106 may determine whether the mobile identifier/XID in the order matches the patient ID of the user or of a person for whom that user has delegated authority, as described in reference to 516.

At 526, the order pre-processing application 106 or DOMS 110 may display the DO™ mobile web page including a selectable graphical element via which the user may select a fulfillment option, such as those described herein.

At 528, if the order pre-processing application 106 determines that the XID does not match or that the user does not have permission to handle orders on behalf of the patient, the order pre-processing application 106 or DOMS 110 may display the DO™ mobile web page excluding the fulfillment option, such as those described herein.

It should be noted that although operations 502 through 528 are described in reference to a mobile device, similar operations for verifying the client device 108 and user may be performed for a desktop web page or other interface.

At 530, the order pre-processing application 106 may determine whether the intake channel is from a push notification and, in response to a negative determination at 530, may determine, at 532 whether there is a valid consent on file. For example, the order pre-processing application 106 may determine whether the user has previously consented to using a fulfillment option (whether an option selected by the user or all available options for the user).

At 534, in response to the intake channel being from push or a valid consent being on file, the order pre-processing application 106 may determine whether a front store option is switched off or enabled for eliminate-the-wait fulfillment at the selected store 112. For instance, the order pre-processing application 106 may retrieve attributes for the store 112, which may include an administrative setting indicating whether or not orders, such as those using the eliminate-the-wait fulfillment processes described herein (e.g., in reference to FIGS. 6A-6G), may be retrieved at a front store location (e.g., at a kiosk, cash register, customer service, or other location separate from a pharmacy in a store 112).

Front store and retail may be used interchangeably throughout this disclosure. It should be noted that a front store or retail item may refer to any item that is not required to be filled by a pharmacy, such as a prescription, depending on the implementation. For instance, a front store item may be a retail or non-prescription item that, according to some implementations, may be fulfilled using the retail fulfillment system 116 or that may otherwise not be fulfilled at the pharmacy or by a pharmacist, for example. Similarly, a front store or retail associate is any store associate that is associated with fulfilling front store or retail items. Additionally, although the term "front" store is used, it merely indicates a distinction, according to some implementations, from pharmacy and should not be construed as a physical location within a store 112, for example.

At 536, for instance, in response to determining that the front store option is available at the selected store 112, may determine whether the user would like to add front store items to the order, for instance, in addition to the prescription item(s) already added (e.g., as described in reference to FIG. 3A-3B or 4A-4C). In some implementations, the order pre-processing application 106 may display a graphical interface on the client device 108 including an option for the user to add front store items to the order.

At 538, the order pre-processing application 106 may display a virtual shopping cart for prescription items (and/or retail items, in some implementations). In some instances, the graphical interface in which the cart is displayed may include fulfillment options depending on those options available for the specific prescription, specific store 112, specific user, or other factors. For instance, based on the determination at 534, the order pre-processing application 106 may display the eliminate-the-wait fulfillment option. In some implementations, the graphical interface(s) displayed on the client device 108 at 538 may include other options, for instance, the order pre-processing application 106 may present an option to the user to enroll in the home delivery order fulfillment option (e.g., using Uber® or other delivery service), for example, described in reference to FIGS. 7A-7I. In another example, the order pre-processing application 106 may present an option to the user to enroll the user to communicate with the control server 104, store 112, or delivery system 120, for example, via SMS, MMS, e-mail, or another communication method.

At 540, the order pre-processing application 106 (or another component of the system 100) may direct the client device 108 to a webpage or otherwise display a graphical interface to a user including front store items.

At 542, for instance, upon selection of a graphical element to view a cart or checkout, the order pre-processing application 106 may display a virtual shopping cart including both prescription and front store items. In some instances, the virtual shopping cart may also include the selected and/or available fulfillment options. For instance, as described above, the eliminate-the-wait, home delivery order fulfillment, or other fulfilment options may be displayed in the virtual shopping cart.

At 544, in some implementations, if the user has not already signed in, been authenticated, or created an account, the order pre-processing application 106 may prompt the user to sign in or create an account and may provide graphical interfaces, receive inputs, and authenticate the user accordingly.

In some implementations, at 546, the order pre-processing application 106 may determine whether the identification of the user who signed in (e.g., at 544) is the same as the patient on the prescription or to whom the original SMS or push notification was sent. At 548, if the user is a different person than the patient, the order pre-processing application 106 may present an option to the user to add a prescription for themselves. For instance, if a caregiver is picking up a prescription for a caregivee, the caregiver may have the option to add additional prescriptions (and/or, in some instances, front store items) in a combined virtual cart.

At 550, the order pre-processing application 106 may present disclosures regarding prescriptions to the user and receive an e-signature from the user for the prescriptions, for example, as described elsewhere herein. In some implementations, the order pre-processing application 106 may record the e-signature and various connected information and store the e-signature in association with the connected information in an accessible database, which may be accessible by the DOMS 110 or one or more computing systems of the store 112 when the order is delivered to the user. For example, the order pre-processing application 106 may record and map together the e-signature, user identification, time, client device 108 information (e.g., IP address, application information, phone number, location, etc.), time spent reviewing the disclosures, or acknowledgements of a disclosure, etc. As described elsewhere herein, once the user confirms receipt of the prescription(s) (e.g., using a tracking token), the e-signature and associated information may be further linked with the tracking token, time of receipt, etc.

In some implementations, at 552, the order pre-processing application 106 may receive payment from the user for the items in the order and, in some instances, the selected fulfillment option. For instance, if home delivery order fulfillment is selected, the order pre-processing application 106 may automatically calculate the delivery charge (e.g., based on the location of the store 112, client device 108, and other applicable factors) and add it, along with taxes, etc., to the cost of the order.

At 554, the order pre-processing application 106 may submit the order to the DOMS 110, which may parse the order and, depending on the specifics of the order, coordinate with the delivery system 120, fulfillment consolidation system 114, retail fulfillment system 116, pharmacy fulfillment system 118, and/or client device 108 to fulfill the order at 556. In some implementations, at 558 the order pre-processing application 106 or DOMS 110 may transmit notifications to a client device 108 as the order is being fulfilled (e.g., when the prescription is being filled, when the order is ready for pickup, when the order is being delivered, etc.).

FIGS. 6A-6G are flowcharts of an example method 600 for intelligently fulfilling an order for in-store pick up (Process D). According to some implementations, the example method 600 depicted in FIGS. 6A-6G includes orchestrating fulfillment of the pharmacy items and retail items in an order. The method 600 is an example implementation of "eliminate-the-wait" fulfillment discussed elsewhere herein. For example, the method 600 may include providing fulfillment instructions to the retail fulfillment system 116 for the retail items and to the pharmacy fulfillment system 118 for the pharmacy items. The example method 600 may also include tracking and verifying the transfer of retail items and prescription items within the store 112 and to the user using one or more tokens, as described elsewhere herein. Further, it should be noted that although the techniques described in reference to the method 600 are described as being performed by certain components of the system 100, other implementations are possible, such as where the operations are distributed among the components of the system 100 or performed by other components than described in reference to the method 600.

At 601, the order pre-processing application 106 may submit order data describing the order to the DOMS 110 and, at 602, the order processing system 142 of the DOMS 110 may process the received order data to induct a file describing the order into the order processing system 142. At 603, the DOMS 110 may notify the patient and/or user, for example, to indicate that the order has been received and is being processed.

At 604, the DOMS 110 may communicate with one or more computing systems of the store 112, such as the fulfilment consolidation system 114, the retail fulfillment system 116, or the pharmacy fulfillment system 118, to fulfill the order, for example, as described in reference to one or more of method steps 607-659 of the method 600.

At 605, the DOMS 110 may send a notification to the user and/or patient (e.g., if the patient is a different person than the user, as described above) on one or more of the client devices 108. For instance, the DOMS 110 may send a notification when the state of an order changes, such as when the order is ready for pick up, when the order has been picked up, etc.

In some implementations, at 606, the DOMS 110 may perform a periodic (e.g., hourly, nightly, etc.) batch transmission to initiate order settlement, for example, for payment. For instance, the settlement may include communication with the delivery system 120, an insurance company server, or a banking institution. The DOMS 110 may perform a transaction audit by communicating with one or more computing devices configured to perform audits.

At 607, in some implementations, the fulfillment consolidation system 114 may receive a signal with the order data from the DOMS 110, although, in other implementations, the DOMS 110 may communicate directly with one or both of the retail fulfillment system 116 and the pharmacy fulfillment system 118. For example, in some implementations, at 608 and 609, the fulfillment consolidation system 114 may determine whether the order includes only prescription items or whether the order includes both prescription and front store items.

At 610, the order data including identification of at least the prescription items in the order may be sent from the fulfillment consolidation system 114 to the pharmacy fulfillment system 118. In some implementations, in response to receiving the order data, the pharmacy fulfillment system 118 may issue an alert on an output device associated with the pharmacy fulfillment system 118 indicating to a pharmacy associate that an order with prescription items has been received. In some instances, the alert may indicate whether the order is a purely prescription order (e.g., fulfilled at the pharmacy of the store 112) or whether the order is mixed including both pharmacy and front store items.

At 611, the pharmacy fulfillment system 118 may place the order in a digital queue and, at 612, may provide the queue and/or order information to a pharmacy associate interacting with the pharmacy fulfillment system 118. For instance, in some implementations, a computing device included in or associated with the pharmacy fulfillment system 118 may include a pick-and-pack device, such as a register, mobile scanner, smartphone, tablet, etc., communicatively coupled with the pharmacy fulfillment system 118. A pick-and-pack device may run a pick-and-pack application for interfacing with one or more of the components of the system 100. For example, a pick-and-pack application may communicate with or be part of the fulfillment consolidation system 114, the retail fulfillment system 116, and the pharmacy fulfillment system 118. For example, a computing system 114, 116, and/118 may consist of or comprise a pick-and-pack device.

At 613, the pharmacy fulfillment system 118 may determine whether the pharmacy associate is logged in. If the pharmacy associate is logged in to the pharmacy fulfillment system 118 and authenticated, the method 600 may continue to 618. If the pharmacy associate is not logged in, the method 600 may continue to 617.

At 614, the DOMS 110 or fulfillment consolidation system 114 may split the order data (e.g., to separate the pharmacy and retail components) and transmit the order data describing the front store items to the retail fulfillment system 116 and the retail fulfillment system 116, in some instances, may issue an alert on an output device associated with the retail fulfillment system 116 indicating to a retail associate that an order with front store items has been received. In some instances, the alert may indicate whether the order is a purely a front store/retail order or whether the order is mixed including both pharmacy and front store items.

At 615, the retail fulfillment system 116 may place the order in a digital queue and, at 616, may provide the queue and/or order information to a retail associate interacting with the retail fulfillment system 116, for instance, a computing device included in or associated with the retail fulfillment system 116 may include a pick-and-pack device, such as a register, mobile scanner, smartphone, tablet, etc., communicatively coupled with the retail fulfillment system 116.

At 616, the retail fulfillment system 116 may determine whether the retail associate is logged in. If the retail associate is logged in to the retail fulfillment system 116, the method 600 may continue to 624. If the retail associate is not logged in, the method 600 may continue to 617.

At 617, if the pharmacy associate is not logged in, the computing device via which the pharmacy associate is accessing the pharmacy fulfillment system 118 may prompt the pharmacy associate to log in and may authenticate the pharmacy associate. Similarly, if the retail associate is not logged in, the computing device via which the retail associate is accessing the retail fulfillment system 116 may prompt the retail associate to log in and may accordingly authenticate the retail associate.

At 618, the pharmacy fulfillment system 118 may display a graphical interface including representations of all orders, the first few orders in a queue, or a current order in the queue for fulfillment and, at 619, the graphical interface may allow the pharmacy associate to select the order and view the order details. The pharmacy fulfillment system 118 may display the pharmacy items or, in some instances, all items in the order. In some implementations, the pharmacy fulfillment system 118 may communicate with a prescription processing system 150 or other component of the control server 104 to determine specific information about the prescriptions in the order, such as quantities, expiration dates, contraindications, etc., which may be automatically displayed to the pharmacy associate in association with prescription items in the order.

At 620, as the pharmacy associate fills or retrieves a prescription, the pharmacy fulfillment system 118 may receive inputs or optical scans identifying the prescriptions as they are filled or retrieved.

In some implementations, at 621, the pharmacy fulfillment system 118 may prompt the pharmacy associate for a package-later flag. In some instances, the pharmacy fulfillment system 118 may receive information from the prescription processing system 150 including instructions for a particular prescription to package the prescription at a later time, in which instance the pharmacy fulfillment system 118 may display the flag to the pharmacy associate. In some instances, the pharmacy associate may manually associate, for example at 622, that a prescription is to be packaged later (e.g., by flagging the prescription during when filling the prescription) so that the pharmacy fulfillment system 118 may prompt a pharmacy associate to fill the prescription at a later time before delivery to the user/patient. Similarly, at 623, the pharmacy fulfillment system 118 may prompt the pharmacy associate or receive a flag from the pharmacy associate indicating that a particular prescription of the order is to be mixed later or refrigerated until pickup or delivery. The pharmacy fulfillment system 118 may continue to method step 629, described in reference to FIG. 6D.

At 624, the retail fulfillment system 116 may display a graphical interface including representations of all orders, the first few orders in a queue, or a current order in the queue for fulfillment and, at 625, the graphical interface may allow the retail associate to select the order and view the order details. The retail fulfillment system 116 may display the front store items, but it may also indicate that the order also includes prescription items. In some implementations, the retail fulfillment system 116 may communicate with a retail processing system 148 or other component of the control server 104 to determine specific information about the front store items in the order, which may be automatically displayed to the retail associate.

At 626, as the retail associate fills or retrieves a front store item, the retail fulfillment system 116 may receive inputs or optical scans identifying the items as they are retrieved/picked by the retail associate or by an automated mechanism coupled with the retail fulfillment system 116.

In some implementations, the retail fulfillment system 116 may receive input from the retail associate indicating a quantity of labels to be printed at 627, and may separately or simultaneously input whether any labels are needed for items that do not fit in a bag at 628. For instance, a particular order may include a set of front store items that fit into four bags and one large item that does not fit in a bag. A retail associate may input into the retail fulfillment system 116 that 5 labels are required (or this number may be determined automatically based on the size and/or quantity of items by the retail fulfillment system 116), in response to which, the retail fulfillment system 116 may automatically print appropriate labels, for instance including barcodes, QR codes, or other codes that identify the items, bags, or order, which may be attached to the bags and/or large item, for example, at 634.

At 635, the retail fulfillment system 116 may automatically print a receipt for the entire order (e.g., both the front store and prescription items in a mixed order) or, in some implementations, for only the retail/front store items. The retail associate may then attach the receipt to the bags.

At 636, once the front store items in the order have been picked, retrieved, and/or labeled by the retail associate, the retail fulfillment system 116 may receive input from the retail associate indicating that the front store portion of the order has been completed. In some implementations, at 637, the retail fulfillment system 116 may output audio or visual information to the retail associate prompting the retail associate to bring the labeled front store items to a designated location within the store 112, for instance, in a pharmacy area.

In some implementations, the pharmacy fulfillment system 118 may receive input from the pharmacy associate indicating a quantity of bag labels to be printed or labels placed directly on prescription items at 629 and, in response, the pharmacy fulfillment system 118 may automatically print appropriate labels, for instance including barcodes, QR codes, or other codes that identify the prescription items, bags, or order at 630, which may be attached to the bags by the pharmacy associate.

At 631, the pharmacy fulfillment system 118 may determine whether the order includes prescription items (e.g., items fulfilled at the pharmacy using the pharmacy fulfillment system 118) or if the order is a mixed order also including front store items. If the pharmacy fulfillment system 118 determines that there are no front store items in the order, the pharmacy fulfillment system 118 may print (e.g., by sending a printer to a printer) a prescription receipt, which may be attached to the bag/prescription by the pharmacy associate and, at 633, the pharmacy fulfillment system 118 may update the status of the pharmacy portion of the order as completed.

At 638, the retail/front store associate may leave the front store items (e.g., in bags) at in the pharmacy area and, at 639, the labels (e.g., a barcode on the label) on the front store items or bags may be scanned by the pharmacy fulfillment system 118. In some implementations, in response to scanning a label, the pharmacy fulfillment system 118 may update the status for the items corresponding to that label in the DOMS 110 (e.g., in the retail processing system 148, prescription processing system 150, or a database accessible by one or more of the components of the DOMS 110).

At 640, the pharmacy fulfillment system 118 may determine whether the pharmacy portion of the order is complete and, in response to a negative determination at 640, may output an alert to the pharmacy associate to complete the pharmacy portion of the order or may otherwise wait for input indicating that the order is complete at 641. For example, the pharmacy portion of the order may not yet be complete if the front store items/portion of the order is scanned or otherwise entered into the pharmacy fulfillment system 118 before the pharmacy is done preparing the prescriptions in the order.

In some implementations, at 642, the pharmacy fulfillment system 118 may evaluate whether there are any flags in the order and, if so, output additional instructions to a pharmacy associate. For instance, if a prescription was flagged as package later, mix later, or refrigerate (e.g., at 621, 622, or 623), the pharmacy fulfillment system 118 may output a prompt to the pharmacy associate to package, mix, or retrieve the flagged prescription item from the refrigerator. In some implementations, the pharmacy fulfillment system 118 may receive an input from the pharmacy associate confirming that the flagged item has been completed or the flag has been removed (e.g., up on packaging, mixing, and/or removing it from the refrigerator), at which point the pharmacy fulfillment system 118 may transmit a signal to the DOMS 110 indicating that the order has been prepared and, in some instances, is ready for pick up or delivery.

In some implementations, the DOMS 110 (e.g., the delivery processing system 160, the tracking token generator 144, or the tracking token modifier 146) may transmit a notification to a client device 108 indicating that the order is ready, for example, for pick up by the user. In some implementations, the notification may include or link to a tracking token or ticket (e.g., as described above). At 643, the user may present the tracking token to an associate, such as the pharmacy associate in the store 112. The associate may scan the tracking token (e.g., whether the tracking token includes a barcode, QR code, or other code or signal, such as a signal transmitted from the client device 108 via Near-Field Communication or Bluetooth® to the pharmacy fulfillment system 118). Upon receipt of the tracking token, the pharmacy fulfillment system 118 may verify the tracking token, as described above, recognize that the tracking token indicates that the user is presenting the tracking token to retrieve the order, and identify the order based on the tracking token.

At 644, the pharmacy fulfillment system 118 may open the order details of the order corresponding to the received token. For example, in some implementations, as described above, the order details may be opened on a pick and pack device.

At 645, the pharmacy fulfillment system 118 may check whether there are any remaining package-later flags (or mix or refrigerate) in the order. If there are no package-later flag, the pharmacy fulfillment system 118 may output a prompt instructing the pharmacy associate to scan the bags in the order and the method 600 may advance to 648.

In response to the pharmacy fulfillment system 118 determining at 645 that there is a package-later flag for an item, the pharmacy fulfillment system 118 may output an alert to the pharmacy associate indicating to package, mix, transcribe notes, retrieve the item from refrigeration, or perform another operation based on the specific flag or any notes or instructions attached thereto. In some implementations, the alert may be an audible alert played through a speaker of the pharmacy fulfillment system 118 (e.g., a speaker of a pick and pack device, register, etc.), although other implementations are possible.

At 647, the pharmacy fulfillment system 118 may receive an input from the pharmacy associate that the flagged item has been completed.

At 648, the pharmacy fulfillment system 118 may receive input, such as a scan of a label attached to a bag or directly to an item, as discussed above. As a label is scanned, for instance, the pharmacy fulfillment system 118 may match the label against one or both of the order data and the label data to verify, at 649, that the correct bags have been scanned. If a label is scanned that does not belong in the order or, in some implementations, if a label is excluded from the scan, the pharmacy fulfillment system 118 may output an error message, such as an audible error, at 650.

At 651, the pharmacy fulfillment system 118 may receive an input from the pharmacy associate indicating that the labels in an order or portion of the order have been scanned and, at 652, the pharmacy fulfillment system 118 may determine, based on the order data, whether the correct quantity and/or label identifiers of the labels have been scanned. In response to the pharmacy fulfillment system 118 determining that not all of the proper labels have been scanned, the pharmacy fulfillment system 118 may output an audible or visual alert indicating that not all of the proper bags have been scanned. In some implementations, an audible alert may be accompanied by a graphical element displayed on a display of the pharmacy fulfillment system 118 indicating which items or labels were not scanned.

At 654, for instance, if the labels in the order were properly received by the pharmacy fulfillment system 118, the pharmacy fulfillment system 118 may determine whether any of the items in the order a marked as requesting that an identification of the user or patient be presented/verified. In response to determining that an ID is required, the pharmacy fulfillment system 118 may output a prompt to the pharmacy associate to verify, scan, or enter the ID of the user or patient.

In some implementations, at 656, the pharmacy fulfillment system 118 may output an audible and/or visual alert to the pharmacy associate to offer counsel for one or more of the items (e.g., prescriptions) in the order. For instance, the pharmacy fulfillment system 118 analyze the order information or communicate with the prescription processing system 150 to determine whether the user or patient has already received counseling, whether a prescription requires counseling, or whether to offer counseling regardless of whether the user has already received counseling.

At 657, the pharmacy fulfillment system 118 may record the user or patient response for the offer for counsel and, at 658, the pharmacy fulfillment system 118 may capture a date and time stamp and link it to the electronic signature captured when the order was submitted. In some implementations, the pharmacy fulfillment system 118 may then store the order data, counsel response, date and time stamp, and e-signature in a database accessible to the control server 104. For instance, at 659, the pharmacy associate may provide an input to the pharmacy fulfillment system 118 to mark the order as complete, in response to which the pharmacy fulfillment system 118 may transmit the order record with the linked information to the DOMS 110.

FIGS. 7A-7I are flowcharts of an example method 700 for intelligently fulfilling an order for home delivery (Process E). According to some implementations, the example method 700 depicted in FIGS. 7A-7I includes orchestrating fulfillment of the pharmacy items and retail items in an order and with a home delivery system 122. For example, the method 700 may include providing fulfillment instructions to the retail fulfillment system 116 for the retail items and to the pharmacy fulfillment system 118 for the pharmacy items. The example method 700 may also include tracking and verifying the transfer of retail items and prescription items within the store 112, to the home delivery system 122, or to the user using one or more tokens, as described elsewhere herein.

At 701, the order pre-processing application 106 may submit order data describing the order to the DOMS 110 and, at 702, the order processing system 142 of the DOMS 110 may process the received order data to induct a file describing the order into the order processing system 142. At 703, the DOMS 110 may notify the patient and/or user, for example, to indicate that the order has been received and is being processed.

At 704, the DOMS 110 may communicate with one or more computing systems of the store 112, a delivery system 122, or another component of the system 100, to fulfill the order, for example, as described in reference to one or more of method steps of the method 700.

At 705, the DOMS 110 may send a notification to the user and/or patient (e.g., if the patient is a different person than the user, as described above) on one or more of the client devices 108. For instance, the DOMS 110 may send a notification when the state of an order changes, such as when the order is ready for pick up, when the order has been picked up, etc. In some implementations, the DOMS 110 may notify the user that the order is nearly complete, has been picked up by a delivery service (e.g., associated with the home delivery system 122), is in transit to be delivered to the user, is a given time (e.g., 5, 10, 30 minutes) away, etc. For instance, in response to the order being completed at the store 112, picked up by a delivery service, or some other trigger, the DOMS 110, home delivery system 122, or another component of the system 100 may automatically determine an estimated time of arrival based on remaining steps in fulfillment, a transit time from a current location of a delivery associate, a backlog of orders or deliveries, or other factors.

In some implementations, at 706, the DOMS 110 may transmit a communication to a delivery system 120 for example, in response to the state of an order changing. For instance, in response to the order being marked as complete or ready for pick up (e.g., the order state changing in response to the DOMS 110 receiving a signal from the fulfillment consolidation system 114, the retail fulfillment system 116, or the pharmacy fulfillment system 118), the DOMS 110 may communicate with the home delivery system 122 to schedule a delivery of the order to the user or patient of the order. In some implementations, the tracking token generator 144 or 146 may generate or modify a tracking token for the home delivery system 122 and relay the tracking token (e.g., via the delivery processing system 160) to the home delivery system 122. Accordingly, a delivery service associated with the home delivery system 122 may use the received tracking token to verify authorization to receive the order from the store 112 and/or verify delivery to a user or patient, as described below.

In some implementations, at 707, the DOMS 110 may perform a periodic (e.g., hourly, nightly, etc.) batch transmission to initiate order settlement, for example, for payment. For instance, the settlement may include communication with the delivery system 120, an insurance company server, or a banking institution. The DOMS 110 may perform a transaction audit by communicating with one or more computing devices configured to perform audits.

Operations 708-730 of the example method 700 may be performed in substantially the same way as operations 607-630, respectively, of example method 600 described above. It should be noted that while an operation corresponding to 628 is not illustrated in reference to the method 700, this operation may, in some implementations, also be performed in the method 700.

In some implementations, at 731, the pharmacy fulfillment system 118 may output a prompt to a pharmacy associate indicating to attach a counsel tag to a prescription item or bag. For example, the pharmacy fulfillment system 118 may parse the order information, communicate with the prescription processing system 150 or with a third-party server, for example, to determine counseling information for one or more items (e.g., prescriptions) in an order. In some implementations, the pharmacy fulfillment system 118 may automatically determine whether a counsel tag should be attached to a prescription, determine the counsel information the counsel tag, and output a prompt to the pharmacy associate to attach the counsel tag to the prescription.

Operations 732-734 of the example method 700 may be performed in substantially the same way as operations 631-633, respectively, of example method 600 described above. Operations 735-737 of the example method 700 may be performed in substantially the same way as operations 634, 636, and 637, respectively, of example method 600 described above.

In some implementations, at 738, the retail fulfillment system 116 may output a prompt to the retail associate to stage, in a cooler or refrigerator, any items of the order that are flagged as requiring refrigeration (e.g., an attribute of an item in the order data describing the order is marked as requiring refrigeration).

In some implementations, at 739, the retail fulfillment system 116 may output a prompt to the retail associate indicating that one or more items in the order should be marked with a tag, such as a hazardous materials sticker. For instance, the retail fulfillment system 116 may determine, based on the order data (e.g., based on an attribute or data field associated with a particular item), or by communicating with the retail processing system 148 or a third-party server, that an item in the order is flagged as hazardous (or some other attribute) and may automatically print a tag or otherwise instruct the associate to place the tag on the item.

Operations 740-743 of the example method 700 may be performed in substantially the same way as operations 638-641, respectively, of example method 600 described above.

In some implementations, at 744, the pharmacy fulfillment system 118 may evaluate whether there are any flags or other instructions in the order and, if so, output additional instructions to a pharmacy associate. For instance, if a prescription was flagged as package later, mix later, or refrigerate (e.g., at 722, 723, or 724), the pharmacy fulfillment system 118 may output a prompt to the pharmacy associate to package, mix, or retrieve the flagged prescription item from the refrigerator. In some implementations, the pharmacy fulfillment system 118 may receive an input from the pharmacy associate confirming that the flagged item has been completed or the flag has been removed (e.g., upon packaging, mixing, and/or removing it from the refrigerator), at which point the pharmacy fulfillment system 118 may transmit a signal to the DOMS 110 indicating that the order has been prepared and, in some instances, is ready for pick up or delivery.

In some implementations, the determination of whether there are any additional instructions to output to the associate at 744 may be additionally or alternatively based on the selected fulfillment type. For instance, the pharmacy fulfillment system 118 may output instructions to a pharmacy associate indicating to prepare the order for pick up by a delivery service associated with a delivery system 120.

As described above in reference to the operation at 706, the DOMS 110 may transmit a notification to the delivery system 120. For instance, in some implementations, the DOMS 110 may receive a signal from the store 112 indicating that the order is ready for pick-up by a delivery service associated with the home delivery system 122, and the DOMS 110 may transmit a signal to the home delivery system 122, for instance, scheduling a delivery by the delivery service for the order (or multiple orders, depending on the implementations).

At 745, the home delivery system 122 may determine that a driver has arrived, for instance, at the store 112 to pick up the order. In some implementations, the home delivery system 122 may transmit a signal to the pharmacy fulfillment system 118 indicating that the driver has arrived.

At 746, the home delivery system 122 may transmit a signal to the retail fulfillment system 116, for instance, indicating that driver has arrived and, in some implementations, at 747, the home delivery system 122 may receive a signal from the retail fulfillment system 116 indicating the state of the order, for example, that the order is being fulfilled, is complete, is about to be taken to the delivery driver, or is ready for pick up by the delivery driver/service.

At 748, the pharmacy fulfillment system 118 may output an alert to a pharmacy associate indicating to keep the pharmacy (e.g., prescription) portion of the order ready for a pick up, for instance, by a front store/retail associate. In some implementations, the alert output at 748 may be in response to receiving a notification from the home delivery system 122 that the delivery driver/service has arrived (e.g., from the operation at 745).

Operations 749-756 of the example method 700 may be performed in substantially the same way as operations 645-652, respectively, of example method 600 described above. Operations 758 and 759 of the example method 700 may be performed in substantially the same way as operations 645-652, respectively, of example method 600 described above. It should be noted that while some operations are described in solely 700 or in 600, these operations may, in some implementations, be additionally or alternatively used in other methods described herein.

At 760, in some implementations, the tracking token generator 144 or tracking token modifier 146 may transmit a tracking token to the retail fulfillment system 116. For example, in response to receiving a signal indicating arrival of the delivery service at 746 or another trigger (e.g., completion of the pharmacy portion of the order), the tracking token generator 144 may generate a tracking token specific to the retail associate and order. For instance, the tracking token may be configured to identify the retail associate signed into a pick-and-pack device and, in some instances, authorize the transfer one or more items in order (e.g., the pharmacy portion, a prescription, a controlled substance, or other item) to the associate or system authorized by the tracking token.

At 761, the front store/retail associate may show or transmit the tracking token to the pharmacy fulfillment system 118. For instance, the retail fulfillment system 116 may display a QR code on its display, which may be scanned by the pharmacy fulfillment system 118. In another implementation, the retail fulfillment system 116 may transmit (e.g., via wired or wireless data transmission) the tracking token in a signal to the pharmacy fulfillment system 118.

In some implementations, at 761, the retail fulfillment system 116 or pharmacy fulfillment system 118 may also scan some or all of the labels of the order to verify that the correct items corresponding to the authorization of the tracking token are being transferred.

In some implementations, at 762, the retail fulfillment system 116 may display a graphical interface indicating that it is ready to receive a tracking token, which may be performed, for example, in response to the pharmacy associate marking the pharmacy portion of the order as complete at 759. In some implementations, the graphical interface may be automatically surfaced on a pick-and-pack device of the retail fulfillment system 116, for instance, in response to a change in the order state. The graphical interface may instruct the retail associate to bring the items in the order (whether front store, prescription/pharmacy, or both) to a pick up location at 763. The pick-up location may be located at a designated location in or adjacent to the store 112.

At 764, the retail fulfillment system 116 may receive a tracking token from the delivery service. In some implementations, the home delivery system 122 may receive a tracking token identifying the home delivery system 122, driver, or driver's computing device communicatively coupled with the home delivery system 122, and authorizing the home delivery system 122 to receive the order (e.g., in the same way as is described above in reference to 760-761). For instance, the tracking token may be transferred from a computing device of the delivery service (e.g., the home delivery system 122, a component thereof, or a computing device coupled thereto) to the device described in reference to 762. In some instances, the tracking token may be encoded in a barcode or QR code (or some other code or image) and displayed on a mobile device of the driver. The retail fulfillment system 116 (e.g., a pick-and-pack device of the retail fulfillment system 116) may scan the barcode or QR code, verify the tracking token/authorization, and record the details of the transaction, as described in reference to 761 above. It should be noted that the tracking token may also or alternatively include a file containing identification and/or authorization data, as described above.

In some implementations, at 764, the retail fulfillment system 116 may also scan some or all of the labels of the order to verify that the correct items corresponding to the authorization of the tracking token are being transferred to the driver. This operation may additionally or alternatively, be performed by the home delivery system 122 or a device of the driver communicatively coupled with the DOMS 110. In some implementations, the retail fulfillment system 116, home delivery system 122, etc., may communicate with the DOMS 110 to verify and/or record the label(s) of the order at the transfer.

In some implementations, the retail fulfillment system 116 may verify the tracking token and/or labels at 765. For instance, the retail fulfillment system 116 may receive the tracking token and transmit the tracking token to the DOMS 110, which verifies the tracking token and sends a signal to the retail fulfillment system 116 indicating that the tracking token matches or has been verified. In some implementations, the retail fulfillment system 116 may verify the tracking token without transmitting it to another system for verification.

If the tracking token or labels fail the verification at 765, the retail fulfillment system 116 and/or home delivery system 122 may output an audible or visual alert at 766.

If the tracking token and/or labels are successfully verified at 765, the retail fulfillment system 116 and/or home delivery system 122 may transmit a notification to the DOMS 110 updating the status of the order as having been transferred to the delivery service at 767.

It should be noted that although the method 700 is described in an implementation where a retail fulfillment system 116 (and, in some instances, a retail associate) bringing the order to the pick-up location, these operations may be performed by a pharmacy associate and pharmacy fulfillment system 118, or by an associate and the fulfillment consolidation system 114, depending on the implementation.

In some implementations, although not illustrated in reference to the method 700, upon delivering the order to a user or patient, the home delivery system 122 may receive a token from a user (e.g., on a client device 108, printed, etc.) and repeat some or all of the operations described in reference to operations 763-767, except that instead of the retail fulfillment system 116 receiving the tracking token from the home delivery system 122, the home delivery system 122 receives the tracking token from the client device 108 or user.

In some implementations, some operations described as being performed by the retail fulfillment system 116 and pharmacy fulfillment system 118 (and, in some instances, their respective associates) in methods 600 and 700 may be performed by the fulfillment consolidation system 114. For example, operations 740-743 and/or 760-767 may performed by the fulfillment consolidation system 114 and, in some instances, an associate that has access (e.g., authorization, login credentials, etc.) for the fulfillment consolidation system 114.

In some implementations, a fulfillment method, as described herein, may include delivery to a curbside for pick up by a user or patient. For instance, a curbside location may include a designated parking space adjacent to the store 112. In some implementations, the fulfillment process for a curbside delivery may include operations of methods 600 or 700. For example, during curbside fulfillment, in the operations, such as those in 745-747 the home delivery system 122 may be replaced (e.g., the operations performed by and using) the client device 108.

For example, in curbside order fulfillment, a client device 108 of a user may transmit a notification to the DOMS 110 or one of the computing devices 114, 116, or 118 of the store 112 indicating, based on the geographical location of the client device 108 that the client device has arrived or is within a defined distance or estimated time of arrival to the store 112/pick up location at 745. For instance, the client device 108 may determine its location using GPS, cell towers, or other geolocation methods and communicate its location with the DOMS 110. The client device 108 may also transmit and receive the communications at 746 and 747.

In some implementations, the client device 108 or user/patient may present the tracking token authorizing the user/patient (e.g., rather than the delivery service/driver) to the retail fulfillment system 116 (or fulfillment consolidation system 114 or pharmacy fulfillment system 118, depending on the implementation) at 764-767.

FIGS. 8A-8D are flowcharts of an example method 800 for canceling an order. According to some implementations, the example method 800 depicted in FIGS. 8A-8D includes coordinating with the components of the system 100 to cancel the order.

At 801, the user may initiate an order cancelation, for example, from an order history page on a webpage or application associated with the control server 104 and, at 802, the DOMS 110 may receive the order cancellation request and, in some instances, relay the cancelation request to a computing device 114, 116, or 118 of the store 112.

Operations 804-811 of the example method 800 may be performed in substantially the same way as operations 608-612 and 614-616, respectively, of example method 600 described above. Operations 812-814 of the example method 800 may be performed in substantially the same way as operations 613, and 617-618, respectively, of example method 600 described above.

At 815, the graphical interface displayed by the pharmacy fulfillment system 118 may allow the pharmacy associate to select and view the details of the order corresponding to the cancelation request. The pharmacy fulfillment system 118 may display only the pharmacy or prescription items or all items in the order.

At 816, the pharmacy associate may provide input into the pharmacy fulfillment system 118 initiating the cancelation of packing and fulfillment of the pharmacy items in the order.

Operations 817-819 of the example method 800 may be performed in substantially the same way as operations 613, and 617-618, respectively, of example method 600 described above.

At 820, the graphical interface displayed by the retail fulfillment system 116 may allow the retail associate to select and view the details of the order corresponding to the cancelation request. The retail fulfillment system 116 may display the retail items and, in some instances, indicate whether the order also includes pharmacy items.

At 821, the retail associate may provide input into the retail fulfillment system 116 initiating the cancelation of packing and fulfillment of the retail items in the order.

At 822, the pharmacy fulfillment system 118 may output a prompt requesting confirmation of cancelation of the order or pharmacy component of the order, and, at 823 may receive an input from the pharmacy associate confirming cancelation and communicate the confirmation to the control server 104 (e.g., the order pre-processing application 106 or DOMS 110.

In some instances (e.g., if the pharmacy items have already been packaged), at 824, the pharmacy associate may unpack and move the pharmacy item(s) to a regular bin within the pharmacy within a defined time period (e.g., 14 days) of the fill date or return the pharmacy items to stock in the pharmacy area of the store 112. In some implementations, the pharmacy fulfillment system 118 may receive confirmation from the pharmacy associate once the item(s) have been restocked and/or may issue a reminder to a pharmacy associate to restock the item(s).

In some implementations, at 825, the pharmacy fulfillment system 118 may determine whether the order is a pharmacy only order or whether it includes front store/retail items. If the order is a pharmacy only order and the pharmacy fulfillment system 118 has received an input confirming cancelation of the items, the pharmacy fulfillment system 118 may transmit a signal to the DOMS 110 indicating that the order has been successfully cancelled.

If, at 825, the pharmacy fulfillment system 118 determines that the order includes front store/retail items, it may determine at 826 whether the front store portion of the order has been canceled. In some implementations, the pharmacy fulfillment system 118 may additionally or alternatively transmit a signal to the retail fulfillment system 116 indicating that the pharmacy portion of the order has been canceled and the retail fulfillment system 116 may determine whether the front store portion of the order has been canceled.

In response to the pharmacy fulfillment system 118 or the retail fulfillment system 116 determining that the front store portion of the order has not been canceled, the method may return to 821 to initiate cancelation and output a prompt to a retail associate requesting confirmation that the front store portion of the order has been successfully canceled at 827. At 828, the retail associate may input a cancelation confirmation into the retail fulfillment system 116.

At 829, the retail associate may unpack or unbag retail items and restock them in the store 112, for instance, if the front store/retail items have already been retrieved, picked, and/or packed.

In some implementations, at 830, the retail fulfillment system 116 may determine whether the pharmacy portion of the order has been canceled, for example, based on receiving a notification at 826 or based on communication with the pharmacy fulfillment system 118 or DOMS 110. If the pharmacy portion of the order is not yet cancelled, the method 800 may continue at 816. If the pharmacy portion of the order has been canceled, the retail fulfillment system 116 may transmit a signal to the DOMS 110 including the order cancelation status (e.g., as complete, accepted, or confirmed).

At 831, the DOMS 110 may receive a signal from the retail fulfillment system 116 or pharmacy fulfillment system 118 indicating that the order cancelation has been performed or that the cancelation status may be updated. At 832, the DOMS 110 may perform a transmission to initiate an order settlement, for example, as described in reference to 606 above.

At 833, the DOMS 110 may determine a fulfilment type for the order. For instance, the DOMS 110 may determine if the selected fulfillment type for the order includes home delivery (e.g., using the home delivery system 122). In response to determining that the fulfillment type includes home delivery, the DOMS 110 may transmit a notification to the home delivery system 122 indicating that the order has been canceled (e.g., if the home delivery system 122 has already been notified that a delivery is requested for the order). The DOMS 110 may additionally or alternatively notify the user or patient that the order has been successfully canceled at 835. In some instances, the DOMS 110 may send a survey, coupon, or other promotion to the user in response to the cancelation.

Figure 9:
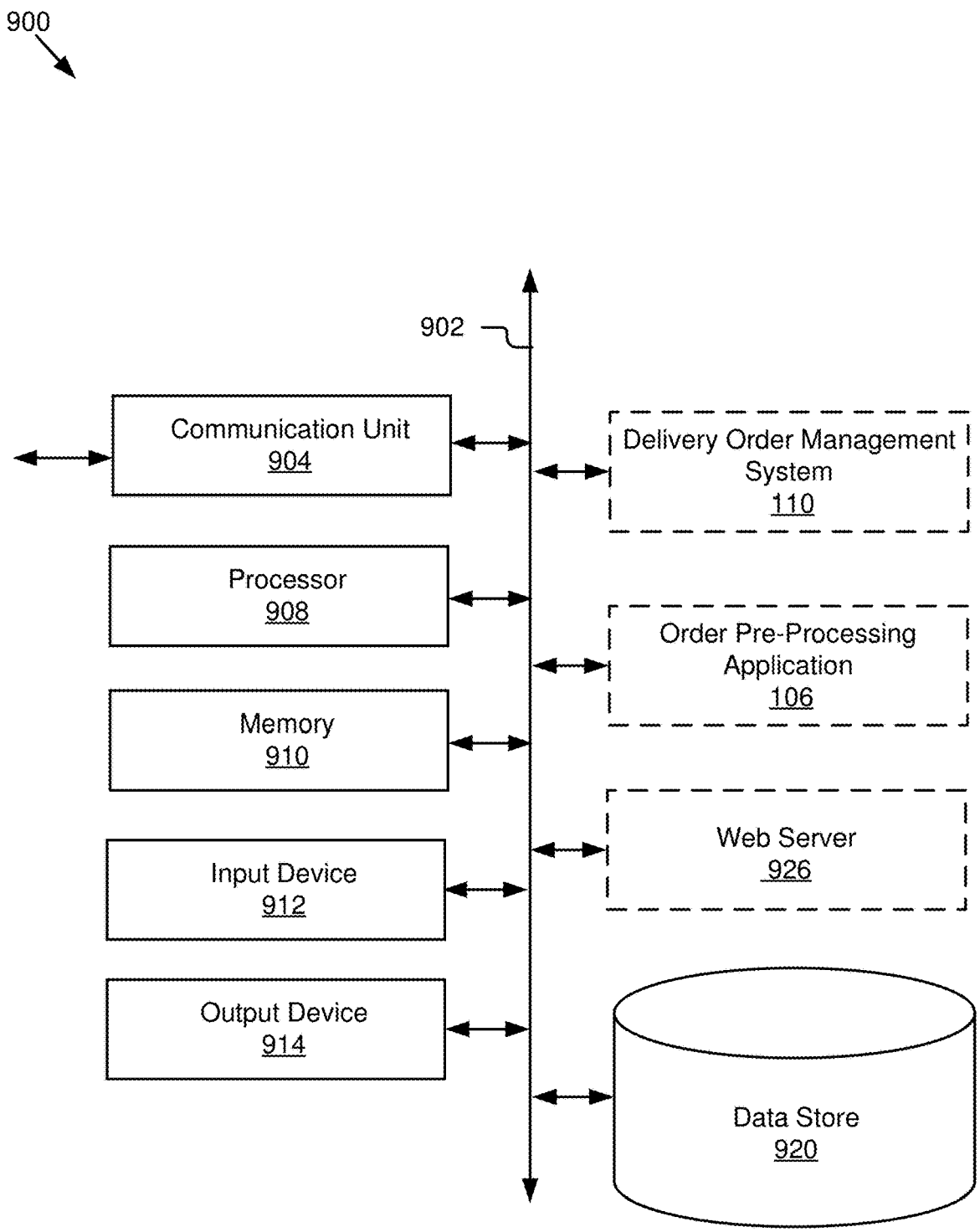
FIG. 9 is a block diagram of an example computing system for providing intelligent mixed order pre-processing and fulfillment.

FIG. 9 is a block diagram of an example computing device 900, which may represent the computer architecture of a client device 108, a control server 104, a delivery system 120, and/or a component 114, 116, or 118 of the store 112, as depicted in FIG. 1, depending on the implementation.

As depicted in FIG. 9, the computing system 900 may include an order pre-processing application 106, a DOMS 110, and/or a web server 926, depending on the configuration. For instance, a control server 104 may include one or more of the order pre-processing application 106 or the DOMS 110, and/or components thereof, although other configurations are also possible and contemplated.

The web server 926 includes computer logic executable by the processor 908 to manage content requests. The web server 926 may include an HTTP server, a REST (representational state transfer) service, or other suitable server type. The web server 926 may receive content requests (e.g., object search requests, HTTP requests) from client devices 108, cooperate with the DOMS 110, and/or the order pre-processing application 106 to determine the content, retrieve and incorporate data from the data store 920, format the content, and provide the content to the client devices 108, although other configurations are also possible and contemplated.

In some instances, the web server 926 may format the content using a web language and provide the content to a corresponding order pre-processing application 106 or web browser (not shown) for processing and/or rendering to the user for display. The web server 926 may be coupled to the data store 920 to store retrieve, and/or manipulate data stored therein and may be coupled to the order pre-processing application 106 and/or DOMS 110 to facilitate their operations. For example, the web server 926 may allow a user on a client device 108 to communicate with the DOMS 110 and/or the other components of the system 100.

The order pre-processing application 106 may include computer logic executable by the processor 908 to receive and pre-process orders and may be accessible via one or more graphical user interfaces, as discussed elsewhere herein. The order pre-processing application 106 is coupled to the data store 920 to store, retrieve, and/or manipulate data stored therein and may be coupled to the web server 926, the DOMS 110, and/or other components of the system 100 to exchange information therewith.

The DOMS 110 includes computer logic executable by the processor 908 to pre-process orders and intelligently orchestrate fulfillment, as discussed elsewhere herein. The DOMS 110 may be coupled to the data store 920 to store, retrieve, and/or manipulate data stored therein and may be coupled to the web server 926, the order pre-processing application 106, and/or other components of the system 100 to exchange information therewith.

As depicted, the computing system 900 may include a processor 908, a memory 910, a communication unit 904, an output device 914, an input device 912, and a data store 920, which may be communicatively coupled by a communication bus 902. The computing system 900 depicted in FIG. 9 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 900 may include various operating systems, sensors, additional processors, and other physical configurations. The processor 908, memory 910, communication unit 904, etc., are representative of one or more of these components.

The processor 908 may execute software instructions by performing various input, logical, and/or mathematical operations. The processor 908 may have various computing architectures to method data signals (e.g., CISC, RISC, etc.). The processor 908 may be physical and/or virtual, and may include a single core or plurality of processing units and/or cores. In some implementations, the processor 908 may be coupled to the memory 910 via the bus 902 to access data and instructions therefrom and store data therein. The bus 902 may couple the processor 908 to the other components of the computing system 900 including, for example, the memory 910, the communication unit 904, the input device 912, the output device 914, and the data store 920.

The memory 910 may store and provide access to data to the other components of the computing system 900. The memory 910 may be included in a single computing device or a plurality of computing devices. In some implementations, the memory 910 may store instructions and/or data that may be executed by the processor 908. For example, the memory 910 may store one or more of the web server 926, the order pre-processing application 106, the DOMS 110, and their respective components, depending on the configuration. The memory 910 is also capable of storing other instructions and data, including, for example, an operating system, hardware drivers, other software applications, databases, etc. The memory 910 may be coupled to the bus 902 for communication with the processor 908 and the other components of computing system 900.

The memory 910 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 908. In some implementations, the memory 910 may include one or more of volatile memory and non-volatile memory (e.g., RAM, ROM, hard disk, optical disk, etc.). It should be understood that the memory 910 may be a single device or may include multiple types of devices and configurations.

The bus 902 can include a communication bus for transferring data between components of a computing device or between computing devices, a network bus system including the network 102 or portions thereof, a processor mesh, a combination thereof, etc. In some implementations, the web server 926, the order pre-processing application 106, the DOMS 110, and various other components operating on the computing device 900 (operating systems, device drivers, etc.) may cooperate and communicate via a communication mechanism included in or implemented in association with the bus 902. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 904 may include one or more interface devices (I/F) for wired and wireless connectivity among the components of the system 100. For instance, the communication unit 904 may include, but is not limited to, various types known connectivity and interface options. The communication unit 904 may be coupled to the other components of the computing system 900 via the bus 902. The communication unit 904 can provide other connections to the network 102 and to other entities of the system 100 using various standard communication protocols.

The input device 912 may include any device for inputting information into the computing system 900. In some implementations, the input device 912 may include one or more peripheral devices. For example, the input device 912 may include a keyboard, a pointing device, microphone, an image/video capture device (e.g., camera), a touch-screen display integrated with the output device 914, etc. The output device 914 may be any device capable of outputting information from the computing system 1400. The output device 914 may include one or more of a display (LCD, OLED, etc.), a printer, a 3D printer, a haptic device, audio reproduction device, touch-screen display, a remote computing device, etc. In some implementations, the output device is a display which may display electronic images and data output by a processor of the computing system 900 for presentation to a user, such as the processor 908 or another dedicated processor.

The data store 920 may include information sources for storing and providing access to data. In some implementations, the data store 920 may store data associated with a database management system (DBMS) operable on the computing system 900. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The data stored by the data store 920 may be organized and queried using various criteria including any type of data stored by them, such as a user identifier, a prescription record identifier, user attributes, pharmacy item attributes, retail item attributes, store identification, location data, etc. The data store 920 may include data tables, databases, or other organized collections of data. Examples of the types of data stored by the data store 920 may include, but are not limited to the data described with respect to FIGS. 1A-9, for example.

The data store 920 may be included in the computing system 900 or in another computing system and/or storage system distinct from but coupled to or accessible by the computing system 900. The data stores 920 can include one or more non-transitory computer-readable mediums for storing the data. In some implementations, the data stores 920 may be incorporated with the memory 910 or may be distinct therefrom.

The components 904, 908, 910, 912, 914, 926, 106, and/or 110 may be communicatively coupled by the bus 902 and/or the processor 908 to one another and/or the other components of the computing system 900. In some implementations, the components 904, 908, 910, 912, 914, 926, 106, and/or 110 may include computer logic (e.g., software logic, hardware logic, etc.) executable by the processor 908 to provide their acts and/or functionality. In any of the foregoing implementations, these components 904, 908, 910, 912, 914, 926, 106, and/or 110 may be adapted for cooperation and communication with the processor 908 and the other components of the computing system 900.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To facilitate description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
   receiving, by a server, an order from a user containing a plurality of components;
   generating, by a tracking token generator of the server, an encrypted electronic tracking token identifying the order and authorizing a party to receive the order;
   determining fulfillment operations based on an attribute of the user and attributes of the plurality of components;
   receiving, by the server, a provided encrypted electronic tracking token from the party in response to an attempt to dispense the order;
   decrypting, by the tracking token generator of the server, the provided encrypted electronic tracking token to validate the provided encrypted electronic tracking token;
   generating, in response to validating the provided encrypted electronic tracking token, an electronic signal indicating that the encrypted electronic tracking token is validated; and
   dispensing the order to the party in response to receiving the electronic signal indicating that the encrypted electronic tracking token is validated and the party as being authorized to receive the order.

2. The computer-implemented method of claim 1, further comprising:
   transmitting fulfillment instructions to a plurality of fulfillment systems based on the determined fulfillment operations; and
   transmitting, to each fulfillment system of the plurality of fulfillment systems, the encrypted electronic tracking token.

3. The computer-implemented method of claim 1, wherein the determined fulfillment operations comprise at least two fulfilment operations selected from:
   a pharmacy fulfillment operation;
   a retail fulfillment operation;
   an eliminate-the-wait fulfillment operation;
   a delivery fulfillment operation; and
   a curbside fulfillment operation.

4. The computer-implemented method of claim 1, further comprising:
   transmitting instructions for a prescription item to a pharmacy fulfillment system,
   wherein:
   the plurality of components comprises the prescription item;
   the prescription item has an associated patient identifier;
   the determined fulfillment operations comprise a pharmacy fulfillment operation; and
   the party is an authorized user for the associated patient identifier.

5. The computer-implemented method of claim 4, further comprising:
   verifying authorization of the party for the associated patient identifier;
   electronically communicating disclosures to the party; and
   receiving an electronic signature of the party.

6. The computer-implemented method of claim 4, further comprising:
   receiving, by a pharmacy fulfillment system, the provided encrypted electronic tracking token from the party at a retail location;
   transmitting, to the server, the provided encrypted electronic tracking token for validation; and receiving, by the pharmacy fulfillment system, the electronic signal indicating that the encrypted electronic tracking token is validated, wherein dispensing the order to the party comprises the party picking up the order at the retail location.

7. The computer-implemented method of claim 1, further comprising:
transmitting instructions for a delivery item to a delivery system, wherein:
the plurality of components comprises the delivery item; and
the determined fulfillment operations comprise a delivery fulfillment operation;
receiving, by the delivery system, the encrypted electronic tracking token;
receiving, by the delivery system, the provided encrypted electronic tracking token from the party at a delivery location;
transmitting, to the server, the provided encrypted electronic tracking token for validation; and
receiving, by the delivery system, the electronic signal indicating that the encrypted electronic tracking token is validated, wherein dispensing the order to the party comprises delivering the order to the party at the delivery location.

8. The computer-implemented method of claim 1, further comprising:
transmitting instructions for a curbside item to a curbside fulfillment system, wherein:
the plurality of components comprises the curbside item; and
the determined fulfillment operations comprise a curbside fulfillment operation;
receiving, by the curbside fulfillment system, the encrypted electronic tracking token;
receiving, by the curbside fulfillment system, the provided encrypted electronic tracking token from the party at a curbside location;
transmitting, to the server, the provided encrypted electronic tracking token for validation; and
receiving, by the curbside fulfillment system, the electronic signal indicating that the encrypted electronic tracking token is validated, wherein dispensing the order to the party comprises delivering the order to the party at the curbside location.

9. The computer-implemented method of claim 1, further comprising:
processing payment for the order prior to receiving the provided encrypted electronic tracking token from the party.

10. The computer-implemented method of claim 1, further comprising:
providing, by the server, the provided encrypted electronic tracking token to a first user authorized to receive the order;
sending, to a second user and from the first user, the provided encrypted electronic tracking token, wherein:
the provided encrypted electronic tracking token indicates that the second user is authorized to receive the order; and
the second user is the party to receive the order.

11. A system comprising:
a processor and a memory of a server storing instructions that, when executed by the processor, cause the system to perform operations including:
receiving, at the server, an order from a user containing a plurality of components;
generating, by a tracking token generator of the server, an encrypted electronic tracking token identifying the order and authorizing a party to receive the order;
determining fulfillment operations based on an attribute of the user and attributes of the plurality of components;
receiving, at the server, a provided encrypted electronic tracking token from the party in response to an attempt to dispense the order;
decrypting, by the tracking token generator of the server, the provided encrypted electronic tracking token to validate the provided encrypted electronic tracking token;
generating, in response to validating the provided encrypted electronic tracking token, an electronic signal indicating that the encrypted electronic tracking token is validated; and
dispensing the order to the party in response to receiving the electronic signal indicating that the encrypted electronic tracking token is validated and the party as being authorized to receive the order.

12. The system of claim 11, wherein the operations further comprise:
transmitting fulfillment instructions to a plurality of fulfillment systems based on the determined fulfillment operations; and
transmitting, to each fulfillment system of the plurality of fulfillment systems, the encrypted electronic tracking token.

13. The system of claim 11, wherein the determined fulfillment operations comprise at least two fulfilment operations selected from:
a pharmacy fulfillment operation;
a retail fulfillment operation;
an eliminate-the-wait fulfillment operation;
a delivery fulfillment operation; and
a curbside fulfillment operation.

14. The system of claim 11, wherein the operations further comprise:
transmitting instructions for a prescription item to a pharmacy fulfillment system,
wherein:
the plurality of components comprises the prescription item;
the prescription item has an associated patient identifier;
the determined fulfillment operations comprise a pharmacy fulfillment operation; and
the party is an authorized user for the associated patient identifier.

15. The system of claim 14, wherein the operations further comprise:
verifying authorization of the party for the associated patient identifier;
electronically communicating disclosures to the party; and
receiving an electronic signature of the party.

16. The system of claim 14, wherein the operations further comprise:
transmitting, to a pharmacy fulfillment system, the encrypted electronic tracking token; and
receiving, from the pharmacy fulfillment system, the provided encrypted electronic tracking token for validation, wherein:
the pharmacy fulfillment system is configured to:
receive the provided encrypted electronic tracking token from the party at a retail location; and receive, from the server, the electronic signal indicating that the encrypted electronic tracking token is validated; and dispensing the order to the party comprises the party picking up the order at the retail location.

17. The system of claim 11, wherein the operations further comprise:

transmitting instructions for a delivery item to a delivery system, wherein:
- the plurality of components comprises the delivery item; and
- the determined fulfillment operations comprise a delivery fulfillment operation;

transmitting, to the delivery system, the encrypted electronic tracking token;

receiving, from the delivery system, the provided encrypted electronic tracking token for validation, wherein:
- the delivery system is configured to:
  - receive the provided encrypted electronic tracking token from the party at a delivery location; and
  - receive, from the server, the electronic signal indicating that the encrypted electronic tracking token is validated; and
- dispensing the order to the party comprises delivering the order to the party at the delivery location.

18. The system of claim 11, wherein the operations further comprise:

transmitting instructions for a curbside item to a curbside fulfillment system, wherein:
- the plurality of components comprises the curbside item; and
- the determined fulfillment operations comprise a curbside fulfillment operation;

transmitting, to the curbside fulfillment system, the encrypted electronic tracking token;

receiving, from the curbside fulfillment system, the provided encrypted electronic tracking token for validation, wherein:
- the curbside fulfillment system is configured to:
  - receive the provided encrypted electronic tracking token from the party at a curbside location; and
  - receive, from the server, the electronic signal indicating that the encrypted electronic tracking token is validated; and
- dispensing the order to the party comprises delivering the order to the party at the curbside location.

19. The system of claim 11, wherein the operations further comprise:

processing payment for the order prior to receiving the provided encrypted electronic tracking token from the party.

20. A computer-implemented method comprising:

receiving, by a server, an order from a first user containing a plurality of components;

generating, by a tracking token generator of the server, an encrypted electronic tracking token identifying the order and authorizing a party to receive the order;

providing, by the server, the encrypted electronic tracking token to the first user;

sending, to a second user and from the first user, the provided encrypted electronic tracking token, wherein the provided encrypted electronic tracking token indicates that the second user is authorized to receive the order;

receiving, by the server, the provided encrypted electronic tracking token from the second user in response to an attempt to dispense the order;

decrypting, by the tracking token generator of the server, the provided encrypted electronic tracking token to validate the provided encrypted electronic tracking token;

generating, in response to validating the provided encrypted electronic tracking token, an electronic signal indicating that the encrypted electronic tracking token is validated; and dispensing the order to the second user in response to receiving the electronic signal indicating that the encrypted electronic tracking token is validated and the second user as being authorized to receive the order.

* * * * *